(12) United States Patent
Ohga et al.

(10) Patent No.: US 6,488,213 B2
(45) Date of Patent: Dec. 3, 2002

(54) VEHICLE AIR CONDITIONER WITH CONTROL SYSTEM LEARNING MANUAL CONTROL OPERATION OF BLOWER VOLTAGE

(75) Inventors: Akira Ohga, Ichinomiya (JP); Yuichi Kajino, Nagoya (JP); Takayoshi Kawai, Hoi-gun (JP); Toshifumi Kamiya, Takahama (JP); Yoshinori Ichishi, Kariya (JP)

(73) Assignee: Denso Corporation, Kariya (JP)

( * ) Notice: Subject to any disclaimer, the term of this patent is extended or adjusted under 35 U.S.C. 154(b) by 96 days.

(21) Appl. No.: 09/803,428

(22) Filed: Mar. 9, 2001

(65) Prior Publication Data

US 2001/0045099 A1 Nov. 29, 2001

(30) Foreign Application Priority Data

| Mar. 9, 2000 | (JP) | 2000-071060 |
| Mar. 22, 2000 | (JP) | 2000-084750 |
| Apr. 26, 2000 | (JP) | 2000-126160 |
| Jul. 13, 2000 | (JP) | 2000-213009 |
| Jul. 13, 2000 | (JP) | 2000-213010 |

(51) Int. Cl.$^7$ .............................. F24F 7/00; F25D 29/00
(52) U.S. Cl. .................. 236/49.3; 62/161; 165/247; 236/91 C; 454/258
(58) Field of Search .................. 236/493, 91 C, 236/78 D; 62/161, 180; 700/276; 454/258; 165/247

(56) References Cited

U.S. PATENT DOCUMENTS

5,605,051 A * 2/1997 Iritani et al. .................. 62/160
5,681,218 A * 10/1997 Kishi et al. .................. 454/75

FOREIGN PATENT DOCUMENTS

| JP | 3-42325 | 2/1991 |
| JP | 5-208610 | 8/1993 |
| JP | 6-106953 | 4/1994 |
| JP | 6-143970 | 5/1994 |

* cited by examiner

*Primary Examiner*—William Wayner
(74) *Attorney, Agent, or Firm*—Harness, Dickey & Pierce, PLC

(57) ABSTRACT

In a control system of a vehicle air conditioner, when a temperature difference between a previous target air temperature at the previous manual operation and a present target air temperature at the present manual operation is smaller than a predetermined value, that is, when it is estimated that a passenger's desired air amount is not set by the previous manual operation, a blower voltage control characteristic for controlling an air amount of a blower is corrected so that a set value at the previous manual operation is not affected to the present learning. Accordingly, it can prevent air-conditioning feeling from being deteriorated due to mis-learning.

38 Claims, 29 Drawing Sheets

VEHICLE AIR CONDITIONER WITH CONTROL SYSTEM LEARNING MANUAL CONTROL OPERATION OF BLOWER VOLTAGE

CROSS-REFERENCE TO RELATED APPLICATION

This application is related to Japanese Patent Applications No. Hei. 11-307160 filed on Oct. 28, 1999, No. 2000-71060 filed on Mar. 9, 2000, No. 2000-84750 filed on Mar. 22, 2000, No. 2000-126160 filed on Apr. 26, 2000, No. 2000-213009 filed on Jul. 13, 2000, and No. 2000-213010 filed on Jul. 13, 2000, the contents of which are hereby incorporated by reference.

BACKGROUND OF THE INVENTION

1. Field of the Invention

The present invention relates to a vehicle air conditioner with a control system which learns a blower voltage control operation due to a passenger's manual operation so that a blower voltage control characteristic corresponding to a passenger desire can be obtained.

2. Description of Related Art

In a vehicle air conditioner described in JP-A-5208610, a blower voltage control characteristic showing a relationship between a target air temperature blown into a passenger compartment and a blower voltage applied to a blower is stored in a control system, and the blower voltage control characteristic is corrected every time the blower voltage is manually set (changed). However, even when an air-blowing amount of a passenger's desire is not set, the blower voltage control characteristic is corrected every time the blower voltage is manually set. Accordingly, the blower voltage control characteristic does not correspond to the passenger's desire, and air-conditioning feeling is deteriorated.

In a vehicle air conditioner described in JP-A-6143970, a passenger's operation for setting an air amount, an air temperature or the like is learned by a control system, and an air-conditioning control characteristic is corrected by learning the passenger's operation. In this control system, environment conditions such as an outside air temperature and a sunlight amount entering into a passenger compartment are stored so that a passenger's sense relative to the environment conditions is reflected to the correction of the air-conditioning control characteristic. Regarding the sunlight amount, only when the sunlight amount detected by a sunlight amount sensor is changed more than a predetermined amount, the air-conditioning control characteristic is corrected. However, because the sunlight amount detected by the sunlight amount sensor is directly used, when a vehicle is in traveling between buildings in favorable weather, the detected sunlight amount is repeatedly greatly changed, and the air-conditioning control characteristic is repeatedly changed. Accordingly, a suitable air-conditioning performance is not obtained.

In a vehicle air conditioner described in JP-A-342325, when a manual change operation of set air temperature is performed, the manual change operation is directly learned in connection with environment conditions such as the outside air temperature and the inside air temperature, and air-conditioning control is performed based on the learned set temperature. However, all manual change operation of the set air temperature are directly learned to be used for the air-conditioning control, the next air conditioning control may be affected when the manual change of the set air temperature becomes larger.

In addition, in a vehicle air conditioner described in JP-A-6-106953, a blower voltage control characteristic stored in a ROM is learned and changed in accordance with a passenger's manual operation, and an air amount to be blown into a passenger compartment is controlled based on the learned and changed blower voltage control characteristic. Because the manual operator is generally the driver of the vehicle, the blower voltage control characteristic is made to correspond to the driver's desire. However, when the other passenger except for the driver is in the passenger compartment, the air amount, controlled based on the learned and changed blower voltage control characteristic, may be not suitable for the other passenger.

SUMMARY OF THE INVENTION

In view of the foregoing problems, it is an object of the present invention to provide a vehicle air conditioner with a control system correcting a control characteristic based on a manual set value of an air amount of a blower, which can prevent air-conditioning feeling from being deteriorated even when a passenger's desired air amount is not set.

It is an another object of the present invention to provide a vehicle air conditioner with a control system correcting a control characteristic in accordance with a passenger's operation, which improves a learning effect of the passenger's operation while a stable air-conditioning performance is obtained.

It is a further another object of the present invention to provide a vehicle air conditioner with a control system which learns and stores a passenger's set temperature in connection with an environment condition, and automatically controls an air conditioning state of a passenger compartment based on a stored set temperature. In the vehicle air conditioner, a rapid change of an air-conditioning control amount can be prevented, and a pleasant air conditioning control can be obtained.

It is a further another object of the present invention to provide a vehicle air conditioner with a control system correcting a control characteristic for an automatic control in accordance with a passenger's operation, in which the control characteristic can be corrected only to correspond to a predetermined passenger's desire.

It is a further another object of the present invention to provide a vehicle air conditioner with a manual operation of a predetermined passenger for which an air conditioning control is performed based on a learning pattern, which improves air conditioning performance for the other passenger except for the predetermined passenger.

According to an aspect of the present invention, in a vehicle air conditioner, a control system determines an air amount blown by a blower based on a control characteristic having a relationship between a control factor used for a temperature control of a passenger compartment and the air amount of the blower, and a set value of the air amount of the blower is manually controlled through a manual setting member. The control system corrects the control characteristic based on the set value due to the manual setting member. When the set value of the air amount of the blower is changed by the manual setting member, the control system determines a correction degree of the control characteristic in accordance with a determination whether a difference between a value of the control factor at the previous manual operation of the manual setting member and a value of the control factor at the present manual operation of the manual setting member is equal to or larger than a predetermined value. Specifically, the control system corrects the control characteristic without using the set value of the air amount at the previous manual operation, when the difference is smaller than the predetermined value. Alternatively, the control system corrects the control characteristic by using the mean value of the set value of the air amount at the previous manual operation and the set value of the air amount at the present manual operation, when the difference is smaller than the predetermined value. Accordingly, it can prevent an air-conditioning feeling from being deteriorated due to a mis-learning.

On the other hand, the control system stores a plurality of the set values due to plural manual operations of the manual setting member, and selects correction set values to be used for a correction of the control characteristic among the set values. Further, the control system corrects the control characteristic only based on the correction set values. Therefore, unnecessary information is not learned, and the control characteristic can be corrected in accordance with a passenger's desire.

According to an another aspect of the present invention, a vehicle air conditioner includes a sensor for detecting an environment condition relative to an air conditioning state of a passenger compartment, a manual operation member manually operated by a passenger for setting a set value of the air conditioning state, and a control system for controlling the air conditioning state. The control system includes calculation means in which a detection value of the sensor is calculated in accordance with a predetermined calculation process to a sensor output value. The control system automatically controls the air conditioning state of the passenger compartment based on the sensor output value in accordance with a control characteristic. When the set value due to the manual operation member is changed, the control system corrects the control characteristic using a value approximating the detection value of the sensor, than the sensor output value. Accordingly, a learning effect of the manual operation member can be improved under the environment condition which is actually sensed by the passenger, while a stable air-conditioning performance is obtained using the sensor output value.

According to a further another aspect of the present invention, an air conditioner includes a temperature setting unit for setting temperature of a passenger compartment to a passenger's set temperature, a memory unit which learns and stores the passenger's set temperature in connection with an environment condition relative to an air conditioning state of the passenger compartment, a calculation unit for calculating an air-conditioning control amount based on a stored set temperature corresponding to the environment condition, among a plurality of stored set temperatures stored in the memory unit, and a control system for automatically controlling the air conditioning state based on the air-conditioning control amount from the calculation unit. The stored set temperature used for the calculation of the air-conditioning control amount is changed in accordance with a change of the environment condition. When a difference of the stored set temperature before the change and the stored set temperature after the change is equal to or larger than a predetermined temperature, the control system sets a correction set temperature different from the stored set temperature, and the calculation unit calculates the air-conditioning control amount based on the correction set temperature. Preferably, the control system gradually changes the correction set temperature from a value near the stored set temperature before the change to a value near the stored set temperature after the change. Accordingly, a rapid change can be prevented, and air conditioning performance can be improved.

When the passenger's set temperature is changed through the temperature setting unit, the control system determines whether the changed passenger's set temperature is learned in accordance with a control amount difference between an air-conditioning control amount calculated based on the changed passenger's set temperature and the air-conditioning control amount calculated based on the stored set temperature. Specifically, when the control amount difference is smaller than a predetermined value, the control system prohibits the learning of the changed passenger's set temperature. Therefore, a memory using amount can be made smaller.

According to a further another aspect of the present invention, in a vehicle air conditioner, a control system automatically controls an air conditioning state of a passenger compartment based on an output value from a sensor in accordance with a control characteristic, and corrects the control characteristic for an automatic control of the air conditioning state based on a set value of a manual operation member. The control system has operator determining means for determining a seat position of an operator operating the manual operation member in the passenger compartment when the set value of the air amount of the blower is manually set through the manual operation member, and the control system determines a correction method of the control characteristic based on a determination of the operator determining means. For example, the control system corrects the control characteristic only when the operator operating the manual operation member is on a predetermined seat in the passenger compartment. Accordingly, only the predetermined passenger's operation is learned, and the control characteristic corresponding to the predetermined passenger's desire can be obtained.

According to a further another object of the present invention, in a vehicle air conditioner with a control system controlling an air conditioning unit based on a control pattern having a learning pattern which is rewritten in accordance with a passenger's desire and a general pattern which maintains an original set pattern, the control system has seat state detecting means for detecting a seated state of a passenger in the passenger compartment. When the seat state detecting means detects that a passenger is only on a predetermined seat, the control system controls the air conditioning unit based on the learning pattern. Therefore, in this case, an air conditioning operation corresponding to the predetermined passenger's desire can be obtained. Further, when the seat state detecting means detects that a passenger is also on the other seat except for the predetermined seat, the control system controls the air conditioning unit based on at least the general pattern. Therefore, in this case, it can prevent unpleasant feeling from being given to the other passenger except for the predetermined passenger.

Preferably, when the seat state detecting means detects that a passenger is also on the other seat except for the predetermined seat, the control system controls the air conditioning unit based on both the learning pattern and the general pattern. In this case, as the number of passengers on the other seat except for the predetermined seat is larger, a contribution of the general pattern is made larger.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
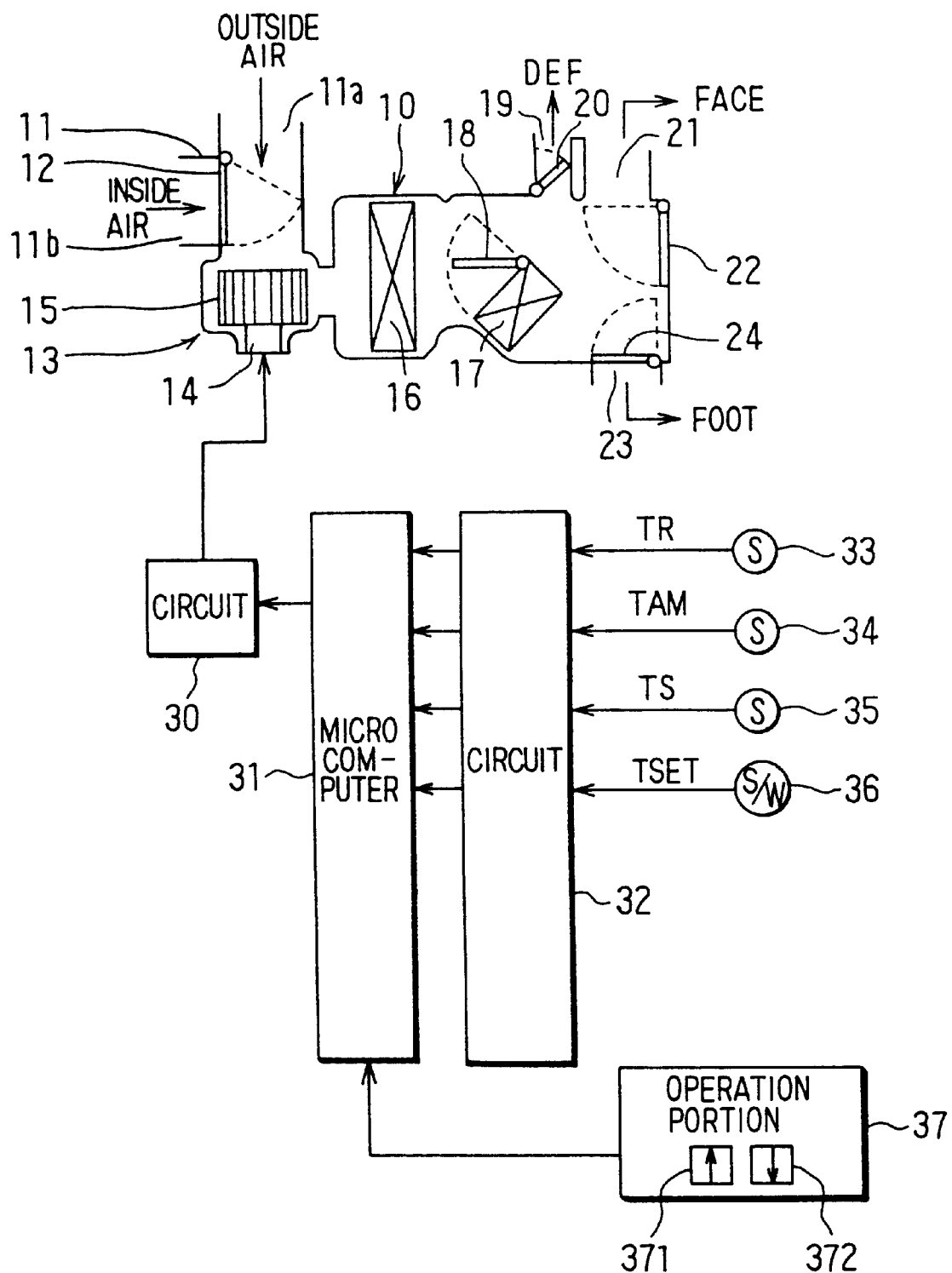
FIG. 1 is a schematic diagram showing an entire structure of a vehicle air conditioner according to a first preferred embodiment of the present invention.

A first preferred embodiment of the present invention will be now described with reference to FIGS. 1–8. As shown in FIG. 1, A vehicle air conditioner includes an air conditioning unit 10, and a blower unit including an inside/outside air switching box 11 and a blower 13. The blower unit is disposed at an upstream air side of the air conditioning unit 10. The inside/outside air switching box 11 is disposed at a most upstream air side in the blower unit. The inside/outside air switching box 11 has an outside air introduction port 11a through which outside air outside a passenger compartment is introduced, and an inside air introduction port 11b through which inside air inside the passenger compartment is introduced. An inside/outside air switching door 12 is rotatably disposed in the inside/outside air switching box 11 to open and close the outside air introduction port 11a and the inside air introduction port 11b. The inside/outside air switching door 12 is driven by an actuator (not shown) to adjust a ratio between an amount of air introduced from the outside air introduction port 11a and an amount of air introduced from the inside air introduction port 11b.

The blower 13 is disposed to blow air from the inside/outside air switching box 11 into a downstream air side of the air conditioning unit 10. The blower 13 includes a centrifugal fan 15, and a blower motor 14 for driving the fan 15. Air blown by the blower 13 flows through an air passage of an air conditioning case of the air conditioning unit 10. An evaporator 16 for cooling air and a heater core 17 for heating air are disposed in the air conditioning case of the air conditioning unit 10.

The evaporator 16 is connected to a compressor and the like of a refrigerant cycle to construct a part of the refrigerant cycle. Therefore, air passing through the evaporator 16 is cooled by absorbing an evaporation latent heat of the refrigerant cycle. The heater core 17 is disposed to heat air passing therethrough using engine-cooling water flowing therein as a heating source.

An air mixing door 18 is rotatably disposed at an upstream air side of the heater core 17. A rotation position of the air mixing door 18 is adjusted by an actuator (not shown). Accordingly, a ratio between an air amount passing through the heater core 17 and an air amount bypassing the heater core 17 is adjusted, so that temperature of air blown into the passenger compartment is adjusted.

At a most downstream air side of the air conditioning unit 10, a defroster door 20 for opening and closing a defroster opening 19, a face door 22 for opening and closing a face opening 21 and a foot door 24 for opening and closing a foot opening 23 are disposed. The defroster opening 19 is provided in the air conditioning case so that conditioned air is blown toward an inner side of a windshield through the defroster opening 19. The face opening 21 is provided in the air conditioning case so that conditioned air is blown toward an upper side of the passenger compartment. The foot opening 23 is provided in the air conditioning case so that conditioned air is blown toward a lower side of the passenger compartment. By selectively opening and closing the defroster opening 19, the face opening 21 and the foot opening 23, an air outlet mode such as a face mode, a bi-level mode, a foot mode, a foot/defroster mode and a defroster mode can be set. For setting an air outlet mode, the doors 20, 22, 24 are driven by an actuator (not shown).

A control unit for controlling operation of the vehicle air conditioner includes a driving circuit 30, a microcomputer 31, and a level converting circuit 32 and the like. An air blowing amount from the blower 13 is controlled in the driving circuit 30 driving the blower motor 14, in accordance with an output signal from the microcomputer 31. The actuators of the doors 12, 18, 20, 22, 24 are also controlled in the driving circuit 30 based on output signals from the microcomputer 31. The microcomputer 31 has therein a CPU, a ROM, a RAM, a standby RAM, an I/O port, an A/D converter and the like.

The standby RAM is for storing (back up) a learning value learning a request of a passenger even when an ignition switch (IG) is turned off. Even when the ignition switch (IG) is turned off, electrical power is directly supplied to the standby RAM from a battery. Even when electrical power is not supplied by the battery, a back-up electrical power is supplied to the microcomputer 31 in a short time.

Output signals from an operation portion 37 disposed on an instrument panel of the passenger compartment are input into the microcomputer 31. The operation portion 37 has an automatic switch (AUTO) for setting an automatic control state of the vehicle air conditioner, a manual inside/outside air selecting switch for manually setting an inside/outside air introduction mode, a manual air outlet mode selecting switch for manually selecting an air outlet mode such as the defroster mode, the face mode, the foot mode, the bi-level mode and the foot mode, a manual air-blowing setting switch for manually setting an air blowing amount of the fan 15, and the like.

Specifically, the manual air-blowing setting switch has an air-amount increasing switch 371 and an air-amount decreasing switch 372. The air-blowing increasing switch 371 outputs a signal for increasing a blower voltage by one level (0.25 volt) when being pushed by one time. On the other hand, the air-blowing decreasing switch 372 outputs a signal for decreasing a blower voltage by one level (e.g., 0.25 volt) when being pushed by one time. The blower voltage applied to the blower motor 14 is generally in a range of 4 volt (Lo) and 12 volt (Hi), for example.

Signals from a sensor group detecting environment conditions relative to an air conditioning state within the passenger compartment are input into the microcomputer 31. Specifically, the sensor group includes an inside air temperature sensor 33 for detecting temperature of inside air inside the passenger compartment, an outside air temperature sensor 34 for detecting temperature of outside air outside the passenger compartment, a sunlight sensor 35 for detecting a sunlight amount entering into the passenger compartment, and the like. These signals from the sensors 33–35 are input into the microcomputer 31 through the level converting circuit 32, and are read in the microcomputer 31 after being A/D converted. Further, a signal from a temperature setting switch 36 for setting a desired temperature (set temperature) of a passenger is input into the microcomputer 31 after being level-converted in the level converting circuit 32.

Figure 2:
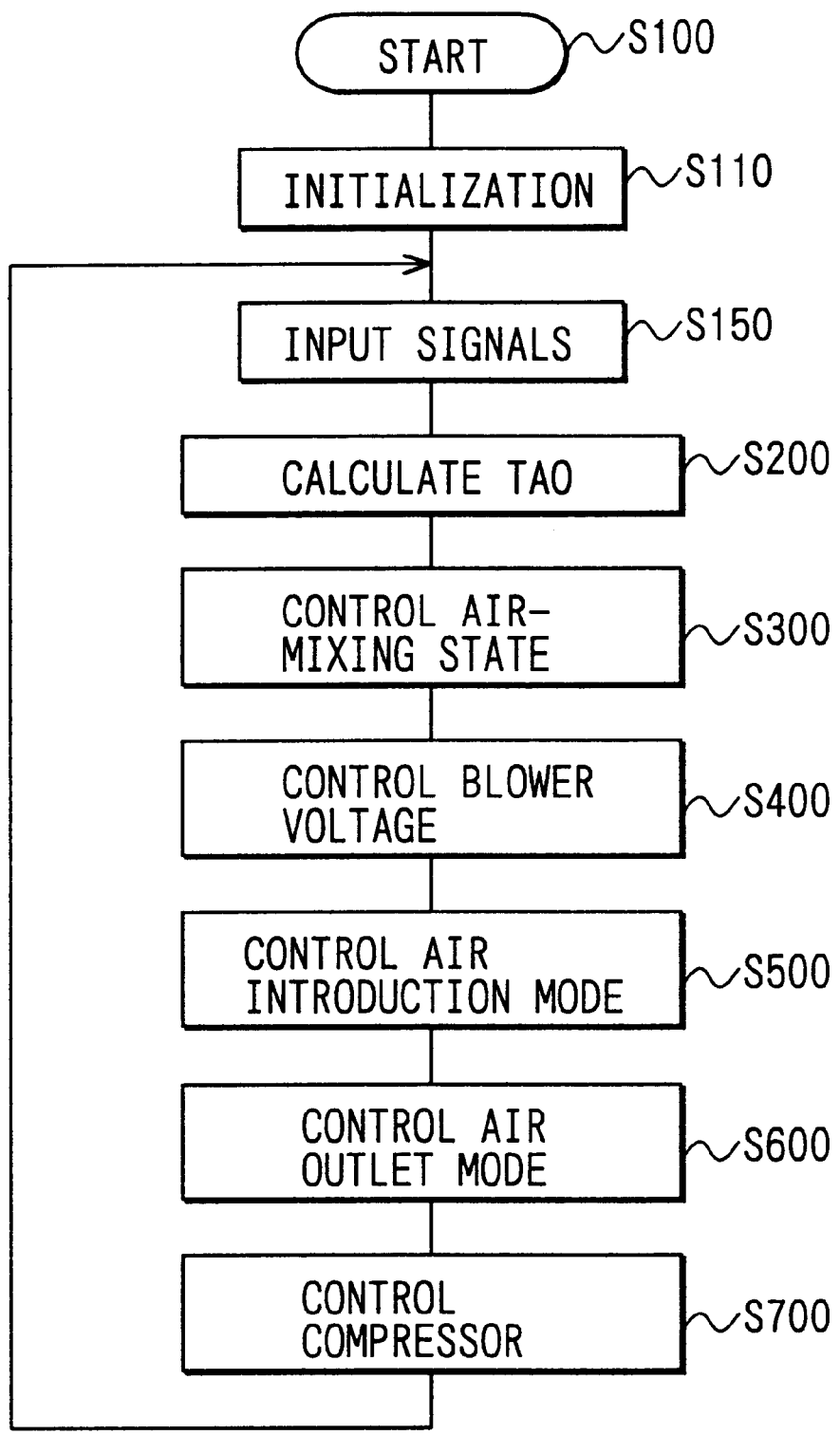
FIG. 2 is a flow diagram showing a base control of a microcomputer according to the first embodiment.

FIG. 2 shows a base control of the control unit according to the first embodiment, and the base control is performed when the automatic control state of the vehicle air conditioner is set by the automatic switch provided in the operation portion 37. Operation of the microcomputer 31 starts at step S100 in FIG. 2 when the ignition switch is turned on. Next, at step S110, initialization such as various conversions, flag setting and the like is performed. At step S150, environment-condition signals from the inside air temperature sensor 33, the outside air temperature sensor 34 and the sunlight amount sensor 35 are input, and operation switch states from the temperature setting switch 36 and the other switches of the operation portion 37 are input.

Next, at step S200, a target air temperature (TAO) to be blown into the passenger compartment is calculated based on the signals input at step S150 in accordance with the following formula (1) stored beforehand in the ROM.

$$TAO = KSET \times TSET - KR \times TR - KAM \times TAM - KS \times TS + C \quad (1)$$

wherein, TSET is a set temperature set by the temperature setting switch 36, TR is the inside air temperature detected by the inside air temperature sensor 33, TAM is the outside air temperature detected by the outside air temperature sensor 34, TS is the sunlight amount detected by the sunlight amount sensor 35. Further, KSET, KR, KAM and KS are coefficients, and C is a correction constant. In the first embodiment, the target air temperature TAO is a control factor used for a temperature control of the passenger compartment.

Next, at step S300, an air mixing state is controlled based on the calculated target air temperature TAO. That is, at step S300, a rotation position (opening degree) of the air mixing door 18 is controlled by the actuator through the driving circuit 30, so that temperature of air blown into the passenger compartment is controlled.

Next, at step S400, a blower voltage applied to the blower motor 14 is controlled based on the calculated target air temperature TAO through the driving circuit 30. Accordingly a rotation speed of the fan 15 is controlled so that an air-blowing amount blown into the passenger compartment is controlled. However, a desired air-blowing amount for a passenger have individual variation, and is difficult to be uniformly determined. In the first embodiment, the desired air-blowing amount of the passenger is learned at a passenger's manual operation, so that an air-blowing characteristic reflecting a passenger's desire can be obtained.

Next, at step S500, an inside/outside air introduction ratio due to the operation position of the inside/outside air switching door 12 is calculated, and the actuator for the inside/outside air switching door 12 is controlled through the driving circuit 30. Next, at step S600, an air outlet mode is controlled. That is, the actuator driving the defroster door 20, the face door 22 and the foot door 24 is controlled through the driving circuit 30. Next, at step S700, the compressor of the refrigerant cycle is controlled. Thereafter, the control routine returns to step S150 where plural signals are input, the target air temperature TAO is calculated at step S200, and the operation controls of the steps S300, S400, S500, S600 and S700 are repeated.

Figure 3:
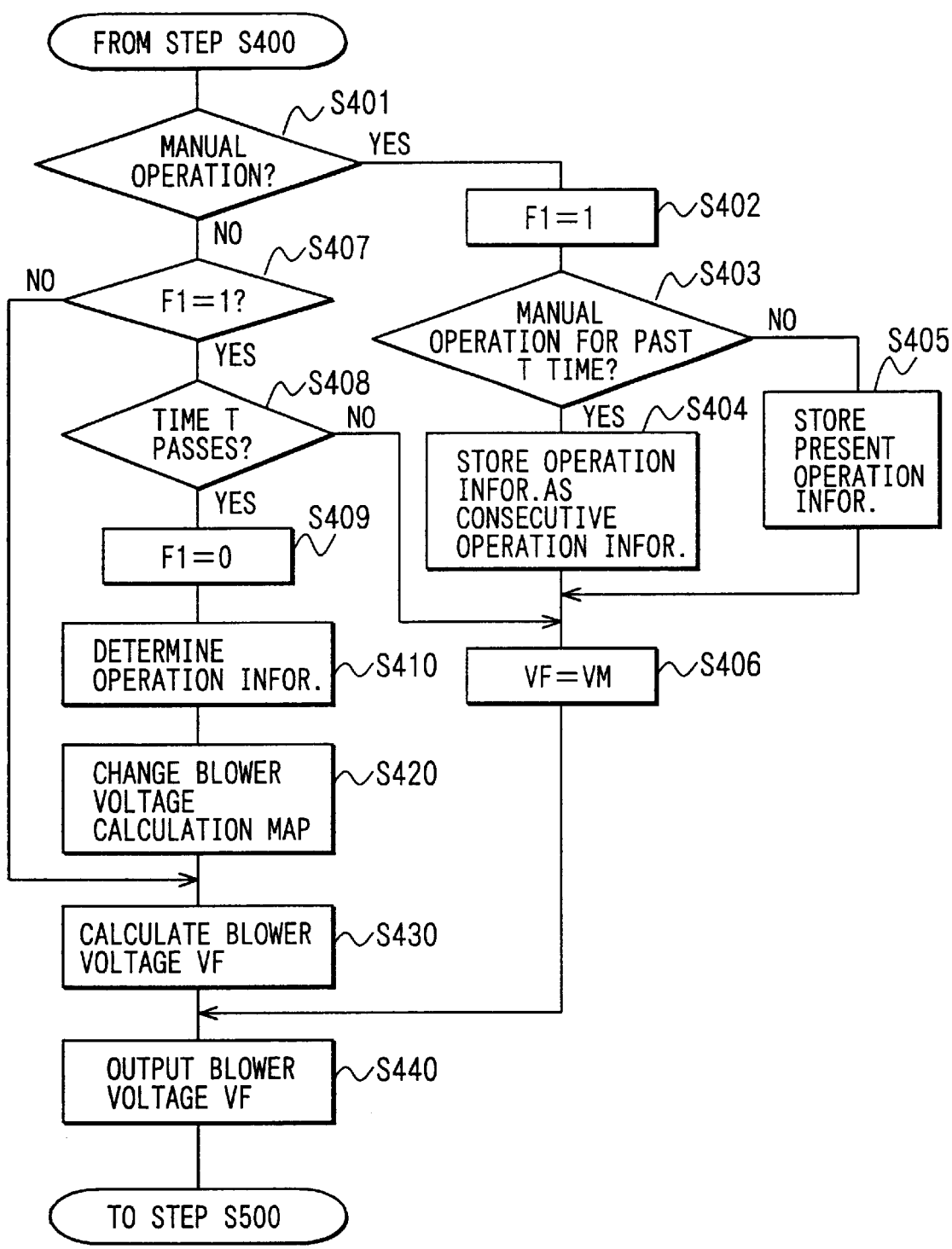
FIG. 3 is a flow diagram showing a detail control of a blower voltage in FIG. 2, according to the first embodiment.

The air-blowing control at step S400 is explained in detail based on the flow diagram of FIG. 3. In FIG. 3, a leaning method for leaning a blower voltage control characteristic (blower voltage calculation map) of the blower motor 14 is mainly described.

Figure 4:
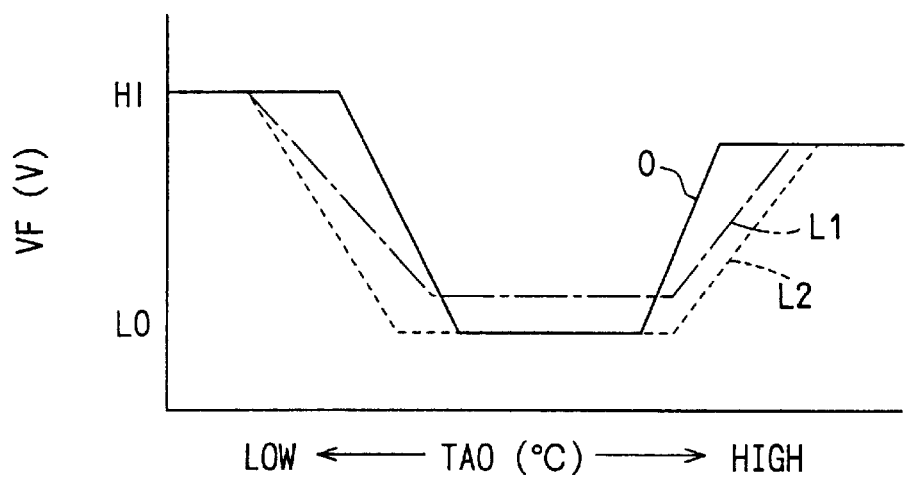
FIG. 4 is a view showing a blower voltage control characteristic for explaining a correction of a blower voltage during operation, according to the first embodiment.

First, at step S401, it is determined whether or not an air-blowing amount of the blower 13 is manually set (changed) by the operation portion 37. when the manual operation for setting the air-blowing amount is not determined at step S401, it is determined whether or not a leaning-request flag F1 is equal to 1. An initial value of the leaning-request flag F1 is set to zero at step S110. Therefore, when the manual operation for air-blowing amount is not determined, the leaning request flag F1 is not equal to 1. Accordingly, at step S430, a blower voltage VF is calculated in accordance with a blower voltage control characteristic relative to the target air temperature TAO. FIG. 4 shows the blower voltage control characteristics, pre-stored in the ROM, showing a relationship between the target air temperature TAO and the blower voltage VF. In FIG. 4, the solid line O indicates an original control pattern pre-stored in the ROM, which is most suitable for a general passenger. On the other hand, the chain lines L1, L2 indicate learned control patterns each of which is corrected by learning.

At step S430, the blower voltage VF is determined based on the original control pattern shown in FIG. 4, when a learning is not performed once. After the blower voltage control characteristic is corrected by learning, the blower voltage VF is determined based on the learned control pattern.

Next, at step S440, the blower motor VF calculated at step S430 is applied to the blower motor 14 through the driving circuit 30. Thereafter, the control at step S500 in FIG. 2 is performed.

Next, when a passenger manually operates the air-amount increasing switch 371 or the air-amount decreasing switch 372 to manually set (change) an air amount, the manual operation is determined at step S401. In this case, at step S402, the learning-request flag F1 is set at 1, and control of step S403 is performed. That is, at step S403, it is determined whether or not the blower voltage (air-blowing amount) is manually set for the past time T seconds (e.g., 5 seconds). When the blower voltage is not manually operated during the past time T from the manual operation at step S403, the present manual operation information is stored at step S405. That is, at step S405, an operation information (set value) at an operation start time and an operation information (set value) at an operation finish time are stored. The operation information at the operation start time includes the blower voltage control characteristic, the operation start time, the TAO, the outside air temperature, the inside air temperature, the sunlight amount and the blower voltage, which are stored at the operation start time. Further, the operation information at the operation finish time includes the operation finish time, the TAO, the outside air temperature, the inside air temperature, the sunlight amount and the blower voltage.

Next, at step S406, the blower voltage VF is changed to a blower voltage VM that is manually set. Thereafter, at step S440, the blower voltage VF is applied to the blower motor 14 through the driving circuit 30.

On the other hand, when it is determined that the manual air-blowing operation is performed during the past T time (e.g., 5 seconds) at step S403, the previous operation information and the present operation information are stored as one consecutive operation information. For example, the manual air-blowing operation is performed at a time t1, and is further formed at a time t2 (t1<t2<(t1+5S)), the operation information at the operation start time t1 is maintained, and the operation information at the operation finish time t2 is stored while the operation information at the operation finish time t1 is deleted. That is, when the operation value is changed by many times within the past time T after the previous finish time, the operation value at the first operation start time and the operation value at the present operation finish time are stored.

Next, at step S406, the blower voltage VF is changed to the manually set blower voltage VM. Thereafter, at step S440, the blower voltage VF is applied to the blower motor 14 through the driving circuit 30.

When the manual operation is not determined at step S401, it is determined whether or not the learning-request flag F1 is equal to 1 at step S407. When the learning-request flag F1 is equal to 1, it is determined that the learning-request flag becomes 1 due to a previous manual operation. In this case, at step S408, it is determined whether or not the time T passes after the previous manual operation is finished. That is, when a passing time after finishing the previous manual operation is shorter than the time T, the blower voltage VF is set to the blower voltage VM at the manual operation finish time, at step S406. Thereafter, at step S440, the blower voltage VF is applied to the blower motor 14 through the driving circuit 30.

On the other hand, when it is determined that the time T passes after the previous manual operation is finished at step S408, the learning-request flag F1 is set to zero at step S409. Next, at step S410, an operation information (set value) to be used for learning, among stored information at step S404, 405, is determined in accordance with a difference between the present TAO at the present operation time and the previous TAO at the previous operation time. The determination of step S410 will be described later in detail. Next, at step S420, the blower voltage control characteristic (blower voltage calculation map) is changed by learning, at step S420. Next, at step S430, the blower voltage VF is calculated based on the blower voltage calculation map having being learned. That is, at step S430, the blower voltage VF is calculated based on a corrected blower voltage control characteristic. Further, at step S440, the calculated blower voltage is applied to the blower motor 14 through the driving circuit 30 at step S440. Thereafter, the control program moves to step S500.

Next, control operations at steps S410 and S420 will be described in detail. First, at step S410, when the target air temperature TAO at the previous time is as TAO1 and the target air temperature TAO at the present time is as TAO2, it is determined whether or not a difference $\Delta TAO$ (|TAO2−TAO1|)is equal to a larger than a set value $\alpha$ (e.g., 3° C.) Then, the blower voltage control characteristic is corrected in accordance with this determination.

When $\Delta TAO \geq \alpha$, it is estimated that the air blowing amount is reset for a passenger's desire, in accordance with a change of the environment condition relative to the air conditioning state of the passenger compartment. In this case, the blower voltage calculation map (the blower voltage control characteristic) is corrected at step S420. That is, the correction method of the blower voltage control characteristic, when $\Delta TAO \geq \alpha$, is described with reference to FIGS. 5–7.

Figure 5:
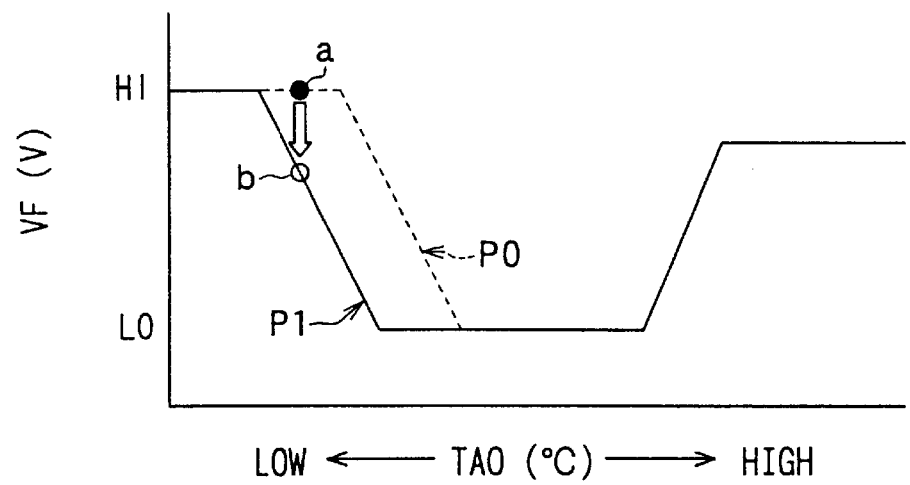
FIG. 5 is a view showing a blower voltage control characteristic for explaining a correction of the blower voltage during operation, according to the first embodiment.

In a rapid cooling state where voltage of the control point "a" on an original control pattern P0 is applied to the blower motor 14, when a first air amount adjustment operation is performed by a passenger from the voltage of the control point "a" to the voltage of the control point "b", the tilt control line of the original control pattern P0 is moved in parallel to the left side in FIG. 5 to passes through the manually set control point "b". That is, as shown in FIG. 5, the blower voltage control characteristic after learning the first air amount adjustment operation is changed to a first learned control pattern P1.

Figure 6:
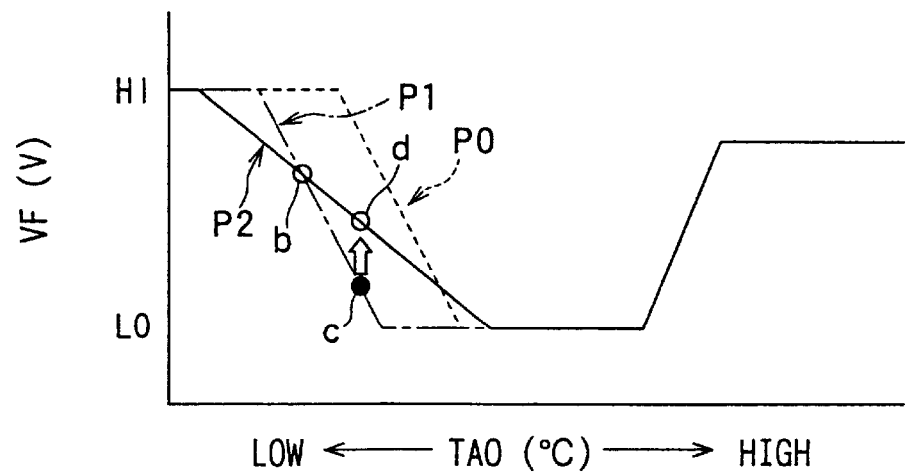
FIG. 6 is a view showing a blower voltage control characteristic for explaining a correction of the blower voltage during operation, according to the first embodiment.

Next, a case, where a second air amount adjustment operation is performed after time T passes from the first air amount adjustment operation, will be now described. In a state where the voltage applied to the blower motor 14 is at a control point "C" on the first learned control pattern P1 after the time T passes from the first air amount adjustment operation, when the second air amount adjustment operation is performed so that the air blowing amount is increased from the voltage of the control point "c" to the voltage of the control point "d", the control line is changed to pass through the first manual setting point "b" and the third manual setting point "d". That is, as shown in FIG. 6, the blower voltage control characteristic after learning the second air amount adjustment operation is changed to a second learned control pattern P2.

Figure 7:
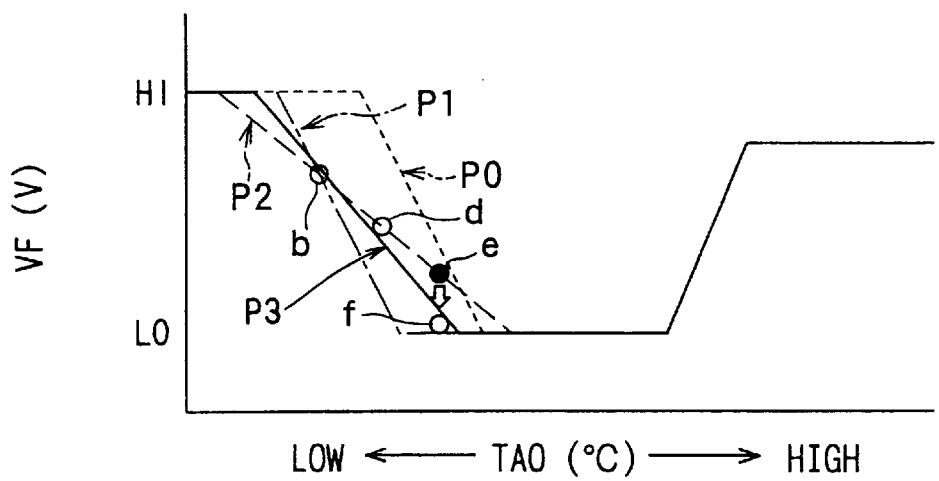
FIG. 7 is a view showing a blower voltage control characteristic for explaining a correction of the blower voltage during operation, according to the first embodiment.

Next, a case, where a third air amount adjustment operation is performed after time T passes from the second air amount adjustment control, will be now described with reference to FIG. 7. In a state where the voltage applied to the blower motor 14 is at a control point "e" on the second learned control pattern P2 after the time T passes from the second air amount adjustment operation, when the third air amount adjustment operation is performed by the passenger so that the air blowing amount is decreased from the voltage of the control point "e" to the voltage of the control point "f", the control line is changed to a line (least-squares approximate line) which is obtained by least-squares approximate of the first manual setting point "b", the second manual setting point "d" and the third manual setting point "f". That is, as shown in FIG. 7, the blower voltage control characteristic after learning the third air amount adjustment operation is changed to a third learned control P2. When the number of the manual operations is larger than 3, the blower voltage control characteristic is calculated by the least-squares approximate of plural manual setting points. Thus, in the first embodiment, a passenger's desire can be effectively accurately learned, and is accurately reflected in the air blowing amount adjustment.

On the other hand, when $\Delta TAO < \alpha$, it is estimated that the air blowing amount is reset even when the environment condition relative to the air conditioning state of the passenger compartment is hardly changed. That is, when $\Delta TAO < \alpha$, it is estimated that an air amount desired by the passenger is not set by one previous operation. In this case, when the blower voltage calculation map (the blower voltage control characteristic) is corrected by the same method as that when $\Delta TAO \geq \alpha$, the tilt line of the blower voltage control characteristic becomes rapid.

Figure 8:
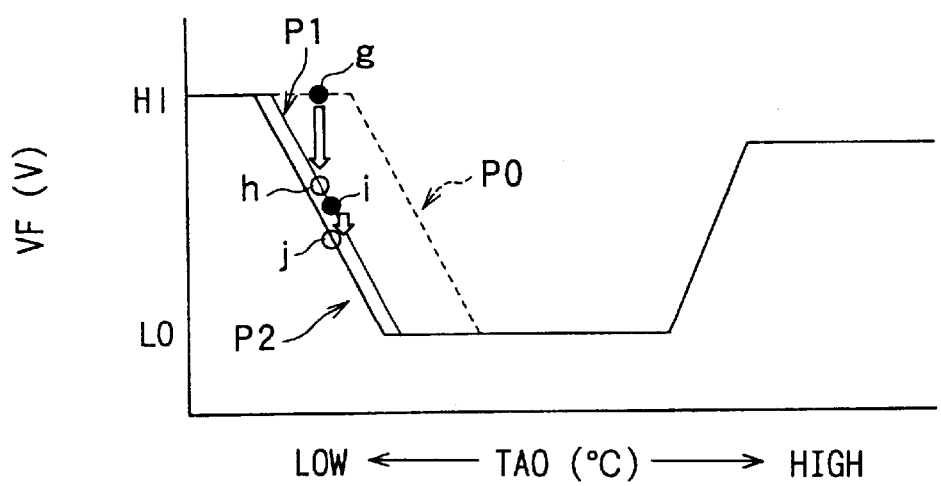
FIG. 8 is a view showing a blower voltage control characteristic for explaining a correction of the blower voltage during operation, according to the first embodiment.

In the first embodiment, when $\Delta TAO < \alpha$, the blower voltage control characteristic is corrected at step S420 in accordance with the graph in FIG. 8.

When a first air amount adjustment operation is performed by a passenger from the voltage of the control point "g" on the original control pattern P0 to the voltage of the control point "h", the tilt control line of the original control pattern P0 is moved in parallel to the left side in FIG. 8 to pass through the manually set control point "h". That is, as shown in FIG. 8, the blower voltage control characteristic after learning the first air amount adjustment operation is changed to a first learned control pattern P1.

Next, a case, where a second air amount adjustment operation is performed after time T passes from the first air amount adjustment operation, will be now described. In a state where the voltage applied to the blower motor 14 is at a control point "i" on the first learned control pattern P1 after the time T passes from the first air amount adjustment operation, when the second air amount adjustment operation is performed so that the air blowing amount is decreased from the voltage of the control point "i" to the voltage of the control point "j", the first learned control pattern P1 is used as the original control pattern. That is, as shown in FIG. 8, the tilt control line of the first learned control pattern P1 is moved in parallel to passes through the manually set control point "j". That is, as shown in FIG. 8, the blower voltage control characteristic after learning the second air amount adjustment operation is changed to a second learned control pattern P2. In this case, a tilt angle of the tilt line of the blower voltage control characteristic is not changed.

When a third air amount adjustment operation is performed after time T passes from the second air amount adjustment control when $\Delta TAO < \alpha$, the second learned control pattern P2 is used as the original control pattern, and the tilt line of the second learned control pattern P2 is moved in parallel to pass through a third manual setting point so that a third learned control pattern is obtained.

When $\Delta TAO \geq \alpha$, the tilt line of the control pattern is changed so that the learned control pattern passes through the second manual setting point j and the third manual setting point.

According to the first embodiment, first, it is determined whether or not the difference $\Delta TAO$ is equal to or larger than the set value α. Then, it is estimated that the passenger's desired air amount is not set by the previous control operation when ΔTAO<α. In this case, the blower voltage control characteristic is corrected without using the operation information (manually set value) at the previous air amount set operation (previous operation). Accordingly, the learned result in the previous air amount set operation is not affected to the present learned result, a deterioration of the air conditioning feeling due to an error learning can be prevented, and a pleasant feeling can be obtained.

In addition, when ΔTAO≧α, the blower voltage control characteristic is corrected using the operation information (manually set value) at the previous operation and the operation information (manually set value) at the present operation, and the air amount control can be effectively accurately performed in accordance with a passenger's desire.

In the above-described first embodiment, when ΔTAO<α, the first learned control pattern P1 is moved in parallel to pass through the second manual setting point j at the second air amount adjustment operation. However, in this case, the first learned control pattern P1 may be moved in parallel to pass through a set point set by the mean value between the first manual setting point h and the second manual setting point j. That is, when ΔTAO<α, the blower voltage control characteristic may be corrected by the mean value of the previous set value and a most new set value.

In the above-described first embodiment, at step S410, when operation information (set value) at n-time operation is approximately equal to operation information (set value) at m-time operation (m<n), the operation information at the n-time may be used for learning, and the operation information at the m-time operation may be not used for learning. Further, at step S410, when the environment conditions at the first operation is approximately equal to the environment conditions at the second operation, and when a time between the first operation and the second operation is short, both first and second operations may be used for learning as one time operation. In this case, the second operation is performed, after the first operation is learned and the blower voltage control characteristic is changed.

That is, at step S410, when the environment conditions at the n-time operation is approximately equal to the environment conditions at the (n+1)-time operation, and when a time period between the n-time operation and the (n+1)-time operation is short, both the operations may be used for learning as one time operation. In this case, the (n+1)-time operation is performed, after the n-time operation is learned and the blower voltage control characteristic is changed.

At step S410 in the first embodiment, when the control system has plural approximate operation informations, the mean value of the plural approximate operation informations may be used for learning. Further, at step S410, when the number of informations to be used for learning in a range of the target air temperature TAO is restricted to a predetermined number p, and newly input p-number informations may be used for learning when the information number is larger than the number p.

In the above-described first embodiment, plural control patterns of the blower voltage may be set relative to the sunlight amount, the outside air amount and the inside air amount, to be learned, respectively. Further, a predetermined control pattern of the blower voltage may be stored for each driver.

In the above-described first embodiment, the standby RAM is used for storing the learned information even when the ignition switch is turned off. However, instead of the standby RAM, a fixed memory may be used so that the learned information is stored even when the ignition switch is turned off. In the above-described first embodiment, when the air-amount increasing switch 371 is pushed one time, the air amount is increased by one level. However, when the air-amount increasing switch 371 is pushed one time, the air amount may be increased by plural levels. Further, the air amount may be increased in accordance with a pushing time of the air-amount increasing switch 371. Similarly, in the above-described first embodiment, when the air-amount decreasing switch 372 is pushed one time, the air amount is decreased by one level. However, when the air-amount decreasing switch 372 is pushed one time, the air amount may be decreased by plural levels. Further, the air amount may be decreased in accordance with a pushing time of the air-amount decreasing switch 372.

In the above-described first embodiment, the control system is typically applied to the blower voltage control (air amount control). However, the control system may be applied to any one control of the set air temperature, the air outlet mode, and the like.

Figure 9:
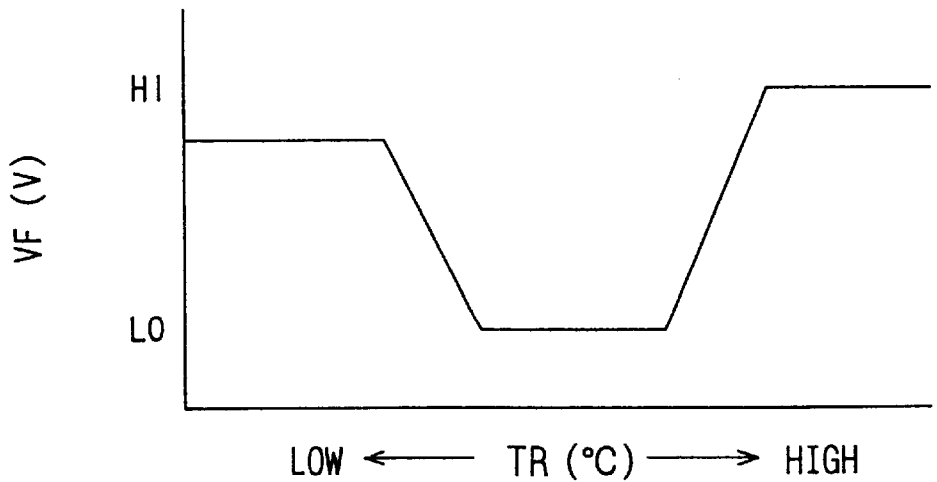
FIG. 9 is a view showing a blower voltage control characteristic according to a second preferred embodiment of the present invention.

A second preferred embodiment of the present invention will be described with reference to FIG. 9. In the above-described first embodiment, the blower voltage VF is determined using the target air temperature TAO. In the second embodiment, the blower voltage VF is determined using the inside air temperature TR which is a control factor for controlling the temperature of the passenger compartment, based on the graph shown in FIG. 9. FIG. 9 is a characteristic view showing a relationship between the inside air temperature TR and the blower voltage VF.

In the above-described first embodiment, it is determined whether or not the difference ΔTAO between the target air temperature at the previous air amount adjustment operation and the target air temperature at the present air amount adjustment operation is equal to or larger than the set value α, and the correction method of the blower voltage control characteristic is determined based on the determination result. However, in the second embodiment, it is determined whether or not the difference ΔTR between the inside air temperature TR at the present air amount adjustment operation and the inside air temperature TR at the previous air amount adjustment operation is equal to or larger than the set value β(e,g., 1° C.), and the correction method of the blower voltage control characteristic is determined based on the determination result.

When ΔTR≧β, it is estimated the air blowing amount is reset for a passenger's desire, in accordance with a change of the inside air temperature TR of the passenger compartment. In this case, the blower voltage control characteristic shown in FIG. 9 is corrected by the same method as that when ΔTAO≧α at step S420. That is, when ΔTR≧β, during the second air amount adjustment operation, the tilt of the control pattern (control line) is changed to pass through the first manual setting point and the second manual setting point. Further, during the third air amount adjustment operation, the control line is changed to a line which is obtained by an least-squares approximate of the first manual setting point, the second manual setting point and the third manual setting point.

On the other hand, when ΔTR<β, it is estimated that the passenger's desired air amount is not set by one previous control operation. Therefore, the blower voltage control characteristic shown in FIG. 9 is corrected by the same method as that when ΔTAO<α at step S420. That is, when ΔTR<β, during the second air amount adjustment operation, the first learned control pattern is used as the original control pattern, and the tilt line of the first learned control pattern is moved in parallel to pass through the second manual setting point so that the second learned control pattern is obtained.

Even when the blower voltage control characteristic is corrected in accordance with the determination result of the difference ΔTR of the inside air temperature TR, the effect similar to that of the first embodiment can be obtained.

In the above-described second embodiment, the blower voltage control characteristic is corrected in accordance with the determination whether or nor the difference ΔTR between the inside air temperature TR at the previous air amount adjustment operation and the inside air temperature at the present air amount adjustment operation is equal to or larger than β. However, between the present air amount adjustment operation and the previous air amount adjustment operation, it may be determined whether or not a difference of the outside air amount TAM and a difference of the sunlight amount TS are equal to or larger than set values, respectively. In this case, when any one of the difference of the outside air amount TAM and the difference of the sunlight amount TS is smaller than the set value, the blower voltage control characteristic is corrected by the same method as that when ΔTAO<α at step S420.

A third preferred embodiment of the present invention will be now described with reference to FIGS. 10–12. In the third embodiment, after plural informations (set values) are stored, operation informations to be used for correcting the blower voltage control characteristic (air amount control characteristic) are selected among the plural stored informations. In the third embodiment, the structure of the vehicle air conditioner is similar to that of the above-described first embodiment. In the third embodiment, a part of the control operation of the microcomputer 31 is changed.

Next, a learning method of the blower voltage control characteristic will be now described with reference to FIG. 10. In the third embodiment, the controls at steps S100–S700 are similar to those of first embodiment shown in FIG. 2. However, in the third embodiment, at step S400 in FIG. 2, only the control operations at steps S430 and S440 shown in FIG. 3 are performed.

Figure 10:
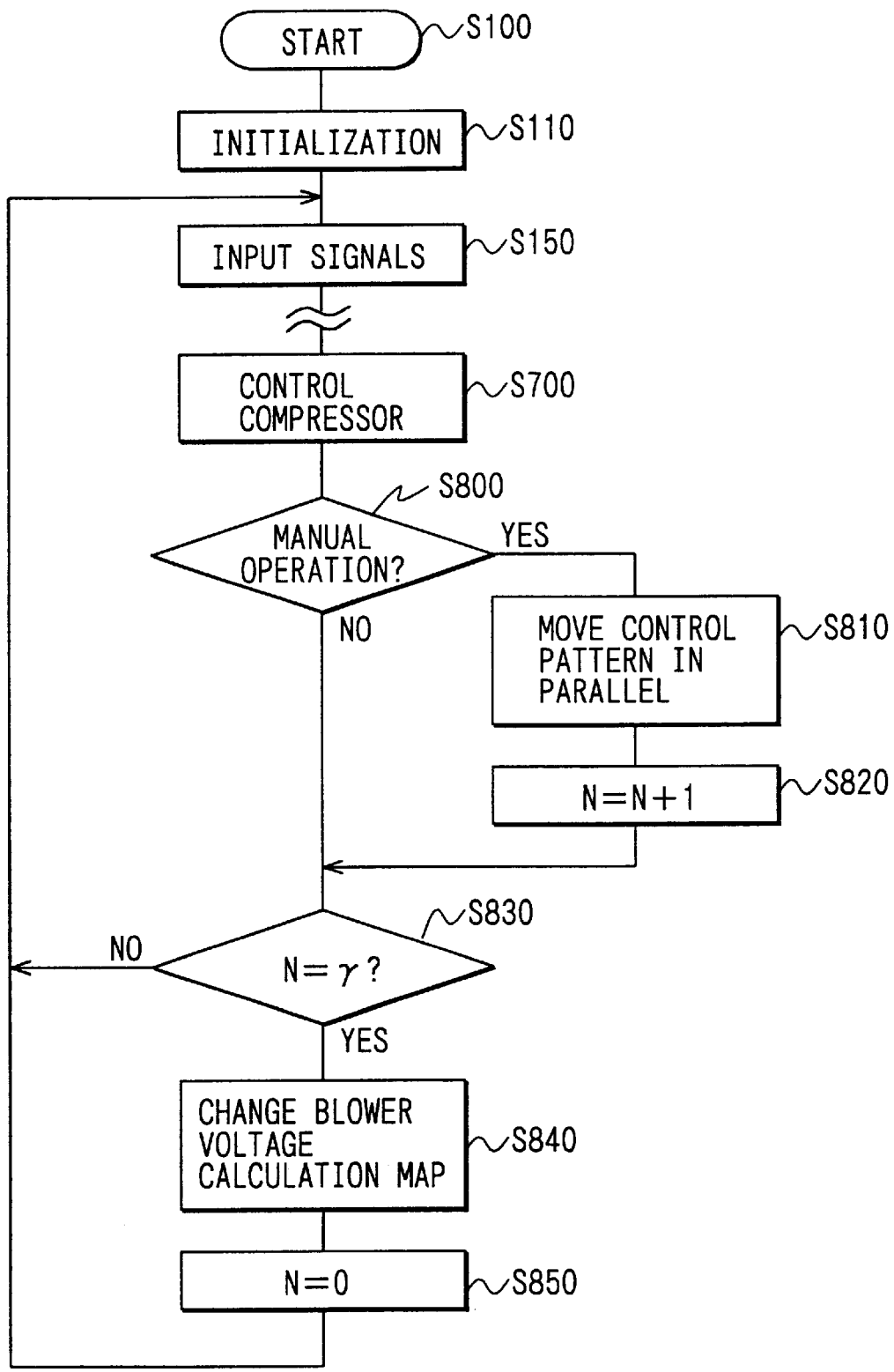
FIG. 10 is a flow diagram showing a main control of a vehicle air conditioner according to a third preferred embodiment of the present invention.

As shown in FIG. 10, after steps S100–S700 are performed, the control of step S800 is performed. That is, at step S800, it is determined whether or nor the air amount is manually set (changed) by the operation portion 37. When it is determined that the air amount is manually set at step S800, the operation information is stored and the control pattern of the blower voltage control characteristic is only moved in parallel to pass a manual setting point at step S810. Next, at step S820, the manual setting number N is increased by one time (N=N+1). An initial value of the manual setting number is zero.

Next, the control routine moves to step S830. Even when the manual operation is not determined at step S800, the control of step S830 is also performed. At step S830, it is determined whether or not the manual setting number N is equal. to a predetermined number γ (e.g., γ=5). When the manual setting number N is not equal to the predetermined number γ, it is determined that the stored information are insufficient, and control routine returns to step S150 so that the air conditioning control is repeated.

On the other hand, when the manual setting number N is equal to the predetermined number γ, the blower voltage control characteristic (blower voltage calculation map) is changed based on the plural stored operation informations (e.g., five operation informations). Next, at step S850, the manual setting number N is reset to zero.

Figure 11:
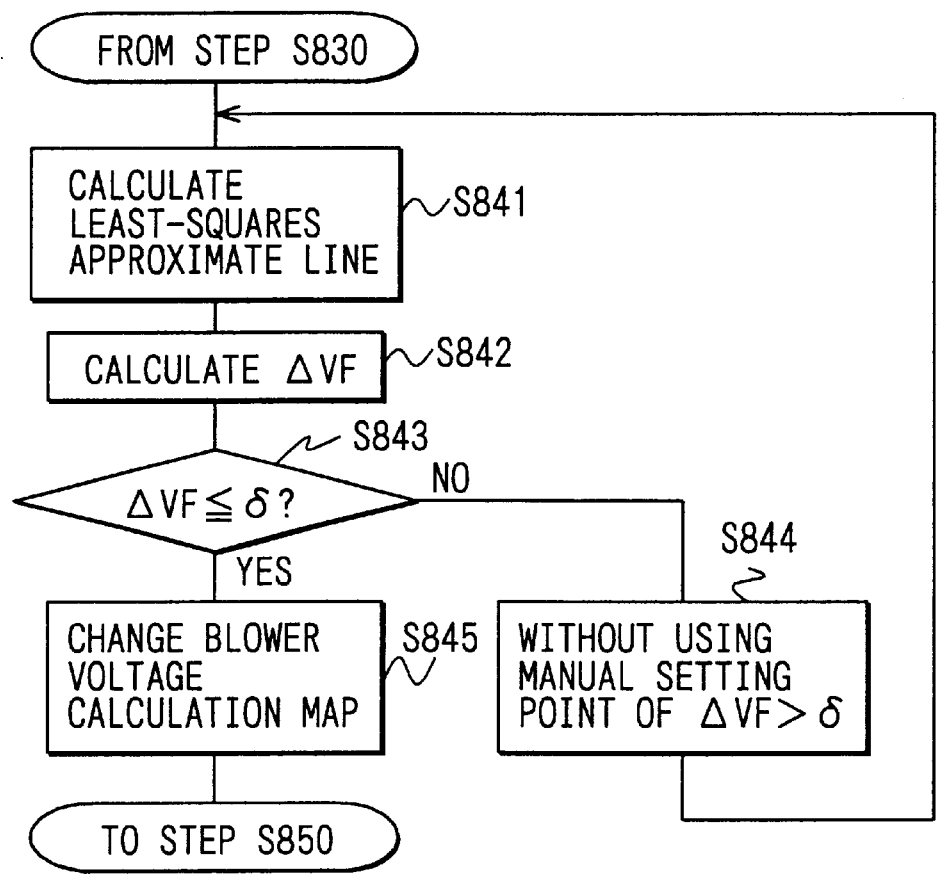
FIG. 11 is a flow diagram showing a detail control of step S840 in FIG. 10, according to the third-embodiment.
Figure 12:
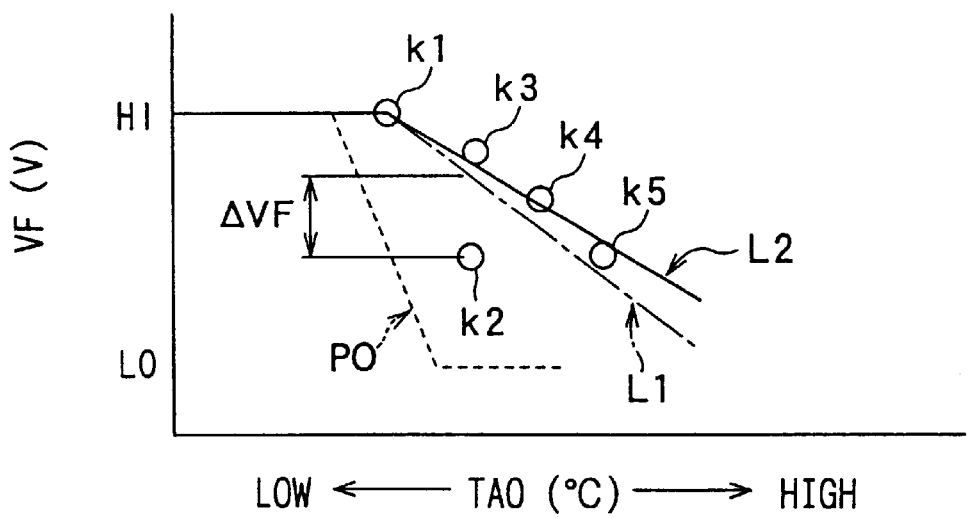
FIG. 12 is a view showing a blower voltage control characteristic according to the third embodiment.

The flow diagram of FIG. 11 shows the detail control of step S840 in FIG. 10. Next, the learning method of the blower voltage control characteristic will be explained with reference to FIGS. 11 and 12. In FIG. 12, k1, k2, k3, k4 and k5 indicate manual setting points at which the air amount is manually set. First, at step S841 in FIG. 11, the least-squares approximate line of the five manual setting points is calculated. The line L1 of FIG. 12 indicates the result calculated first at step S841, and the line L1 is a temporary characteristic line in which a change of the blower voltage control characteristic is not performed.

Next, at step S842, a blower voltage difference ΔVF between the temporary characteristic line L1 and each manual setting point k1–k5 is calculated. Next, at step S843, it is determined whether or not each of the five blower voltage differences ΔVF at the five setting points k1–k5 is equal to or lower than a set value δ (e.g., 3V). When any one ΔVF is larger than δ among the five blower voltage differences ΔVF, the control routine moves to step S844. At step S844, the manual setting point (e.g., the manual setting point k2) where ΔVF>δ is not used for learning. That is, the stored plural informations are separated into a correction operation information used for correcting the blower voltage control characteristic, and an unnecessary learning information.

Thereafter, at step S841, the least-squares approximate line L2 of the four manual setting points except the manual setting point k2 is calculated. In this case, the unnecessary leaning information is not used in the calculation, and the line L2 calculated secondary has a characteristic more close to the passenger's desire. The line L2 is also a temporary characteristic line in which the change of the blower voltage control characteristic is not performed.

Next, at step S842, the blower voltage differences ΔVF between the temporary characteristic line L2 and manual setting points except for the manual setting point k2 are calculated. Next, at step S843, it is determined whether or not each of the four blower voltage differences ΔVF at the four setting points is equal to or lower than the set value δ (e.g., 3V). When each of the four blower voltage differences ΔVF is equal to or smaller than δ, it is determined that the temporary characteristic line L2 is the characteristic line corresponding to the passenger's desire, and the control routine moves to step S845. Next, at step S845, the blower voltage control characteristic (blower voltage calculation map) is corrected so that the tilt part of the original control pattern P0 is changed to the line L2. Thereafter, the blower voltage VF is determined and calculated based on the corrected blower voltage control characteristic.

According to the third embodiment, after plural operation information are stored, the operation information to be used for correcting the blower voltage control characteristic are selected among the plural operation informations, and an operation information (unnecessary leaning information), which is estimated to be impossible to set a passenger's desired air amount, is not used for learning. Therefore, an air-blowing characteristic corresponding to the passenger's desire can be obtained while a mis-learning is prevented, and pleasant air-conditioning can be performed.

In the third embodiment, the plural operation information are totally learned in the microcomputer 31, a change of the air conditioning operation with each input operation information can be restricted.

Figure 13:
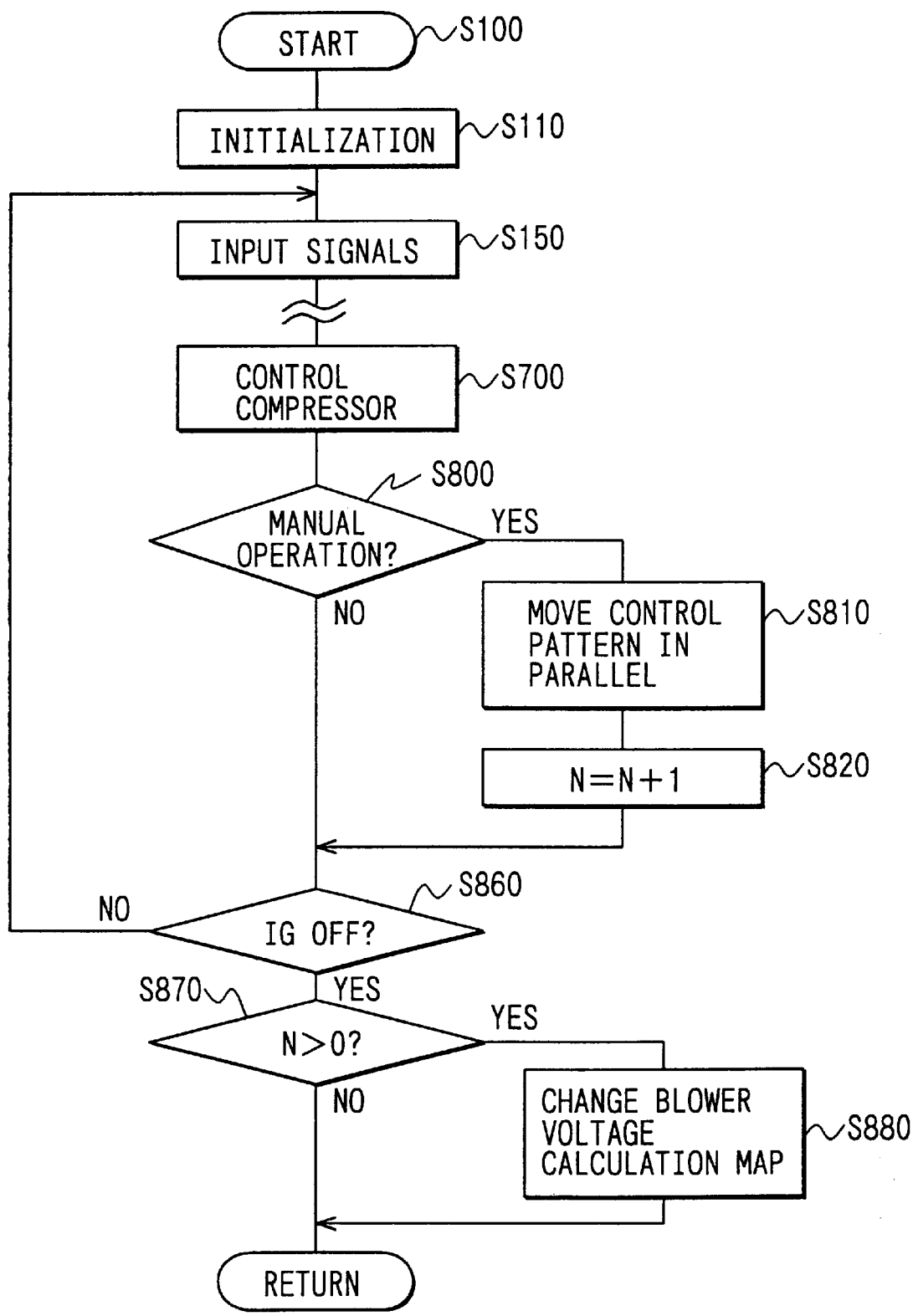
FIG. 13 is a flow diagram showing a main control of a vehicle air conditioner according to a fourth preferred embodiment of the present invention.

A fourth preferred embodiment of the present invention will be now described with reference to FIG. 13. In the fourth embodiment, the blower voltage control characteristic is corrected when plural operation information are stored, similarly to the above-described third embodiment. In the fourth embodiment, as shown in FIG. 13, the control operations at steps S100–S820 are similar to those of FIG. 10 in the third embodiment. In the fourth embodiment, the control operations at step S830–S850 in FIG. 10 is changed to that at step S860–S880 in FIG. 13.

Next, the learning method of the blower voltage control characteristic according to the fourth embodiment will be now described with reference to FIG. 13. In FIG. 13, when it is determined that the air amount is manually set at step S800, the operation information is stored and the control pattern of the blower voltage control characteristic is only moved in parallel to pass through a manual setting point at step S810. Next, at step S820, the manual setting number N is increased by one time (N=N+1). An initial value of the manual setting number is zero.

Next, the control routine moves to step S860. Even when the manual operation is not determined at step S800, the control of step S860 is also performed. At step S860, it is determined whether or not the ignition switch (IG) is turned off. When the ignition switch is not turned off, the control routine returns to step S150, and the air-conditioning operation is repeated. When it is determined that the ignition switch is turned off at step S870, the manual setting number N is counted at step S870. When N=0, that is, when the manual setting number N is not larger than zero, it is determined a manual air amount setting operation is not performed, and the blower voltage control characteristic is not corrected.

On the other hand, when N>0, the blower voltage control characteristic (blower voltage calculation map) is corrected based on the stored operation information at step S880. The control operation at step S880 is the same as that at step S840 of the third embodiment.

According to the fourth embodiment, after the ignition switch is turned off, the operation information to be used for correcting the blower control characteristic are selected among the stored plural operation informations, and an operation information (unnecessary leaning information), which is estimated to be impossible to set a passenger's desired air amount, is not used for learning. Therefore, an air-blowing characteristic corresponding to the passenger's desire can be obtained while a mis-learning is prevented, and pleasant air-conditioning can be performed.

Figure 14:
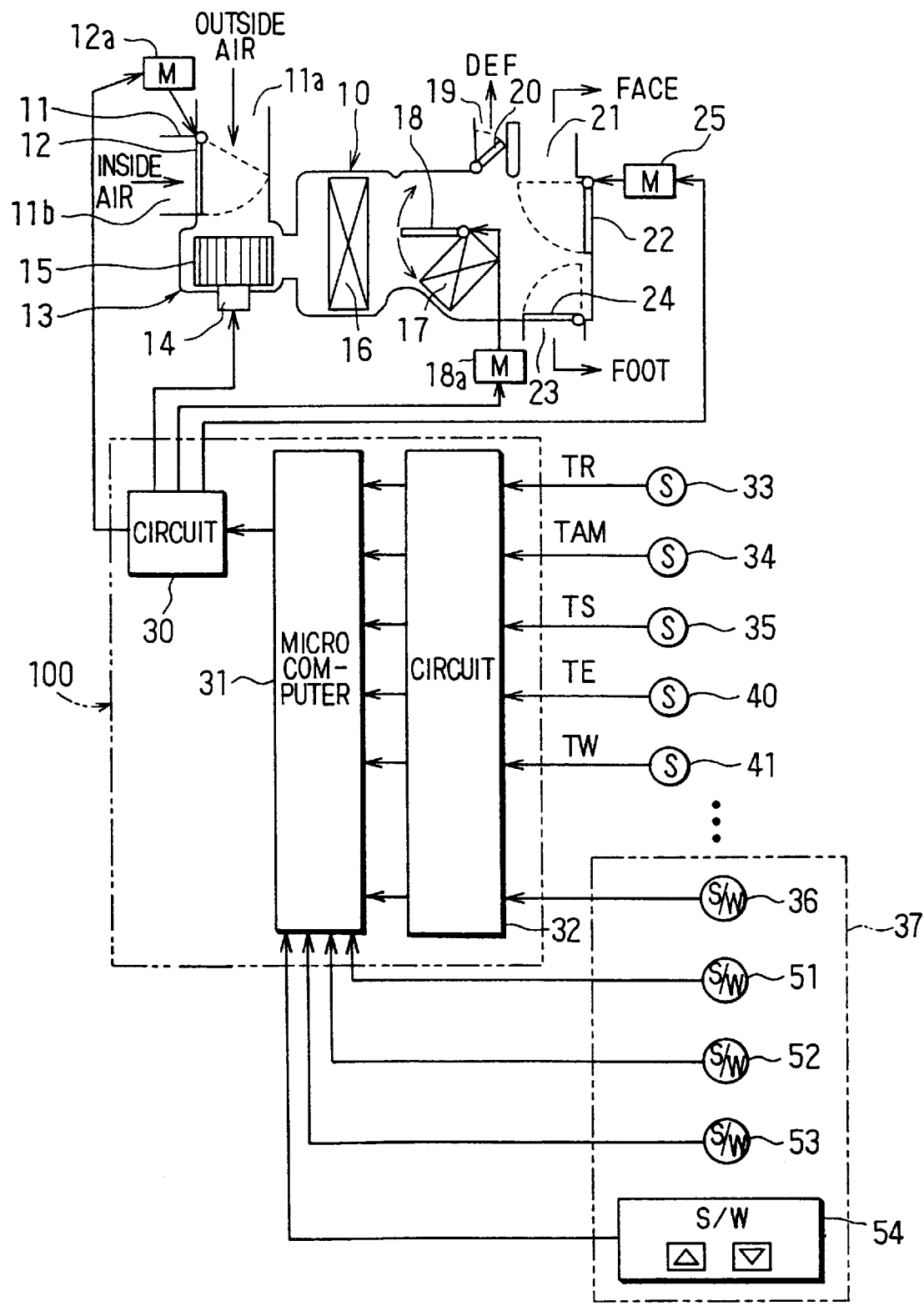
FIG. 14 is a schematic diagram showing an entire structure of a vehicle air conditioner according to a fifth preferred embodiment of the present invention.

A fifth preferred embodiment of the present invention will be now described with reference to FIGS. 14–19C. In the fifth embodiment, components of a vehicle air conditioner similar to those of the first embodiment shown in FIG. 1 are indicated with the same reference numbers, and the detain explanation thereof is omitted. As shown in FIG. 14, the inside/outside air switching door 12 is rotatably disposed in the inside/outside air switching box 11 to open and close the outside air introduction port 11a and the inside air introduction port 11b. The inside/outside air switching door 12 is driven by an actuator 12a to adjust a ratio between an amount of air introduced from the outside air introduction port 11a and an amount of air introduced from the inside air introduction port 11b.

A rotation position of the air mixing door 18 is adjusted by an actuator 18a. Accordingly, a ratio between an air amount passing through the heater core 17 and an air amount bypassing the heater core 17 is adjusted, so that temperature of air blown into the passenger compartment is adjusted. Further, for setting an air outlet mode such as the face mode, the bi-level mode, the foot mode, the foot/defroster mode and the defroster mode, the doors 20, 22, 24 are driven by an actuator 25.

A control unit 100 for controlling operation of the vehicle air conditioner includes the driving circuit 30, the microcomputer 31, and the level converting circuit 32 and the like.

An air blowing amount from the blower 13 is controlled in the driving circuit 30 driving the blower motor 14, in accordance with an output signal from the microcomputer 31. The actuators 12a, 18a, 25 of the doors 12, 18, 20, 22, 24 are also controlled in the driving circuit 30 based on output signals from the microcomputer 31. The microcomputer 31 has therein a CPU, a ROM, a RAM, a standby RAM, an I/O port, an A/D converter and the like.

The standby RAM is for storing (back up) a learning value of a request of a passenger even when an ignition switch (IG) is turned off. Even when the ignition switch (IG) is turned off, electrical power is directly supplied to the standby RAM from a battery. Even when electrical power is not supplied by the battery, a back-up electrical power is supplied to the microcomputer 31 in a short time.

Output signals from an operation portion 37 disposed on the instrument panel of the passenger compartment are input into the microcomputer 31. The operation portion 37 has an automatic switch (AUTO switch) 51 for setting an automatic control state of the vehicle air conditioner, a manual inside/outside air selecting switch 52 for manually setting an inside/outside air introduction mode, a manual air outlet mode selecting switch 53 for manually selecting an air outlet mode such as the defroster mode, the face mode, the foot mode, the bi-level mode and the foot mode, a manual air-blowing setting switch 54 for manually setting an air blowing amount of the fan 15, the temperature setting switch 36 for setting a passenger's desired temperature, and the like.

Signals from a sensor group detecting environment conditions relative to an air conditioning state within the passenger compartment are input into the microcomputer 31. Specifically, the sensor group includes the inside air temperature sensor 33 for detecting temperature TR of inside air inside the passenger compartment, the outside air temperature sensor 34 for detecting temperature TAM of outside air outside the passenger compartment, the sunlight sensor 35 for detecting a sunlight amount TS entering into the passenger compartment, an evaporator air temperature sensor 40 for detecting an air temperature TE blown from the evaporator 16, a water temperature sensor 41 for detecting a water temperature TW circulating in the heater core 17, and the like. These signals from the sensors 33–35 and 40, 41 are input into the microcomputer 31 through the level converting circuit 32, and are read in the microcomputer 31 after being A/D converted.

Figure 15:
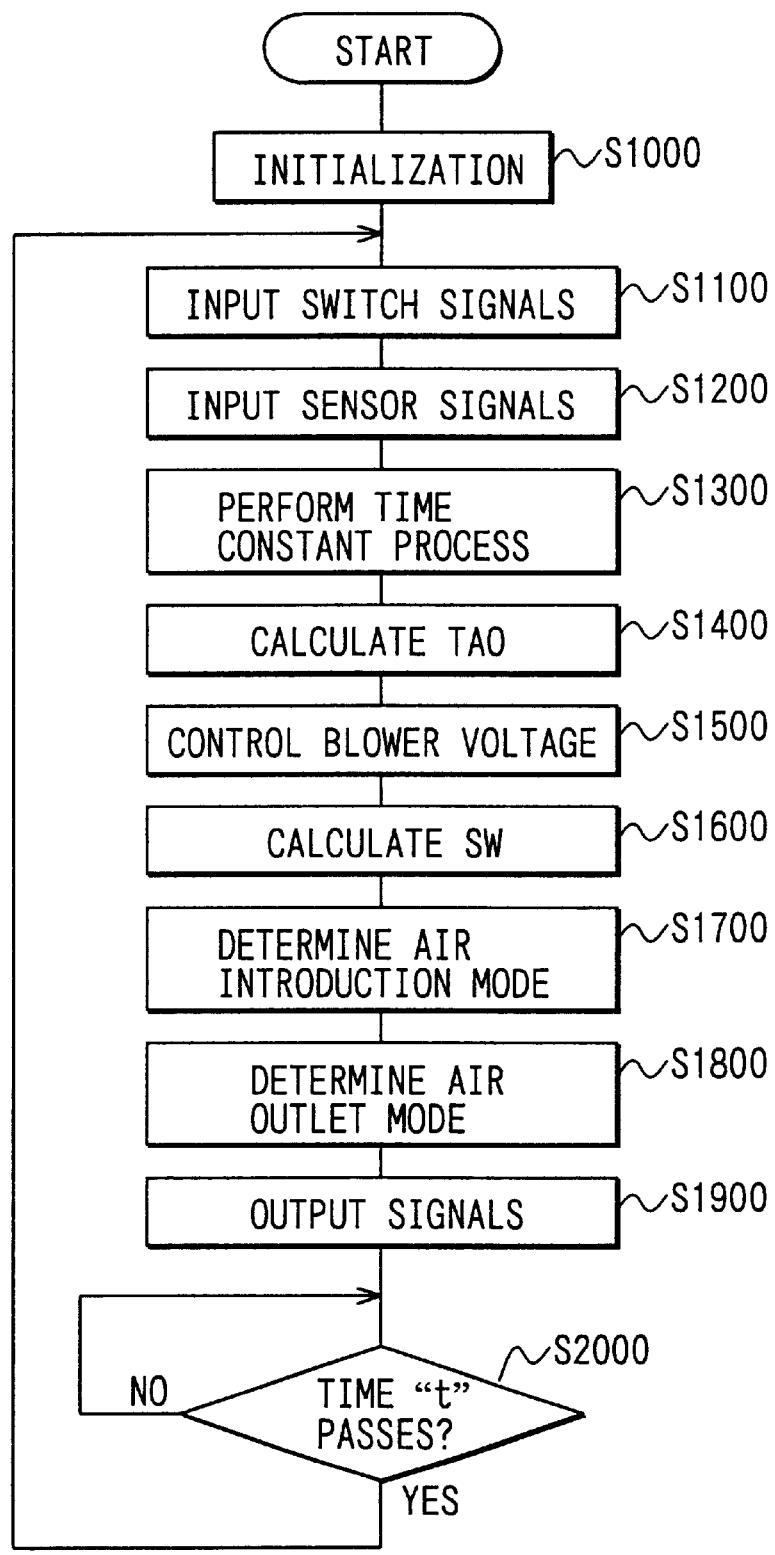
FIG. 15 is a flow diagram showing a base control of the vehicle air conditioner according to the fifth embodiment.

FIG. 15 shows a base control of the control unit according to the fifth embodiment. Operation of the microcomputer 31 starts when the ignition switch (IG) is turned on. First, at step S1000, initialization of various conversions, flag setting and the like is performed. At step S1100, operation signals from the switches 36, 37, 51–54 are input. Next, at step S1200, sensor signals (environment-condition signals) from the sensors 33–35, 40, 41 are input.

Next, at step S1300, a time constant process relative to a detected value of the sunlight sensor 35 is performed based on the following formula (2).

$$TS_{new} = (1/a) \times TS + [(a-1)/a] \times TS_{old} \quad (2)$$

Wherein, $TS_{new}$ is a sunlight amount after the time constant process at the present time, TS is the detected value of the sunlight amount sensor read at step S1200, and $TS_{old}$ is the sunlight amount after the previous time constant process, and "a" is a time constant in a control cycle.

Next, at step S1400, the target air temperature TAO is calculated based on the above-described formula (1). However, in the fifth embodiment, instead of the sunlight amount TS detected by the sunlight sensor 35, the sunlight amount $TS_{new}$ after the time constant process is used.

Next, at step S1500, a blower voltage applied to the blower motor 14 is controlled based on the target air temperature TAO calculated at step S1400. Accordingly, a rotation speed of the fan 15 is controlled so that an air-blowing amount blown into the passenger compartment is controlled. However, a desired air-blowing amount for a passenger has individual variation, and is difficult to be uniformly determined. In the fifth embodiment, the desired air-blowing amount of the passenger is learned while the passenger manually operates, so that an air-blowing characteristic accurately reflecting a passenger's desire can be obtained.

Next, at step S1600, a target opening degree SW of the air mixing door 18 is calculated by using the following formula (3), based on the target air temperature TAO calculated at step S1500, the water temperature TW of the engine-cooling water and the evaporator air temperature TE of air immediately after the evaporator 16.

$$SW=[(TAO-TE)/(TW-TE)] \times 100\ (\%) \quad (3)$$

The water temperature TW of the engine-cooling water is input from the water temperature sensor 41, and the evaporator air temperature TE immediately after the evaporator 16 is input from the evaporator air temperature sensor 40.

Figure 16:
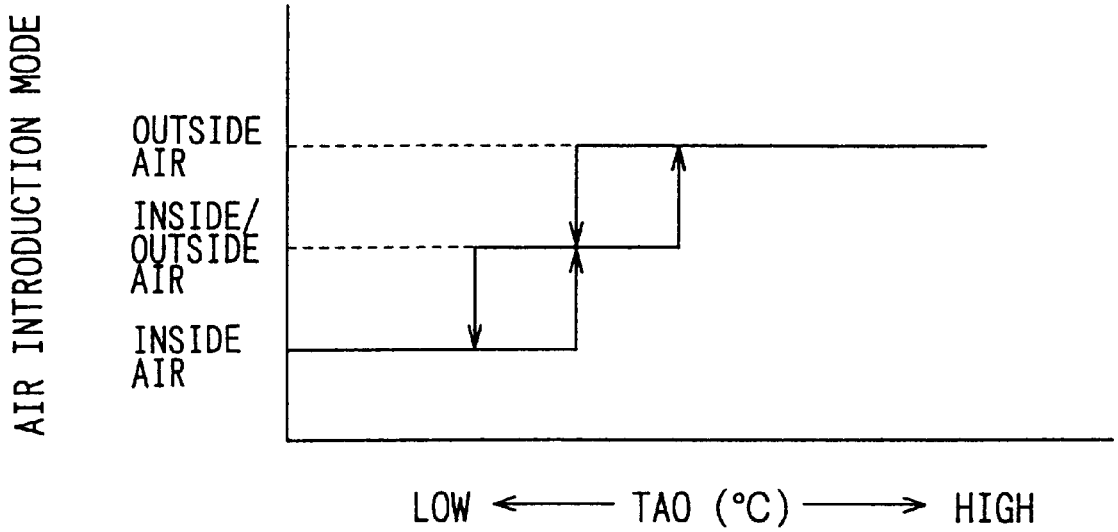
FIG. 16 is a characteristic view of an inside/outside air introduction mode according to the fifth embodiment.
Figure 17:
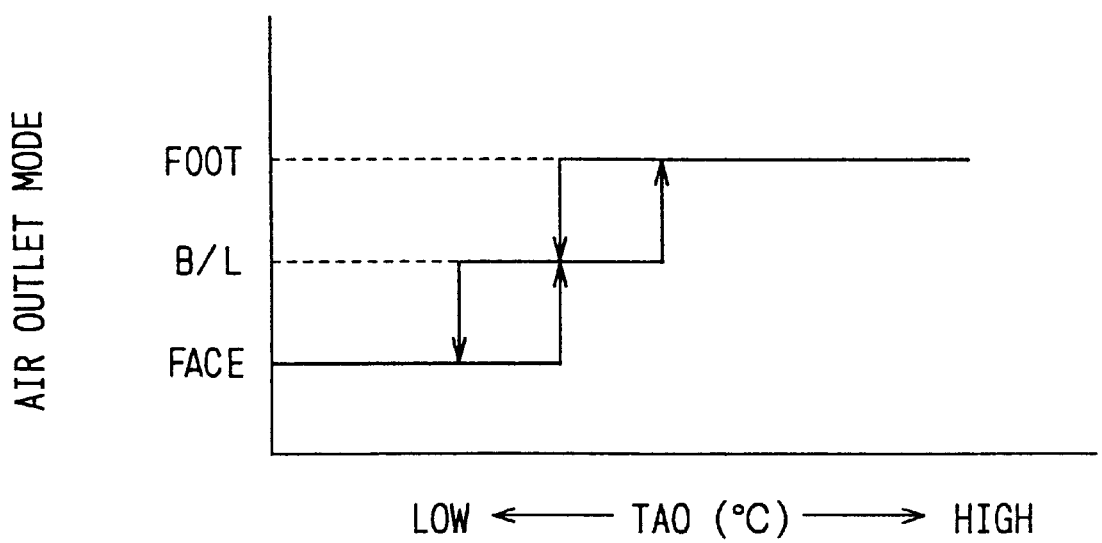
FIG. 17 is a characteristic view of an air outlet mode according to the fifth embodiment.

Next, at step S1700, an inside/outside air introduction mode due to the operation position of the inside/outside air switching door 12 is determined based on the graph shown in FIG. 16. Next, at step S1800, an air outlet mode is determined based on the graph shown in FIG. 17. Thereafter, at step S1900, control signals determined at step 51500–S1800 are output to the actuators 12a, 18a, 25 through the driving circuit 30 to control the rotation speed of the blower motor 14 and the actuators 12a, 18a, 25.

Thereafter, at step S2000, it is determined whether or not a predetermined time "t" (predetermined period) passes. After the predetermined time passes, the control routine returns at step S1100.

The blower voltage determined at step S1500 in FIG. 15 will be explained in detail with reference to FIG. 18. First, at step S1501, it is determined whether or not the air amount is manually set (changed) by a passenger based on the signals input at step S110. When the air amount is manually set by the passenger, the blower voltage control characteristic is corrected. Generally, the blower voltage is made larger when the target air temperature TAO is at a high temperature side or at a low temperature side, and is made smaller when the target air temperature TAO is in a middle temperature area, as shown in FIGS. 19A–19C.

At step S1502, the blower voltage control characteristic is corrected using the detected sunlight amount TS without performing the time constant process, as an input signal. That is, the sensor signals of the sunlight amount TS, the outside air temperature TAM and the inside air temperature TR are stored, and the blower voltage control characteristic is corrected.

According to the fifth embodiment, the blower voltage control characteristic is corrected using the detected sunlight amount TS, the blower voltage control characteristic can be accurately corrected under the actual sunlight feeling of the passenger. Accordingly, the blower voltage control characteristic corresponding to a passenger's feeling can be readily obtained.

Here, the correction of the blower voltage control characteristic due to step S1502 will be explained in detail with reference FIGS. 19A–19C. As shown in FIG. 19A, the control line A shows an original control characteristic stored in the ROM of the microcomputer 31, and is suitable for general passengers. Accordingly, when any one manual operation for setting the blower voltage is not performed (learned), the blower voltage (air blowing amount) is determined based on the original control line A.

In a case where the blower voltage is at a blower voltage level a (maximum level) on the original control line A, when the blower voltage is decreased from the blower voltage level a to a blower voltage level a' by a first manual operation of the passenger, the tilt part of the original control line A is moved in parallel to a left side to pass through the operation point a'. The solid line B in FIG. 19A shows the blower voltage control characteristic after the first passenger's operation is learned. That is, the solid line B in FIG. 19A is a first learned control line.

Next, in a case where the blower voltage is at a blower voltage level b on the first learned control line B, when the blower voltage is increased from the blower voltage level b to a blower voltage level b' by a second manual operation of the passenger, the tilt angle of the tilt part of the first learned control line B is changed to pass through both the operation points a', b'. The solid line C in FIG. 19B shows the blower voltage control characteristic after the second passenger's operation is learned. That is, the solid line C in FIG. 19B is a second learned control line.

Next, in a case where the blower voltage is at a blower voltage level c on the second learned control line C, when the blower voltage is decreased from the blower voltage level c to a blower voltage level c' by a third manual operation of the passenger, the tilt angle of the tilt part of the second learned control line C is changed so that a line approximating the operation points a', b', c' is obtained. For example, a least-squares approximate line D of the three operation points a', b', c' is used as a third learned control line, as shown in FIG. 19C. That is, the solid line D in FIG. 19C is a third learned control line. Relative to the passenger's operation points more than three times, the tilt angle of the tilt part of the control line is changed to a line (e.g., least-squares approximate line) approximating each operation point.

After the blower voltage control characteristic is corrected at step S1502, the blower voltage is determined in accordance with the corrected blower voltage control characteristic at step S1503 based on the target air temperature TAO.

On the other hand, when the manual operation for controlling the air blowing amount is not determined at step S1501, the blower voltage is determined in accordance with the previous learned blower voltage control characteristic at step S1504. When any a manual operation for setting the air blowing amount is not performed, the blower voltage is determined in accordance with the original control characteristic A shown in FIG. 19A at step S1504. In the fifth embodiment, after the blower voltage control characteristic is corrected, the newly corrected blower voltage control characteristic is stored at step S1504.

According to the fifth embodiment, because the blower voltage control characteristic is corrected using the directly detected sunlight amount TS, the blower voltage control characteristic can be accurately corrected under a sunlight condition which is directly sensed by the passenger. Accordingly, a suitable blower voltage control characteristic corresponding to the passenger's feeling can be obtained by reduced operation number.

On the other hand, when the target air temperature TAO for an automatic air-conditioning control is calculated, the sunlight amount $TS_{new}$ after performing the time constant process is used. Therefore, even when the detection value of the sunlight amount sensor 41 is greatly changed, the general automatic air-conditioning control of the vehicle air conditioner is hardly affected by the variation in the detected sunlight amount TS.

In the above-described fifth embodiment, the time constant process is performed for the sunlight amount among the environment conditions. However, the time constant process can be performed for the detected inside air temperature TR of the inside air temperature sensor 33 or the detected outside air temperature TAM of the outside air temperature sensor 34, for stabilizing the general air conditioning control. Even in this case, the blower voltage control characteristic is corrected using the detected inside air temperature TR or the detected outside air temperature TAM. Accordingly, the inside air temperature or the outside air temperature, corresponding to a passenger's sense, can be accurately learned, and the blower voltage control characteristic can be accurately controlled.

In the above-described fifth embodiment, the detected value of the sunlight amount sensor 35 is directly used for the correction of the blower voltage control characteristic (learning control for learning the manual operation). However, the time constant process at step S1300 in FIG. 15 can be divided into a first process for the general air-conditioning control and a second process for the learning control (e.g., the correction of the blower voltage control characteristic). In the general air-conditioning control, the detected sunlight amount TS is corrected to $TS_{new1}$ using the above-described formula (2). In the formula (2), the time constant determining the "a" in the formula (2) is as a first time constant t1. On the other hand, in the learning control, the detected sunlight amount TS is corrected to $TS_{new2}$ in accordance the following formula (4).

$$TS_{new2} = (1/r) \times TS + [(r-1)/r] \times TS_{old} \quad (4)$$

Wherein, $TS_{new2}$ is a sunlight amount after the time constant process at the present time for the learning control, TS is the detected value of the sunlight amount sensor read at step S1200, and $TS_{old}$ is the sunlight amount after the previous time constant process, and "r" is a second time constant t2 in a control cycle. Because the first time constant t1 and the second time constant t2 are set so that t1>t2, "a" in the formula (2) is larger than "r" in formula (4). Because t1>t2, the sunlight amount after the time constant process for the learning control is close to the detected value of the sunlight amount sensor 35.

In the fifth embodiment, among the control characteristics for automatically controlling the air conditioning state of the passenger compartment, the blower voltage control characteristic is corrected after the passenger's operation is learned. However, similarly to the correction of the blower voltage control characteristic, the control characteristic of the inside/outside air introduction mode shown in FIG. 16 or the control characteristic of the air outlet mode shown in FIG. 17 can be corrected after a passenger's operation is learned.

Figure 18:
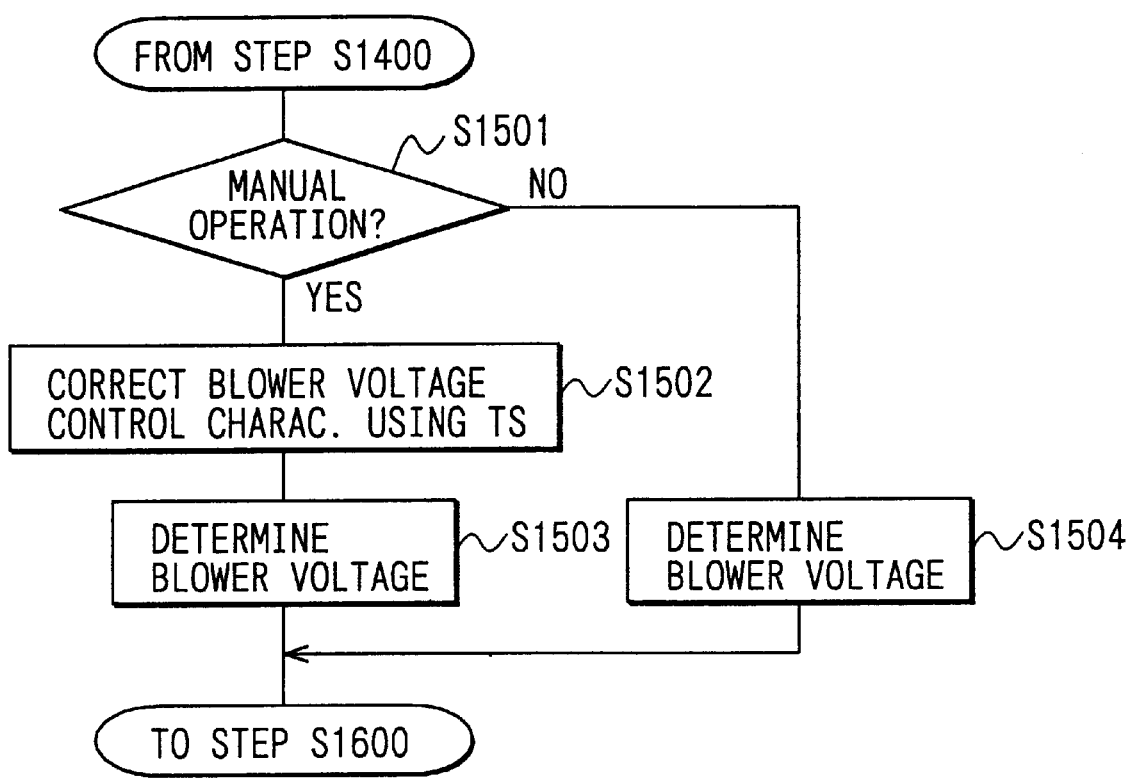
FIG. 18 is a flow diagram showing a main control of the vehicle air conditioner according to the fifth embodiment.
Figure 19A:
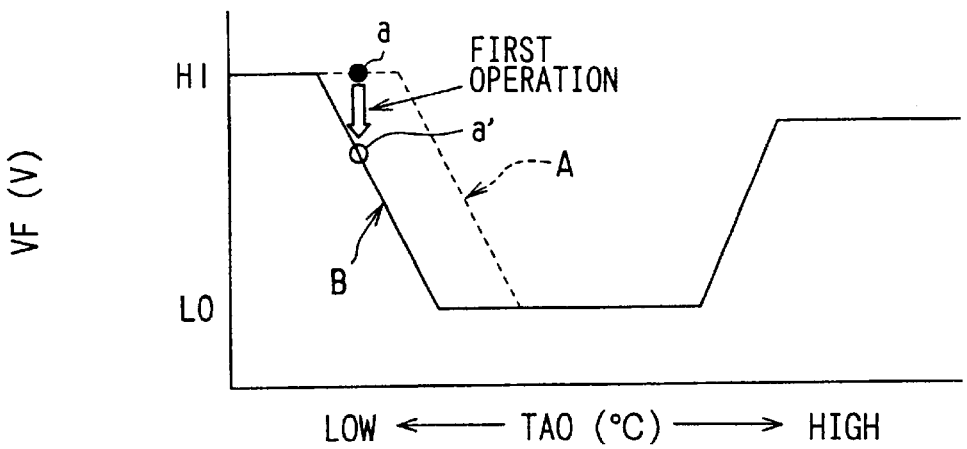
FIGS. 19A–19C are views for explaining a correction method of a blower voltage control characteristic according to the fifth embodiment.
Figure 19B:
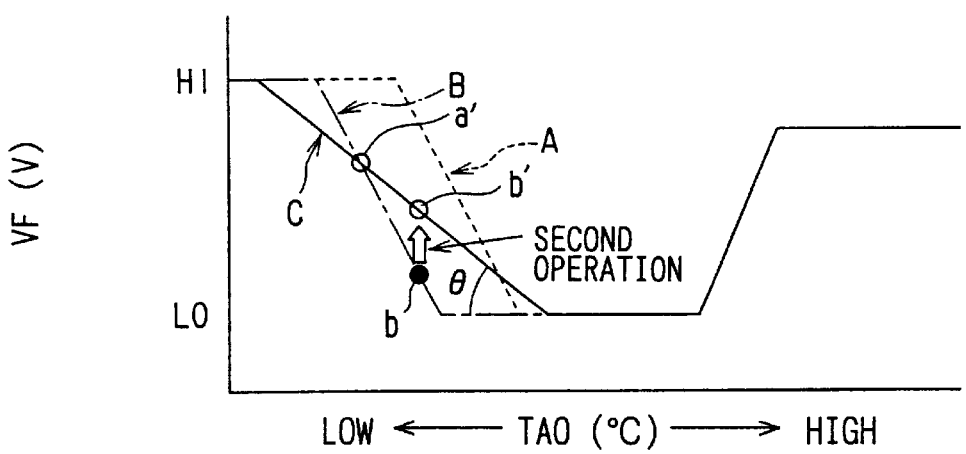
Figure 19C:
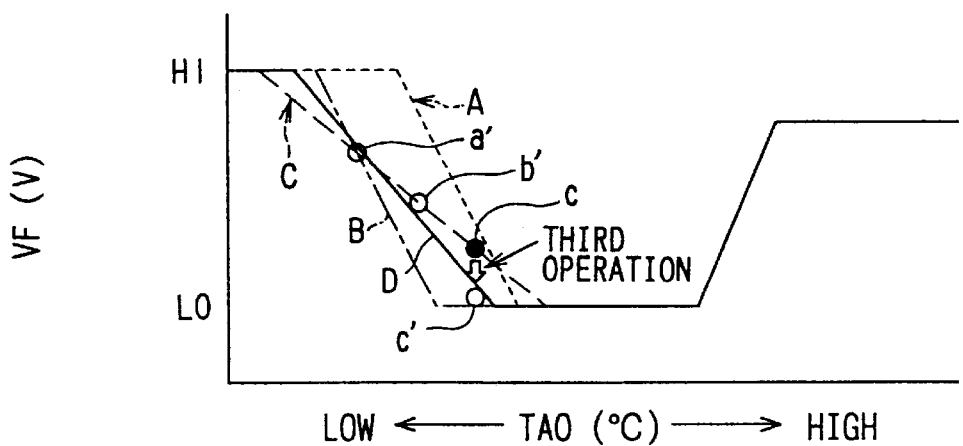

In the above-described fifth embodiment, when the manual operation is determined at step S1501 in FIG. 18, the learning of the passenger's operation is performed. When plural operation informations close to the detection value of the sunlight amount sensor 35 are learned during the learning of the passenger's operation, the mean of the plural operation information may be used for the correction of the blower voltage control characteristic.

In the above-described fifth embodiment, the time constant process is performed for slowly changing a degree of a sensor detection value, in the general air conditioning control. However, instead of the time constant process, a slow control for slowly changing the sensor detection value can be used.

A sixth preferred embodiment of the present invention will be now described with reference to FIGS. 20 and 21. In the above-described fifth embodiment, the blower voltage (air blowing amount) is determined based on the target air temperature TAO. That is, the blower voltage control characteristic is set by one input of the target air temperature TAO. In the sixth embodiment, the blower voltage is determined by inputting the inside air temperature TR, the outside air temperature TAM and the sunlight amount TS, respectively, and the blower voltage control characteristic is corrected by learning of the passenger's operation.

Figure 20:
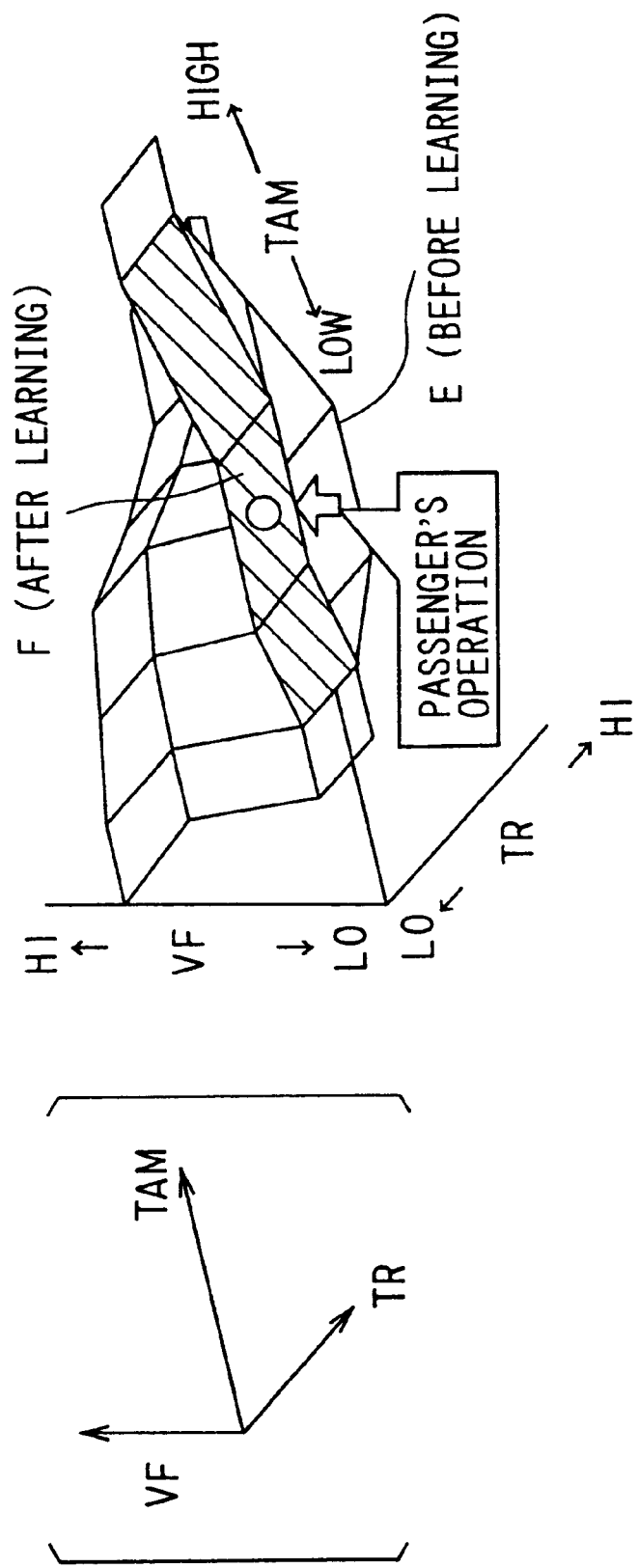
FIG. 20 is a three-dimensional map showing a blower voltage control characteristic according to a sixth preferred embodiment of the present invention.
Figure 21:
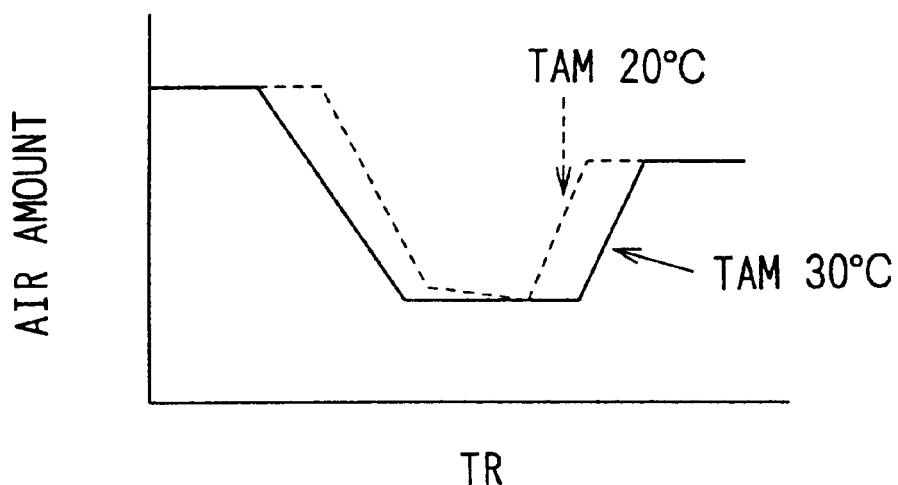
FIG. 21 is a two-dimensional map showing a blower voltage control characteristic according to the sixth embodiment.

FIG. 20 is a three-dimensional graph showing an air amount control characteristic (blower voltage control characteristic) according to the sixth embodiment when the sunlight amount is set at 500 w/m². In FIG. 20, E indicates the air amount control characteristic before learning the passenger's operation, and F indicates the air amount control characteristic after learning the passenger's operation. FIG. 21 is a two-dimensional graph showing an air amount control characteristic (blower voltage control characteristic) according to the sixth embodiment when the sunlight amount is set at 500 w/m². For example, when the outside air temperature and the sunlight amount are set, the air amount can be determined by the inside air temperature.

According to the sixth embodiment, even when the environmental conditions such as the inside air temperature, the outside air temperature and the sunlight amount are respectively input for determining the blower voltage, the learning effect corresponding to the passengers desire can be obtained by using the detection values of the sensors 33–35 or using approximate values approximating the detection values.

A seventh preferred embodiment of the present invention will be now described with reference to FIGS. 22–27. In the seventh embodiment, the structure of a vehicle air conditioner is similar to that shown in FIG. 14 of the above-described fifth embodiment, and the explanation thereof is omitted. In the seventh embodiment, the standby RAM of the microcomputer 31 stores a temperature setting map shown in FIG. 22. A set temperature is stored in each mass corresponding to the inside air temperature TR and the outside air temperature RAM in the temperature setting map. Hereinafter, a set temperature stored in the temperature setting map in FIG. 22 of the standby RAM is referred to as "a stored set temperature Tset (Tr, Tam).

Figure 23:
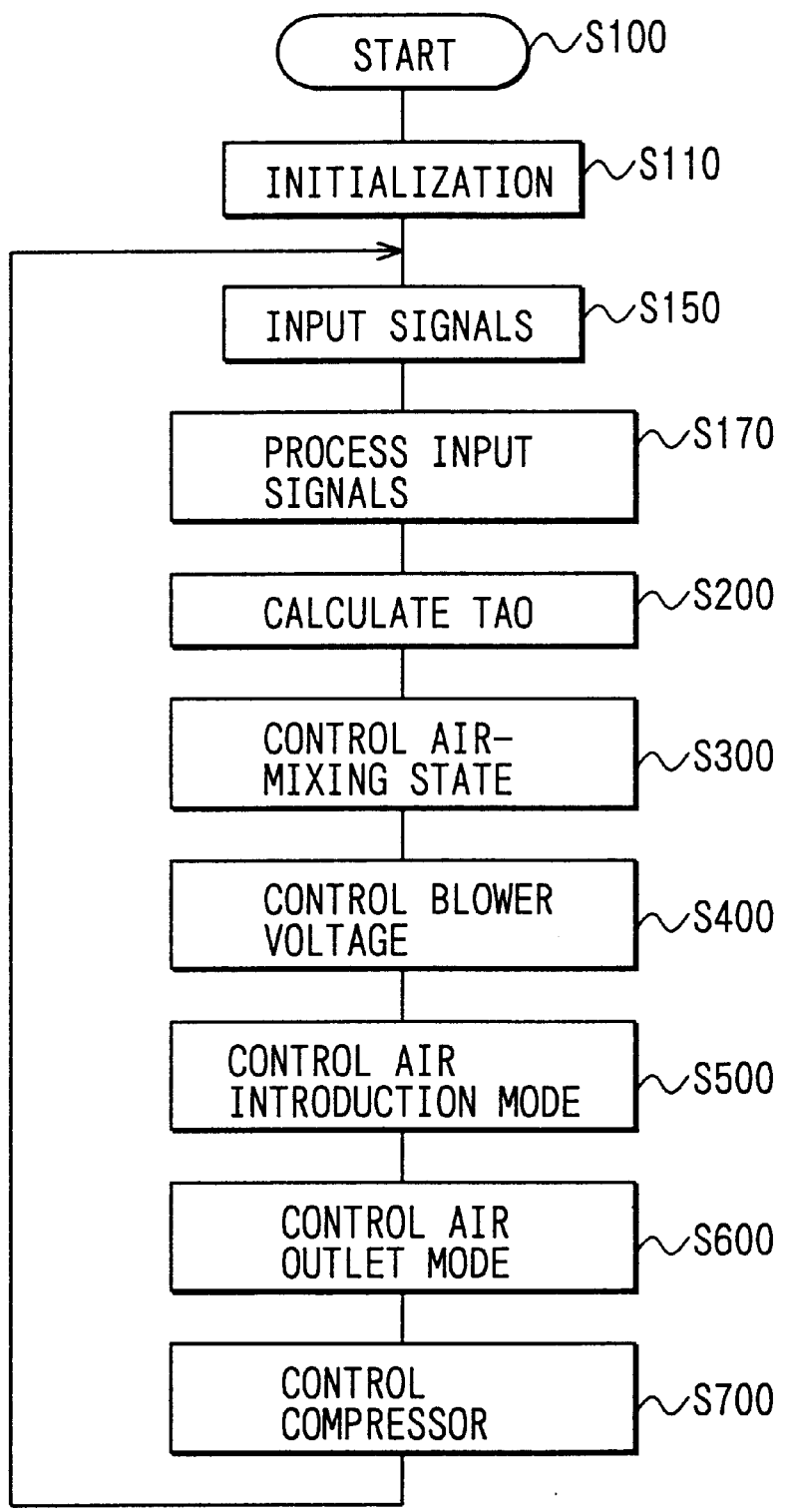
FIG. 23 is a flow diagram showing a base control operation of a vehicle air conditioner according to the seventh embodiment.
Figure 24:
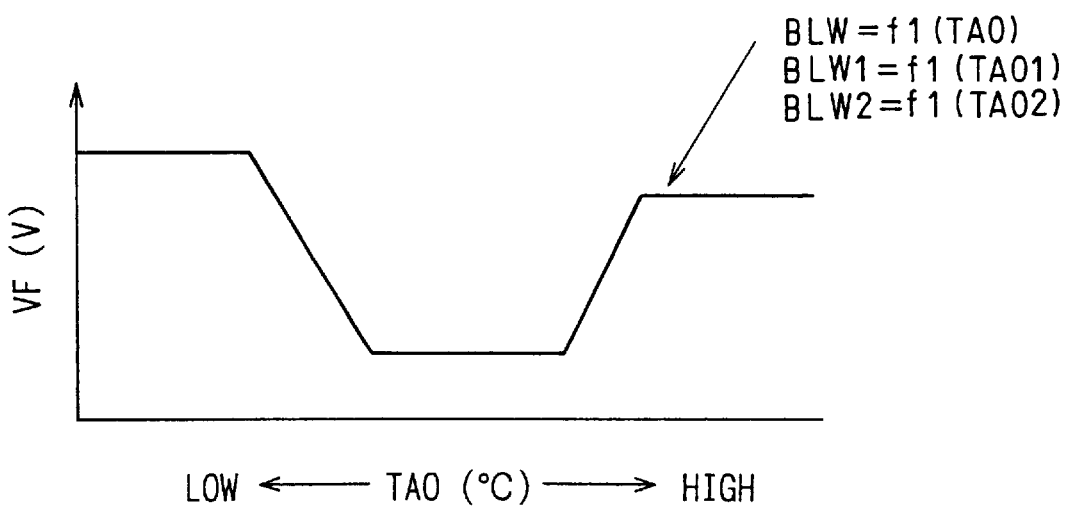
FIG. 24 is a view showing a blower voltage control characteristic according to the seventh embodiment.

FIG. 23 shows a base control of a control unit of the vehicle air conditioner according to the seventh embodiment, and the base control is performed when the automatic control state of the vehicle air conditioner is set by the automatic switch 51 provided in the operation portion 37. Operation of the microcomputer 31 starts at step S100 in FIG. 23 when the ignition switch IG is turned on. Next, at step S110, initialization such as various conversions, flag setting and the like is performed. At step S150, environment-condition signals from the inside air temperature sensor 33, the outside air temperature sensor 34 and the sunlight amount sensor 35 are input, and operation switch signals from the switches of the operation portion 37 are input.

At step S170, a passenger's set temperature Tset1 is learned, and a control set temperature TSET using for a calculation of an air conditioning control is determined. In FIG. 23, step S170 is added in the control shown in FIG. 2 of the above-described first embodiment.

Next, at step S200, a target air temperature TAO to be blown into the passenger compartment is calculated based on the signals input at step S150 and the control set temperature TSET determined at step S170 in accordance with the following formula (5) stored beforehand in the ROM. The target air temperature TAO is an air temperature necessary for maintaining the control set temperature TSET in the passenger compartment even when the environment conditions are changed.

$$TAO=KSET \times TSET-KR \times TR-KAM \times TAM-KS \times TS+C \quad (5)$$

wherein, TSET is the control set temperature processed at step S170.

Next, at step S300, an air mixing state is controlled based on the calculated target air temperature TAO. That is, at step S300, a rotation position (opening degree) of the air mixing door 18 is controlled by the actuator 18a through the driving circuit 30, so that temperature of air blown into the passenger compartment is controlled.

Next, at step S400, a blower voltage applied to the blower motor 14 is controlled based on the calculated target air temperature TAO through the driving circuit 30. Accordingly, the rotation speed of the fan 15 is controlled so that an air-blowing amount blown into the passenger compartment is controlled. Next, steps S400, S500, S600 and S700 are performed similarly to those in FIG. 2 of the above-described first embodiment.

The control at step S170 in FIG. 23 will be described in detail with reference to FIG. 25. Here, a learning method of the passenger's set temperature Tset1 set by a passenger using the temperature setting switch 36 is explained.

At step S171, a first target air temperature TAO1 is calculated based on the following formula (6) using the stored set temperature Tset (Tr, Tam) stored in the standby RAM and the environment conditions, and a second target air temperature TAO2 is calculated based on the following formula (7) using the passenger's set temperature Tset1 and the environment conditions.

$$TAO1=KSET \times TSET\,(Tr,\,Tam)-KR \times TR-KAM \times TAM-KS \times TS+C \quad (6)$$

$$TAO2=KSET \times Tset1-KR \times TR-KAM \times TAM-KS \times TS+C \quad (7)$$

Next, at step S172, a first blower voltage BLW1 is calculated based on the first target air temperature TAO1 and a blower voltage calculation function f1 in accordance with the following formula (8), and a second blower voltage BLW2 is calculated based on the second target air temperature TAO2 and the blower voltage calculation function f1 in accordance with the following formula (9).

$$BLW1=f1(TAO1) \quad (8)$$

$$BLW2=f1(TAO2) \quad (9)$$

The first and second blower voltages BLW1, BLW2 calculated at step S172 is used in a determination at step S173, but are not used in an actual blower voltage control.

Next, at step S173, it is determined whether or not the absolute difference ($|BLW1-BLW2|$) of both the first and second blower voltages BLW1, BLW2 is smaller than a predetermined voltage a(e.g., 1V). When $|BLW1-BLW2|<\alpha$ at step S173, it is determined that the blower voltage is hardly changed between a case where the blower voltage is calculated based on the stored set temperature Tset (Tr, Tam) and a case where the blower voltage is calculated based on the passenger's set temperature Tset1. In this case, at step S174, the stored set temperature Tset (Tr, Tam) stored in the standby RAM is not maintained. That is, even when the passenger's set temperature Tset1 is changed, the change is not learned.

On the other hand, when $|BLW1-BLW2| \geq \alpha$ at step S173, it is determined that the blower voltage is changed by some degree between the case where the blower voltage is calculated based on the stored set temperature Tset (Tr, Tam) and the case where the blower voltage is calculated based on the passenger's set temperature Tset1. When $|BLW1-BLW2| \geq \alpha$, the passenger's set temperature Tset1 is learned, and the changed passenger's set temperature Tset1 is stored in the standby RAM as the stored set temperature Tset (Tr, Tam) corresponding to the inside air temperature TR and the outside air temperature TAM at this time. In the seventh embodiment, steps S171–S175 determine whether or not the passenger's set temperature Tset1 is learned.

Figure 26A:
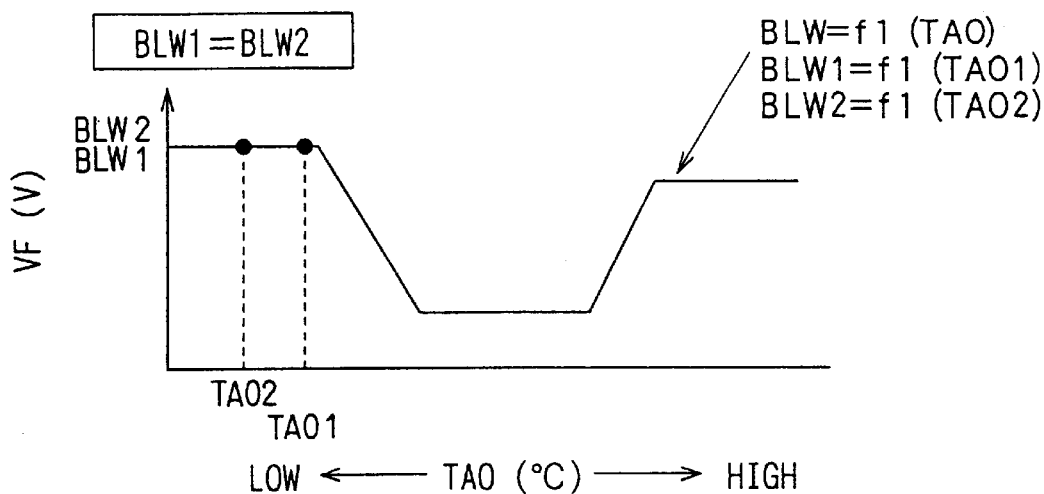
FIGS. 26A, 26B and 26C are views showing blower voltage control characteristics, respectively, according to the seventh embodiment.
Figure 26B:
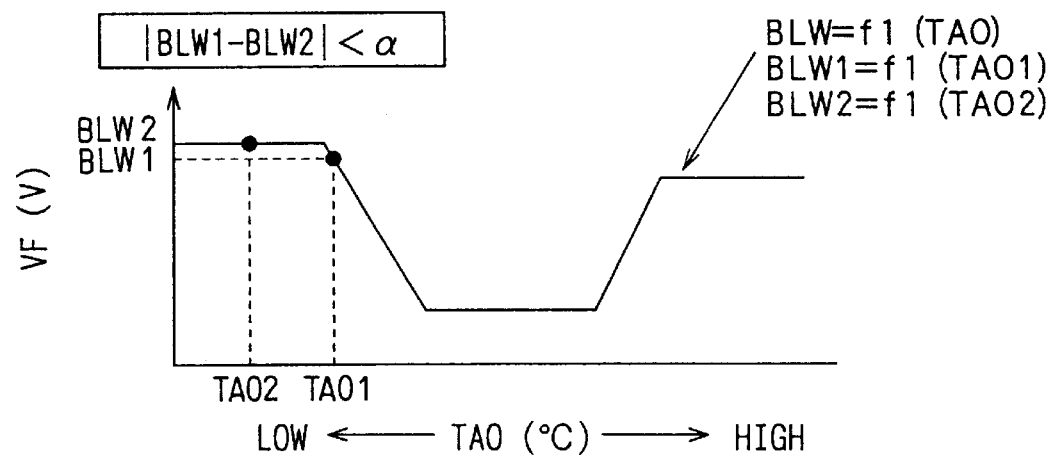
Figure 26C:
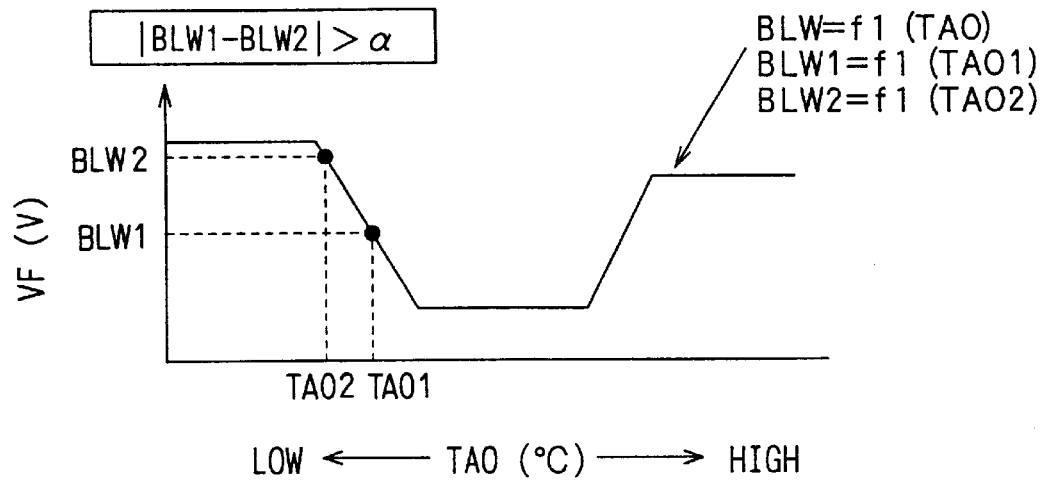

FIGS. 26A, 26B and 26C show blower voltage control characteristics when BLW1=BLW2, when $|BLW1-BLW2|<\alpha$, and when $|BLW1-BLW2|>\alpha$, respectively.

Next, at step S176, the control set temperature TSET used in the calculation of the air conditioning control is determined. Using the control set temperature TSET determined at step S176, the target air temperature TAO is calculated at step S200 in FIG. 23, and the other steps from step S300 in FIG. 23 are performed.

As the control set temperature TSET, the stored set temperature Tset(Tr, Tam) stored in the standby RAM is generally used. When the inside air temperature Tr or the outside air temperature TAM is changed so that the stored set temperature Tset(Tr, Tam) is moved at a different mass in the map of FIG. 22, when a difference between the present stored set temperature, corresponding to the present inside air temperature and the present outside air temperature, and the previous stored set temperature immediately before the present state is large, the air temperature or the air amount to be blown into the passenger compartment is rapidly changed. In this case, unpleasant feeling may be given to a passenger in the passenger compartment.

In the seventh embodiment, at step S176, when the present stored set temperature is greatly different from the previous stored set temperature just before the present state, a correction set temperature is set so that the previous stored set temperature is gradually changed to the present stored set temperature. That is, in this case, because the correction set temperature is used as the control set temperature TSET, it can prevent the air temperature or the air amount to be blown into the passenger compartment from being rapidly changed.

Figure 25:
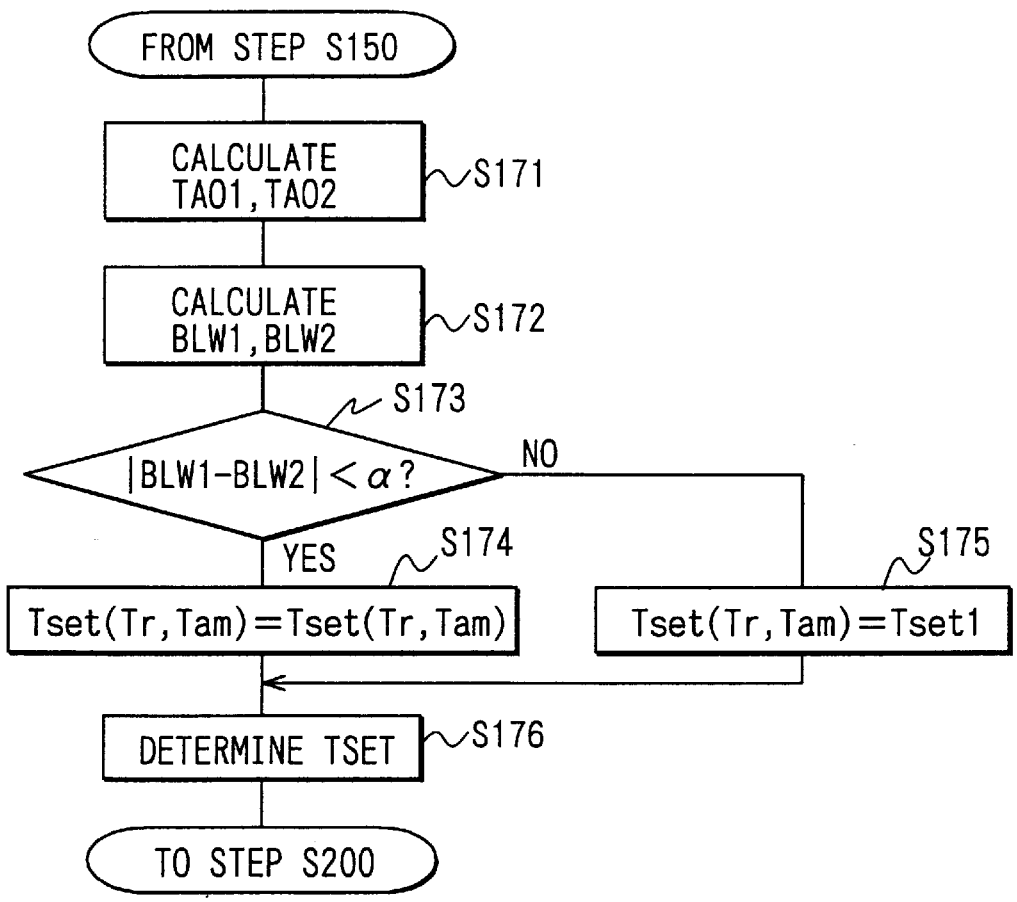
FIG. 25 is a flow diagram showing a main control according to the seventh embodiment.
Figure 27:
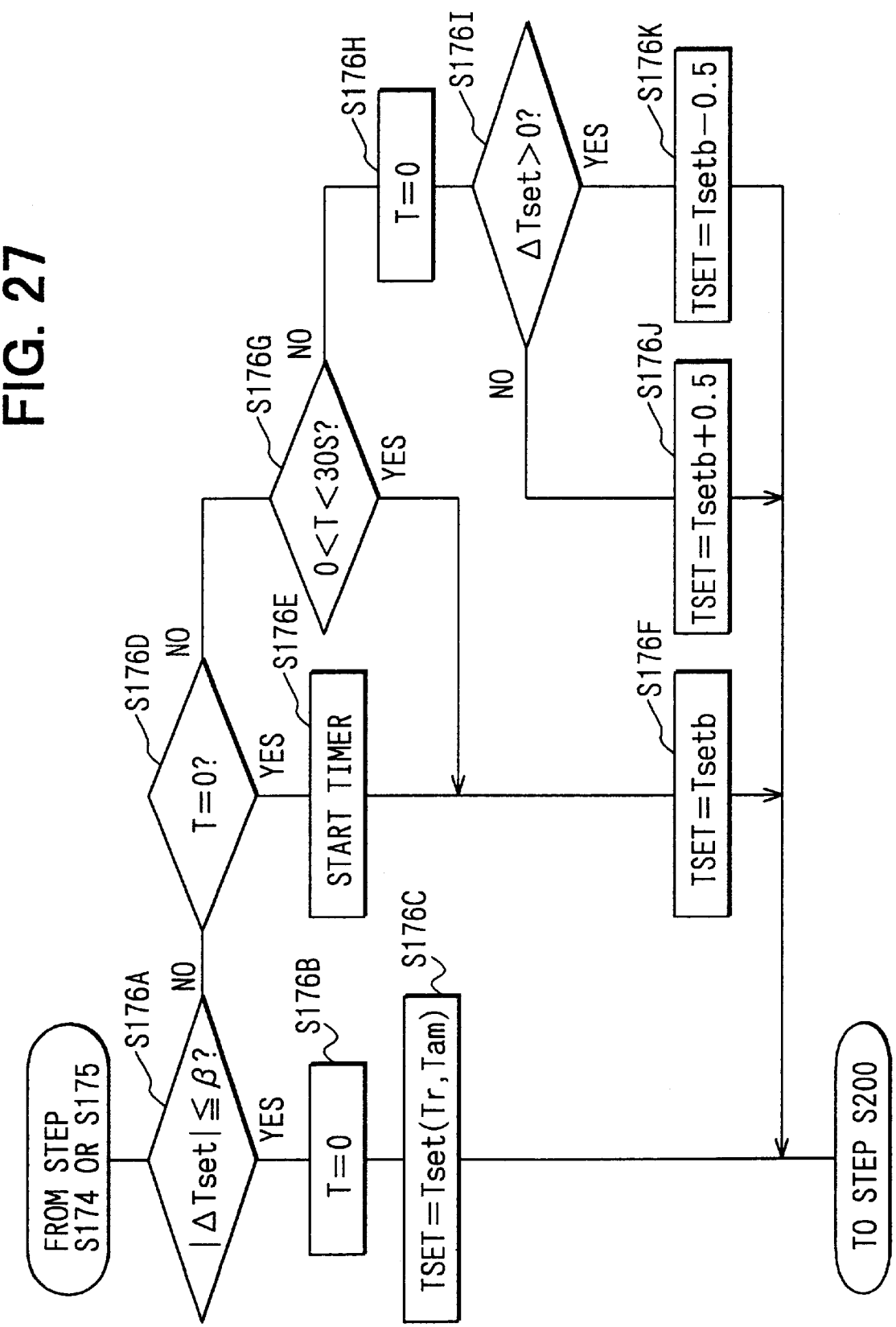
FIG. 27 is a flow diagram showing a main control of the vehicle air conditioner according to the seventh embodiment.

Next, a determining method of the control set temperature TSET at step S176 in FIG. 25 is described in detain based on the flow diagram shown in FIG. 27. Here, the control set temperature TSET used for the previous calculation of the air conditioning control, before one time from the present calculation, is as a previous control set temperature Tsetb, and an initialization value of a timer T is set at zero.

First, at step S176A, it is determined whether or not the absolute value $|\Delta Tset|$ of a control set temperature difference $\Delta Tset$ indicated in the following formula (10) is equal to or smaller than a predetermined value $\beta$(e.g., 2° C.).

$$\Delta Tset=Tsetb-Tset(Tr,\,Tam) \quad (10)$$

When $|\Delta Tset \uparrow \leq \beta$, a difference between the previous control set temperature Tsetb and the stored set temperature Tset (Tr, Tam) stored in the standby RAM is small, and it is determined that the air temperature or the air amount is not rapidly changed even when the stored set temperature Tset (Tr, Tam) stored in the standby RAM is used in the calculation of the air conditioning control. In this case, the timer T is reset at step S176B, and the stored set temperature Tset(Tr, Tam) is used as the control set temperature TSET at step S176C. Thereafter, the control routine moves to step S200.

When $|\Delta Tset|>\beta$ at step S176A, it is determined whether or not the timer T is zero at step S176D. When T=0, the count of the timer T is started at step S175E, and the previous control set temperature Tsetb is set as the control set temperature TSET at step S176F so that it can prevent the air temperature or the air amount from being rapidly changed.

When the timer T is not equal to zero at step S176D, it is determined whether or not 0<T<30 s (seconds) at step S176G. When it is determined that 0<T<30 s at step S176G, the control set temperature TSET is set to the previous control set temperature Tsetb at step S176F.

When it is not determined that 0<T<30 s at step S176G, the timer T is reset at step S176H, and it is determined whether or not $\Delta Tset>0$ at step S176I. When $\Delta Tset>0$ at step S176I, the control set temperature TSET is set to a value lower than the previous control set temperature Tsetb by 0.5° C. (TSET=Tsetb−0.5) at step S176K. On the other hand, when $\Delta Tset \leq 0$ at step S176I, the control set temperature TSET is set to a value higher than the previous control set temperature Tsetb by 0.5° C. (TSET=Tsetb+0.5) at step S176J. Because the control set temperature TSET is controlled to be gradually changed in accordance with time, it can prevent the air temperature or the air amount from being rapidly changed.

For example, when the previous control set temperature Tset is 25° C. and the stored set temperature Tset (Tr, Tam) is 18° C., the control routine moves to step S176A, step S176D, step S176E and step S176F in this order, and the control set temperature TSET is set at 25° C. at step S176F. Until timer T passes 30 seconds, the control routine moves to step S176A, step S176D, step S176G and step S176F in this order, and the control set temperature TSET is maintained at 25° C. at step S176F. Therefore, until timer T passes 30 seconds, the control set temperature TSET is set at 25° C. at step S176F.

After the timer T passes 30 seconds, the control set temperature TSET is 24.5° C. at step S176K because $\Delta Tset=$ 7° C. At this time, because the timer T is reset at step S176H, the control set temperature TSET during the next 30 seconds is maintained at 24.5° C. In this case, the control set temperature TSET is reduced by 0.5° C. every 30 seconds, and the reducing operation is repeated until the $\Delta Tset$ becomes 2° C. Accordingly, the control set temperature TSET is not rapidly changed in a short time, and it can prevent the air amount or the air temperature to be blown into the passenger compartment from being rapidly changed.

According to the seventh embodiment, when the passenger's set temperature Tset1 is changed, it is determined whether or not the changed passenger's set temperature Tset1 is learned in accordance with a control amount difference (BLW1−BLW2) between the control amount (e.g., blower voltage) calculated based on the passenger's set temperature Tset1 and the control amount calculated based on the stored set temperature Tset(Tr, Tam) When the control amount difference (BLW1−BLW2) is small, the changed passenger's set temperature Tset1 is not learned, and a memory using amount of the microcomputer 31 can be made smaller. That is, when the control amount difference (BLW1−BLW2) is small, the changed passenger's set temperature Tset1 is not newly stored.

In the above-described seventh embodiment, during a predetermined period (e,g., 5 minutes) after the air conditioning operation is firstly started after the ignition switch IG is turned on, the learning of the passenger's set temperature Tset1 can be prohibited. When a difference between the stored set temperature Tset (Tr, Tam) and the inside air temperature TR is larger than a predetermined value (e.g., 5° C.), the learning of the passenger's set temperature Tset1 can be prohibited. Further, when a difference between the passenger's set temperature Tset1 and the inside air temperature TR is larger than a predetermined value (e.g., 5° C.), the learning of the passenger's set temperature Tset1 can be prohibited.

In the above-described seventh embodiment, the stored set temperature Tset (Tr, Tam) relative to the inside air temperature TR and the outside air temperature TAM is stored. However, any a stored set temperature relative to any the inside air temperature, the outside air temperature, the sunlight amount, the passenger's temperature, the skin temperature of the passenger and the air-conditioning operation time can be stored. Further, the temperature setting map of FIG. 22 can be set to be stored for each driver.

In the seventh embodiment, the standby RAM is used for storing the learning even when the ignition switch is turned off. However, a fixed memory unit may be used without using the standby RAM. Even in this case, when the ignition switch is turned off, and when electrical power from the battery is not supplied, the learned information can be stored.

An eighth preferred embodiment of the present invention will be now described with reference to FIG. 28. In the eighth embodiment, a part of the input signal process at step S170 in FIG. 23 of the seventh embodiment is changed. In the eighth embodiment, the other parts are similar to those of the above-described seventh embodiment.

Figure 28:
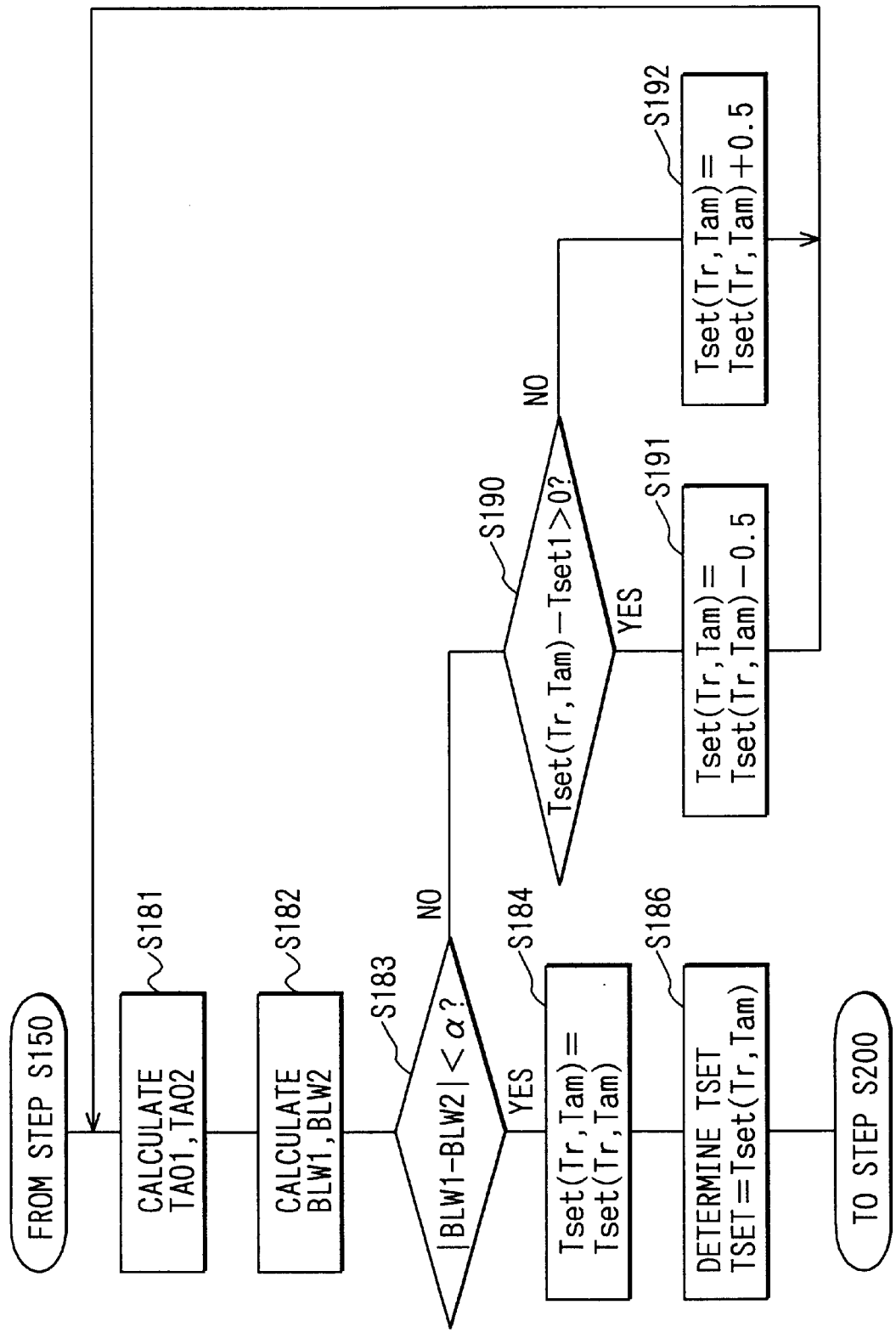
FIG. 28 is a flow diagram showing a main control of a vehicle air conditioner according to an eighth preferred embodiment of the present invention.

As shown in FIG. 28, at step S181, the first target air temperature TAO1 and the second target air temperature TAO2 are calculated similarly to step S171 in FIG. 25

Next, similar to step S172 in FIG. 25, the first blower voltage BLW1 and the second blower voltage BLW2 are calculated at step S182. The first and second blower voltages calculated at step S182 is used in a determination at step S183, but are not used in an actual blower voltage control.

Next, at step S183, it is determined whether or not the absolute difference (|BLW1−BLW2|) of both the first and second blower voltages BLW1, BLW2 is smaller than a predetermined voltage $\alpha$(e.g., 1V). When |BLW1−BLW2|<$\alpha$ at step S183, it is determined that the blower voltage is hardly changed between a case where the blower voltage is calculated based on the stored set temperature Tset (Tr, Tam) and a case where the blower voltage is calculated based on the passenger's set temperature Tset1. In this case, at step S184, the stored set temperature Tset (Tr, Tam) stored in the standby RAM is not changed. That is, even when the passenger's set temperature Tset1 is changed, the change is not learned at step S186.

On the other hand, when |BLW1−BLW2|$\geq \alpha$ at step S183, it is determined whether or not a difference between the stored set temperature Tset(Tr, Tam) and the passenger's set temperature Tset1 is larger than zero at step S190. That is, when [Tset(Tr, Tam)−Tset1]>0 at step S190, the stored set temperature Tset (Tr, Tam) is reduced by 0.5° C. at step S191. Thereafter, the control routine moves to step S181. On the other hand, when [Tset(Tr, Tam)−Tset1]$\leq 0$ at step S190, the stored set temperature Tset (Tr, Tam) is increased by 0.5° C. at step S192. Thereafter, the control routine moves to step S181.

Until |BLW1−BLW2|<$\alpha$ at step S183, the correction of the stored set temperature Tset (Tr, Tam) is repeated. When

|BLW1−BLW2|<α at step S183, the stored set temperature Tset(Tr, Tam) corrected lastly is stored in the standby RAM.

Next, at step S186, the stored set temperature Tset (Tr, Tam) stored in the standby RAM is set as the control set temperature TSET. Thereafter, the control routine moves to step S200.

Figure 22:
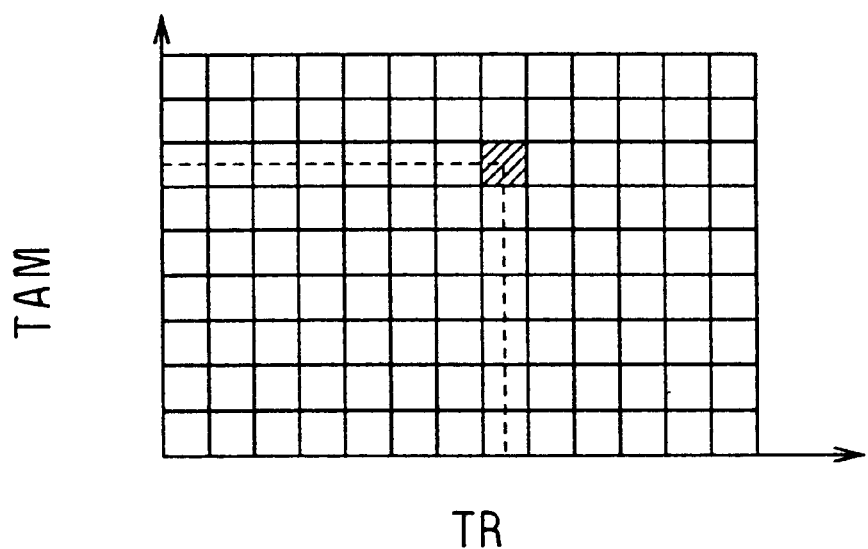
FIG. 22 is a graph for setting a set temperature, according to a seventh preferred embodiment of the present invention.

According to the eighth embodiment, when the passenger's set temperature Tset1 is changed, it is determined whether or not the changed passenger's set temperature Tset1 is learned in accordance with a control amount difference (BLW1−BLW2) between the control amount (e.g., blower voltage) calculated based on the passenger's set temperature Tset1 and the control amount calculated based on the stored set temperature Tset(Tr, Tam). When the control amount difference |BLW1−BLW2| is larger than a predetermined value, the stored set temperature is corrected so that the control amount difference |BLW1−BLW2| becomes smaller than the predetermined value. Accordingly, a difference between both stored set temperatures Tset (Tr, Tam) stored adjacent masses in FIG. 22 is not changed greatly. Thus, even when the stored set temperature Tset (Tr, Tam) moves different masses due to a change of the inside air temperature TR or the outside air temperature TAM, it can prevent the air temperature or the air amount to be blown into the passenger compartment from being greatly changed.

In the above-described eighth embodiment, at step S191, S192, the stored set temperature Tset (Tr, Tam) is changed by 0.5° C. However, the stored set temperature Tset (Tr, Tam) may be changed by 0.2° C., for example.

Figure 29:
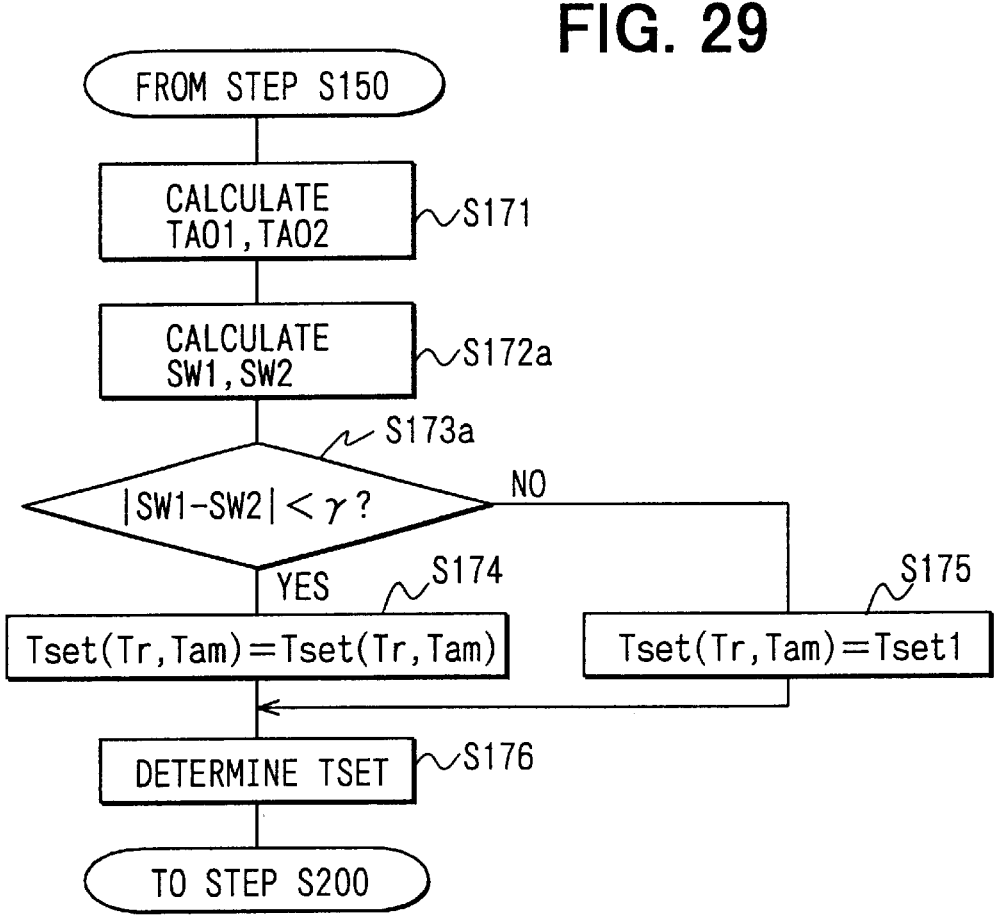
FIG. 29 is a flow diagram showing a main control of a vehicle air conditioner according to a ninth preferred embodiment of the present invention.

A ninth preferred embodiment of the present invention will be now described with reference to FIGS. 29 and 30. In the above-described seventh and eighth embodiments of the present invention, the difference of the blower voltage (air amount) is used as the difference of the air conditioning control amount. In the ninth embodiment, as the difference of the air conditioning control amount, a difference of the opening degree(SW) of the air mixing door 18 is used. Accordingly, steps S172, S173 in FIG. 25 is changed to steps S172a, S173a, as shown in FIG. 29. In the ninth embodiment, the other parts are similar to those of the above-described seventh embodiment.

As shown in FIG. 29, at step S171, the first target air temperature TAO1 and the second target air temperature TAO2 are calculated.

Figure 30:
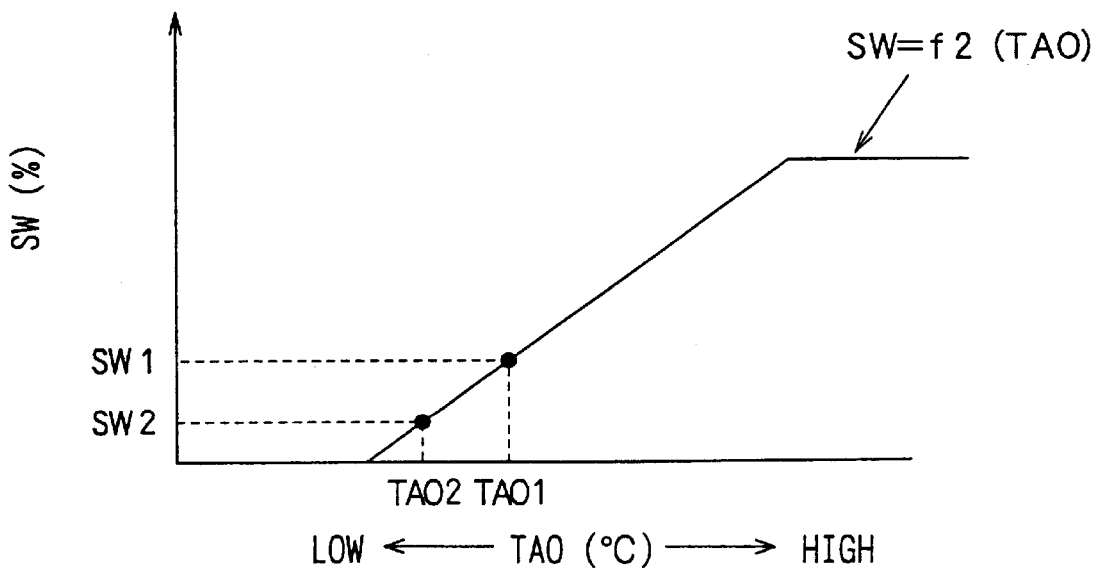
FIG. 30 is a characteristic view showing a relationship between an opening degree of an air mixing door and a target air temperature, according to the ninth embodiment.

Next, at step S172a, a first air mixing opening degree SW1 is calculated based on the first target air temperature TAO1 and an air-mixing opening degree calculation function f2 in accordance with the air-mixing opening degree characteristic shown in FIG. 30, and a second air mixing opening degree SW2 is calculated based on the second target air temperature TAO2 and an air-mixing opening degree calculation function f2 in accordance with the air-mixing opening degree characteristic shown in FIG. 30.

The first and second air-mixing opening degrees SW1, SW2 at step S172a is used in a determination at step S173a, but are not used in an actual air-mixing opening degree control.

Next, at step S173a, it is determined whether or not the absolute difference (|SW1−SW2|) of both the first and second air mixing opening degrees SW1, SW2 is smaller than a predetermined voltage γ(e.g., 10%). When |SW1−SW2|<γ at step S173a, it is determined that the change of the air mixing degree (air-conditioning control amount) is hardly changed.

On the other hand, when ISW1−SW21|≧γ at step S173a, it is determined that the air-conditioning control amount (i.e., the air mixing degree) is greatly changed. In the ninth embodiment, the other steps after steps S174, S175 are similar to those in the above-described seventh embodiment. In the ninth embodiment, steps S171, S172a, S173a, S174, S175 construct learning-determining means for determining whether or not a passenger's set temperature Tset1 is learned.

According to the ninth embodiment of the present invention, the memory using amount of the microcomputer 31 can be made smaller, and a rapid change of the air-conditioning control amount can be prevented, similarly to the above-described seventh embodiment.

Figure 31:
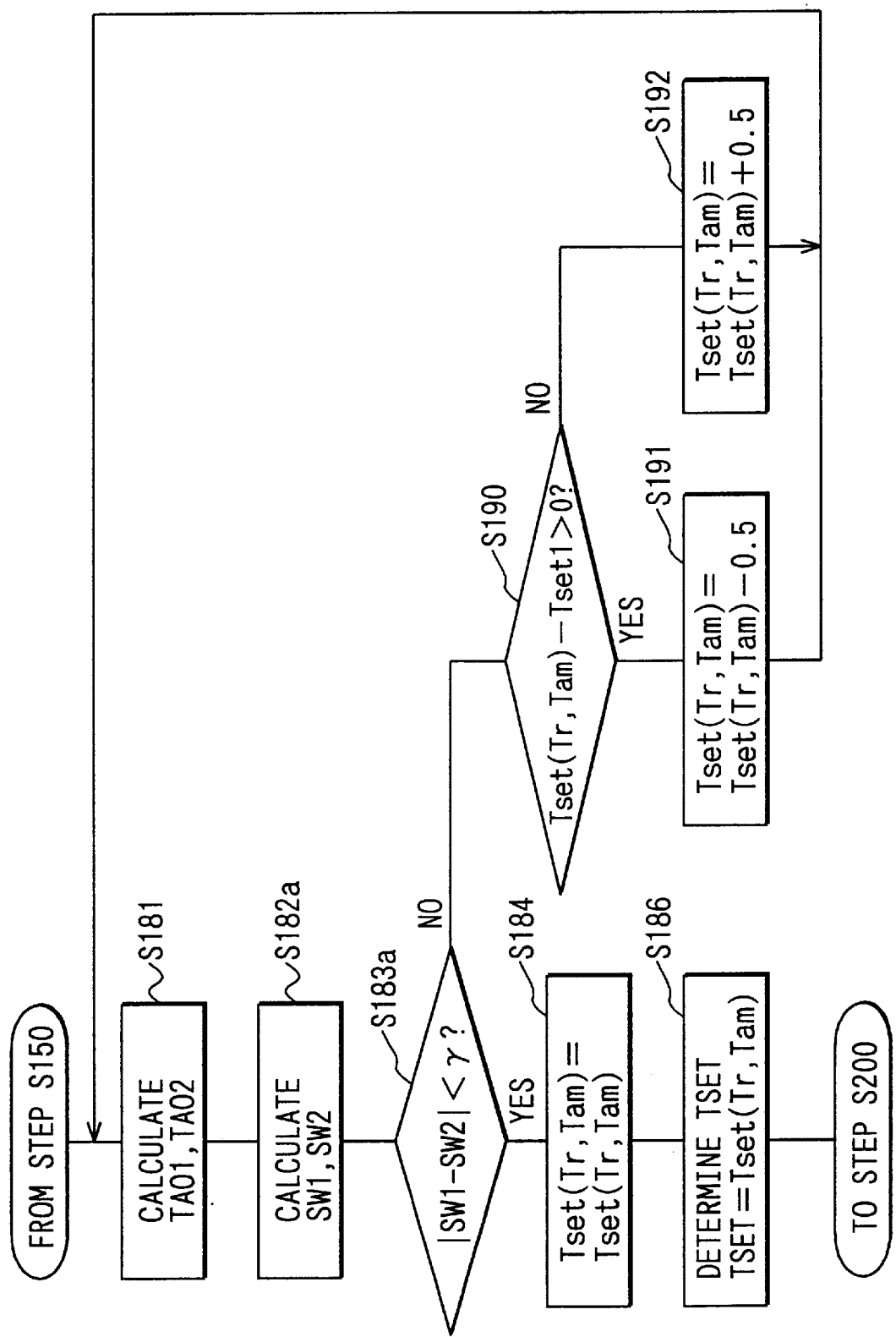
FIG. 31 is a flow diagram showing a main control of a vehicle air conditioner according to a tenth preferred embodiment of the present invention.

A tenth preferred embodiment of the present invention will be now described with reference to FIG. 31. In the above-described eighth embodiment, the difference of the blower voltage is used as the difference of the air-conditioning control amount. In the tenth embodiment, the opening degree difference of the air mixing door 18 is used as the difference of the air-conditioning control amount. Accordingly, steps S182, S183 in FIG. 28 are changed to steps S182a, S183a, as shown in FIG. 31. In the tenth embodiment, the other parts are similar to those of the above-described eighth embodiment.

As shown in FIG. 31, at step S181, the first target air temperature TAO1 and the second target air temperature TAO2 are calculated.

Next, at step S182a, the first air mixing opening degree SW1 is calculated based on the first target air temperature TAO1 and the air-mixing opening degree calculation function f2, and a second air mixing opening degree SW2 is calculated based on the second target air temperature TAO2 and the air-mixing opening degree calculation function f2.

The first and second air-mixing opening degrees SW1, SW2 at step S182a are used in a determination at step S183a, but are not used in an actual air-mixing opening degree control.

Next, at step S183a, it is determined whether or not the absolute difference (|SW1−SW2|) of both the first and second air mixing opening degrees SW1, SW2 is smaller than a predetermined degree γ(e.g., 10%). When |SW1−SW2|<γ at step S183a, it is determined that the change of the air mixing degree (air-conditioning control amount) is small.

On the other hand, when |SW1−SW2|≧γ at step S183a, it is determined that the air-conditioning control amount (i.e., the air mixing degree) is greatly changed. In the tenth embodiment, the other steps after steps S184, S190 are similar to those in the above-described eighth embodiment. As a result, the advance similar to that of the above-described eighth embodiment can be obtained.

An eleventh preferred embodiment of the present invention will be now described with reference to FIGS. 32–35.

Figure 32:
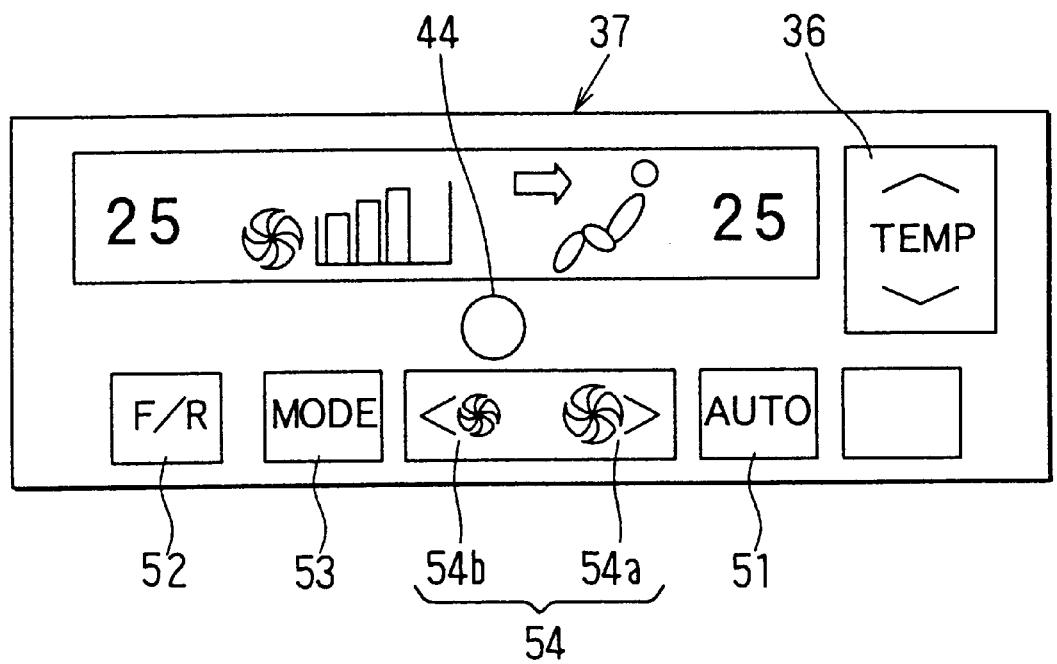
FIG. 32 is a front view showing operation members of an air-conditioning operation portion, according to an eleventh preferred embodiment of the present invention.

In the eleventh embodiment, the structure of a vehicle air conditioner is similar to that shown in FIG. 14 of the above-described fifth embodiment. Therefore, a detain explanation of the components of the vehicle air conditioner is omitted. In the eleventh embodiment, as shown in FIG. 32, the air-blowing setting switch 54 of the air conditioning operation portion 37 has an up switch 54a which outputs a signal for increasing the blower voltage by one level (e.g., 0.25V) when the up switch 54a is pushed by one time, and a down switch 54b which outputs a signal for decreasing the blower voltage by one level (e.g., 0.25V) when the down switch 54b is pushed by one time. Further, in the eleventh embodiment, an operator detection sensor 44 for detecting an operation passenger, seated on a seat, operating the air-blowing setting switch 54 is provided in the microcomputer 31. For example, in the eleventh embodiment, the operator detecting sensor 44 is an infrared temperature sensor which generates electrical power in accordance with a detected temperature.

As shown in FIG. 32, in the eleventh embodiment, the operator detection sensor 44 is attached to the operation portion 37 to face toward a driver's seat side (a predetermined passenger's side). In this case, the operator detection sensor 44 is disposed so that the hand of the driver is placed in a temperature detection range of operator detection sensor 44 when the driver operates the air-blowing setting switch 54. In the eleventh embodiment, a detection signal from the operator detection sensor 44 is also input into the microcomputer 31 after being level-converted in the level converting circuit 32.

Figure 33:
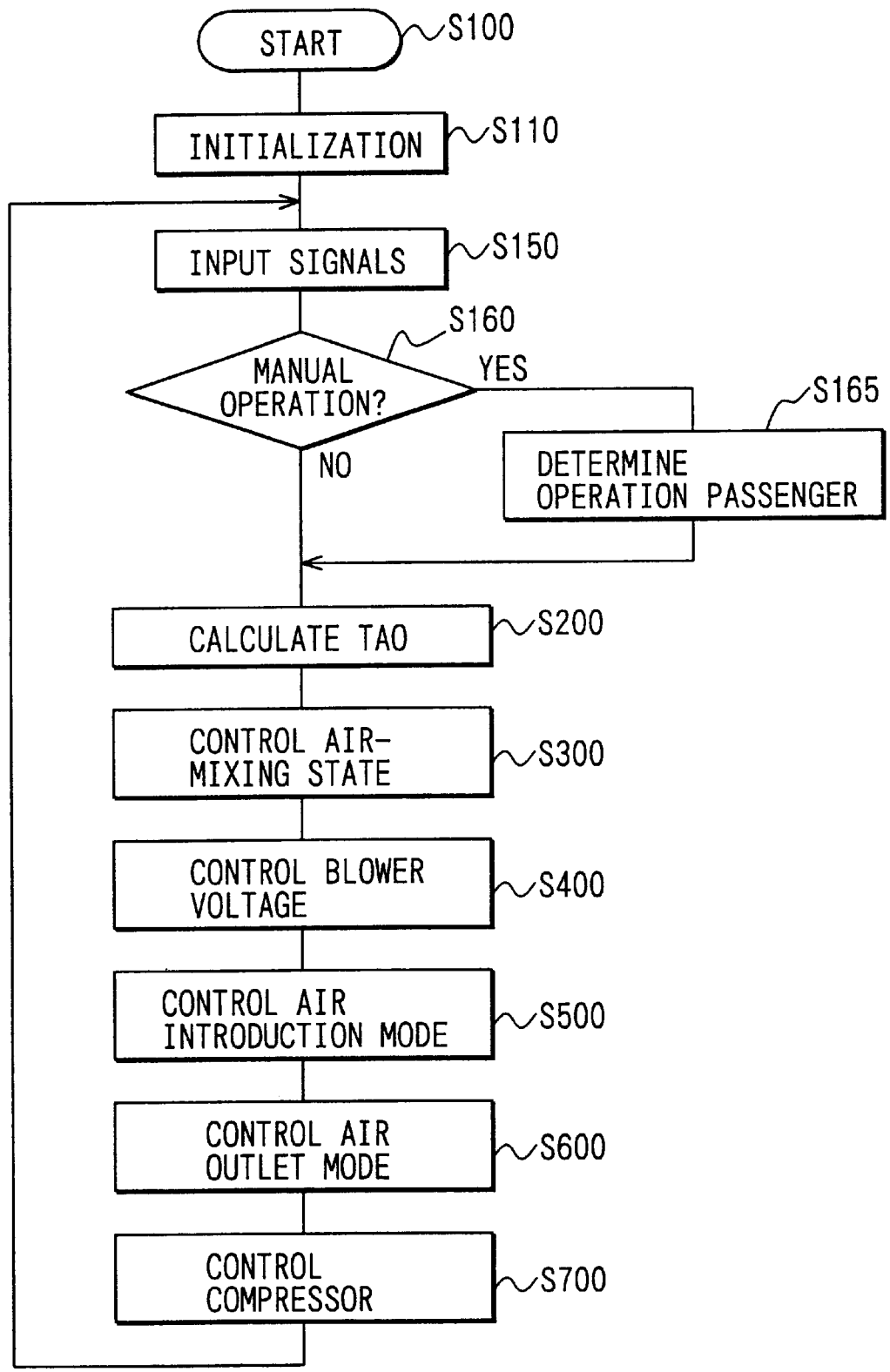
FIG. 33 is a flow diagram showing a base control of a vehicle air conditioner according to the eleventh embodiment.

FIG. 33 is a flow diagram showing a base control routine performed by the microcomputer 31 when the automatic (AUTO) switch 51 is turned on. The control of step S100 shown in FIG. 33 is started when the ignition switch IG is turned on.

Next, at step S110, initialization such as various conversion and flag setting is performed. At step S150, environment-condition signals from the sensors 33–35, 40, 41, 44 are input, and operation switch signals from the switches 36, 51–54 are input.

Next, at step S160, it is determined whether or not the blower voltage (air blowing amount) is manually changed (set) by a passenger. When the manual operation for changing the blower voltage is determined at step S160, the operation passenger operating the air-blowing switch 54 is determined and is learned at step S165.

When the manual operation for the blower voltage is not determined at step S160, the target air temperature TAO is calculated based on the signals input at step S150 in accordance with the above-described formula (1).

Next, at step S300, an air mixing state is controlled based on the calculated target air temperature TAO. That is, at step S300, a rotation position (opening degree) of the air mixing door 18 is controlled by the actuator 18a through the driving circuit 30, so that temperature of air blown into the passenger compartment is controlled.

Next, at step S400, a blower voltage applied to the blower motor 14 is controlled based on the calculated target air temperature TAO through a driving circuit 30. Accordingly, a rotation speed of the fan 15 is controlled so that an air-blowing amount blown into the passenger compartment is controlled. Next, at step S500, an inside/outside air introduction ratio due to the operation position of the inside/outside air switching door 12 is calculated, and the actuator 12a for the inside/outside air switching door 12 is controlled through the driving circuit 30. Next, at step S600, an air outlet mode is controlled. That is, the actuator 25 driving the defroster door 20, the face door 22 and the foot door 24 is controlled through the driving circuit 30. Next, at step S700, the compressor of the refrigerant cycle is controlled. Thereafter, the control routine returns to step S150 where plural signals are input.

Figure 34:
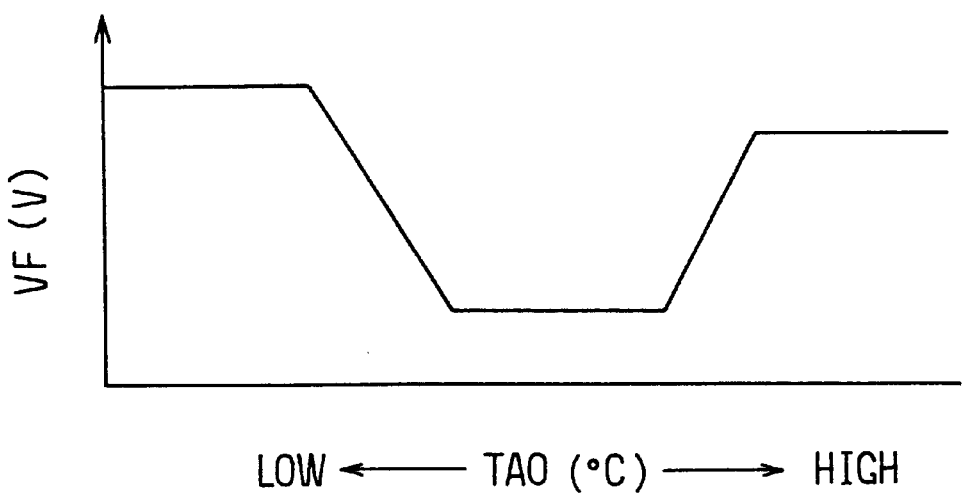
FIG. 34 is a view showing a blower voltage control characteristic according to the eleventh embodiment.
Figure 35:
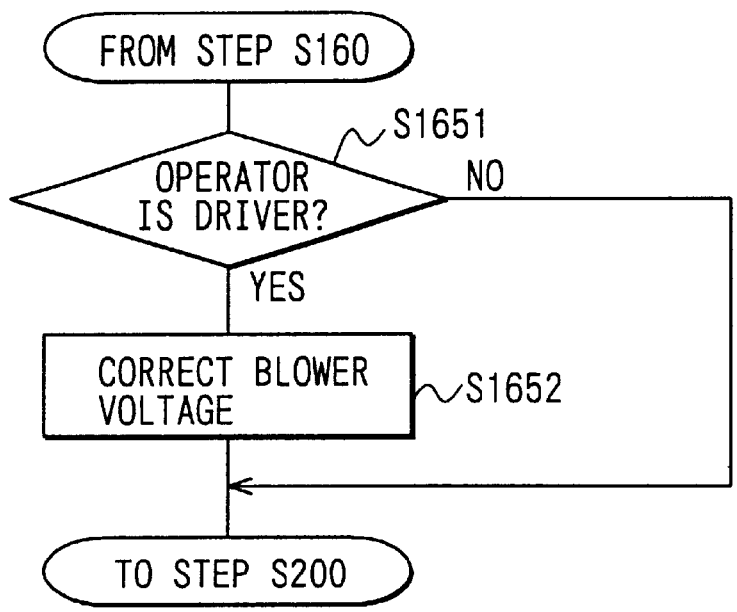
FIG. 35 is a flow diagram showing a main control of the vehicle air conditioner according to the eleventh embodiment.

Next, the control at step S165 in FIG. 33 will be described in detail with reference to the flow diagram of FIG. 35. That is, at step S165 in FIG. 33, the operation passenger operating the air-blowing setting switch 54 is determined, and a correction method of the blower voltage control characteristic is determined in accordance with the determination result. Because the operator detection sensor 44 is disposed so that the driver's hand is placed in the temperature detection range of the operator detection sensor 44 when the driver operates the air-blowing setting switch 54, the temperature of the driver's hand is detected by the operator detection sensor 44 when the driver operates the air-blowing setting switch 54. Accordingly, at step S1651 of FIG. 35, when the temperature detected by the operator detection sensor 44 is in a skin temperature range (e.g., 34±3° C.), it is determined that the operator operating the air-blowing setting switch 37 is the driver. In this case, the operation of the air-blowing setting switch 54 is learned at step S1652, and the blower voltage control characteristic shown in FIG. 34 is corrected to correspond to a driver's desire. The corrected blower voltage control characteristic is stored in the standby RAM at step S1652. Thereafter, the control routine moves to step S200.

On the other hand, when a front passenger (e.g., a passenger except for the driver) operates the air-blowing setting switch 54, the hand of the front passenger seated on the front passenger's seat next to the driver's seat is not placed in the temperature detection range of the operator detection sensor 44. Accordingly, when the temperature detected by the operator detection sensor 44 is not in the skin temperature range, it is determined that the front passenger operates the air-blowing setting switch 54 at step S1651, and the control routine directly moves to step S200.

According to the eleventh embodiment, step S1651 detects an operation passenger operating the air-blowing setting switch 54. When the driver is the operator operating the air-blowing setting switch 54, the operation of the air-blowing setting switch 54 is learned so that the blower voltage control characteristic is corrected. When the other passenger except for the driver operates the air-blowing setting switch 54, the operation is not learned, and the blower voltage control characteristic is not corrected.

In the above-described eleventh embodiment, the infrared temperature sensor is used as the operator detection sensor 44. However, the other temperature sensor or a CCD camera may be used as the operator detection sensor 44.

In the above-described eleventh embodiment, the air blowing amount is determined based on only the target air temperature. However, the present invention described in the eleventh embodiment can be applied to a case where the air blowing amount is determined based on the inside air temperature, the outside air temperature, and the sunlight amount which are respectively input. That is, even when the air blowing amount is determined based on the inside air temperature, the outside air temperature and the sunlight amount, the blower voltage control characteristic can be corrected by the learning of the passenger's operation.

In the above-described eleventh embodiment, the operator detection sensor 44 is disposed in the operation portion 37. However, only when the hand of the driver is placed in the temperature detection range of the operator detection sensor 44 when the driver operates the air blowing setting switch 54, the operator detection sensor 44 may be disposed at the other position.

In the above-described eleventh embodiment, when the operator operating the air-blowing setting switch 54 is not the driver, the operation is not learned, and the blower voltage control characteristic is not corrected. However, when the operator operating the air-blowing setting switch 54 is not the driver, the correction amount of the blower voltage control characteristic can be made smaller as compared with the case where the operator operating the air-blowing setting switch 54 is the driver.

In the above-described eleventh embodiment, the blower voltage control characteristic is corrected in accordance with a predetermined passenger's operation, among plural air-conditioning control characteristics. However, the other control characteristics such as the set temperature and the air outlet mode can be corrected in accordance with a predetermined passenger's operation.

A twelfth preferred embodiment of the present invention will be now described with reference to FIG. 36. In the twelfth embodiment, a first blower voltage control characteristic for the driver and a second blower voltage control characteristic for the front passenger are respectively stored in the standby RAM. Therefore, in the twelfth embodiment, the operator determination and learning method are changed at step S165 in the eleventh embodiment, and the other parts are similar to those of the eleventh embodiment.

Figure 36:
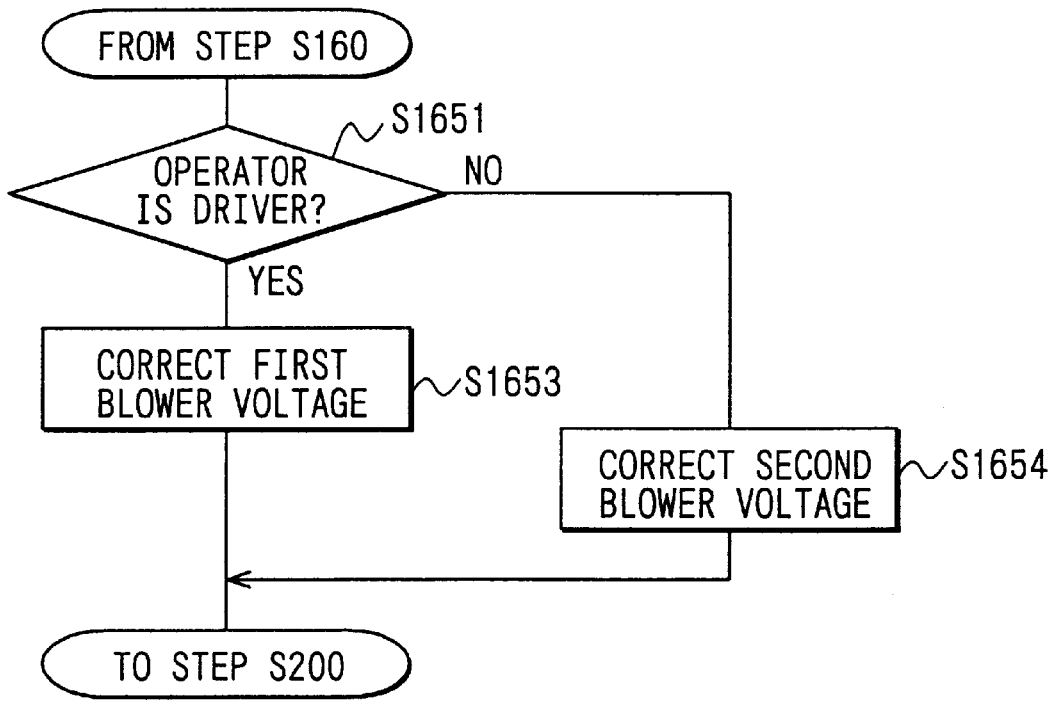
FIG. 36 is a flow diagram showing a main control of a vehicle air conditioner according to a twelfth preferred embodiment of the present invention.

As shown in FIG. 36, when the operator passenger is the driver at step S1651, the driver's operation relative to the air-blowing setting switch 54 is learned, and the first blower voltage control characteristic for the driver is corrected to correspond to the driver's desire at step S1653. Thereafter, the corrected first blower voltage control characteristic is newly stored in the standby RAM to be replaced therein.

On the other hand, it is determined that the operator is not the driver at step S1651, the front passenger's operation of the air-blowing setting switch 54 is learned, and the second blower voltage control characteristic for the front passenger is corrected to correspond to the front passenger's desire at step S1654. Thereafter, the corrected second blower voltage control characteristic is newly stored in the standby RAM.

Thereafter, at step S400 in FIG. 33, the mean blower voltage between a blower voltage calculated from the first blower voltage control characteristic for the driver and the blower voltage calculated from the second blower voltage control characteristic for the front passenger is applied to the blower motor 14.

According to the twelfth embodiment of the present invention, it is determined whether or not the operator operating the air-blowing setting switch 54 is the driver or the front passenger, and the blower voltage control characteristic for the driver or the front passenger is corrected so that a driver's desire or a front passenger's desire is reflected. Thus, in a vehicle air conditioner where the air amount for the driver's seat and the air amount for the front passenger's seat can be independently controlled, the air amount blown toward the driver's seat can be controlled based on the first blower voltage control characteristic, and the air amount blown toward the front passenger's seat can be controlled based on the second blower voltage control characteristic. Accordingly, the air amount blown toward the driver's seat and the air amount blown toward the front passenger's seat can be respectively independently controlled.

Figure 37:
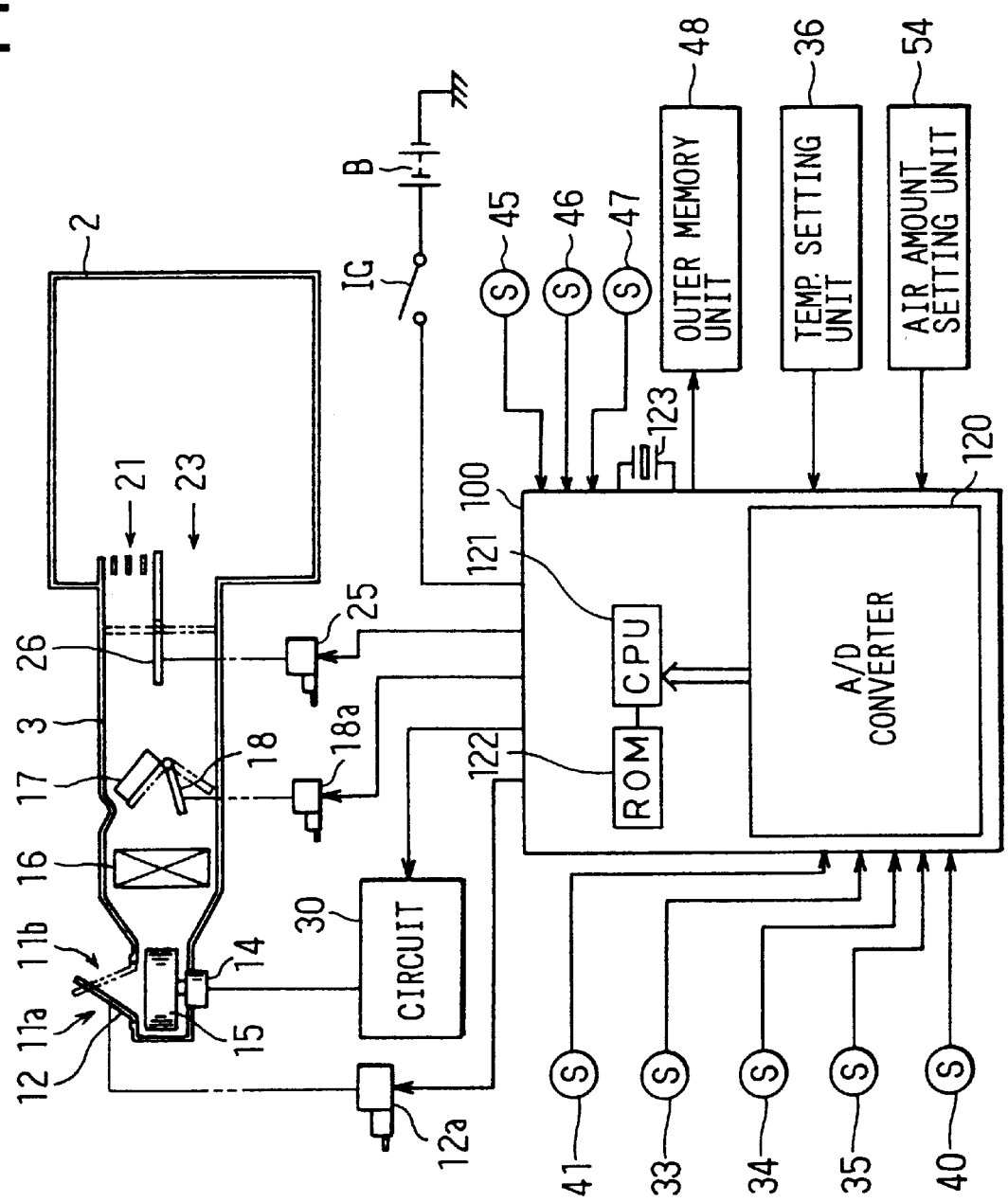
FIG. 37 is a schematic diagram showing an entire structure of a vehicle air conditioner according to a thirteenth preferred embodiment of the present invention.

A thirteenth preferred embodiment of the present invention will be now described with reference to FIGS. 37–40. A vehicle air conditioner of the thirteenth embodiment is indicated in FIG. 37. In the vehicle air conditioner shown in FIG. 37, components similar to those in FIG. 14 of the fifth embodiment are indicated with the same reference numbers. As shown in FIG. 37, the vehicle air conditioner includes an air conditioning case 3 defining an air passage through which air is blown into a passenger compartment 2.

Similarly to the air conditioner shown in FIGS. 1 and 14 of the present invention, an inside/outside air switching door 12 for opening and closing an outside air introduction port 11a and an inside air introduction port 11b is provided at a most upstream air side of the air conditioning case 3. A blower fan 15 for blowing air introduced from the outside air introduction port 11a or/and the inside air introduction port 11b is driven by a blower motor 14 so that air is blown into the passenger compartment 2 through the air passage. An evaporator 16 for cooling air and a heater core 17 for heating air are disposed at downstream air side of the blower fan 15. An air mixing door 18 is disposed between the evaporator 16 and the heater core 17 so that a ratio between the air amount passing through the heater core 17 and the air amount bypassing the heater core 17 is adjusted. In FIG. 37, only a face opening 21 for blowing air toward the upper side of a passenger in the passenger compartment 2 and a foot opening 22 for blowing air toward the lower side of the passenger in the passenger compartment 2 are indicated. The face opening 21 and the foot opening 22 are selectively opened and closed by a mode switching door 26 to set an air outlet mode such as the face mode, the bi-level mode, the foot mode, the foot/defroster mode and the defroster mode.

The inside/outside air switching door 12 is driven by a servomotor 12a to selects an inside air introduction mode, a half inside air mode, and an outside air introduction mode. Only inside air inside the passenger compartment 2 is introduced during the inside air introduction mode, only outside air outside the passenger compartment is introduced during the outside air introduction mode, and both inside air and outside air are introduced during the half inside air mode.

The fan 15 blows air in the air passage of the air conditioning case 3 in accordance with a rotation speed of the blower fan 14 driven by the driving circuit 30. The rotation speed of the blower motor 14 is changed in accordance with a blower voltage applied to the blower motor 14.

The air mixing door 18 is driven by an actuator 18a such as a servomotor, and the mode switching door 26 is driven by an actuator 25 such as a servomotor.

Next, control operation of a control unit 100 according to the thirteenth embodiment will be now described. The control unit 100 includes an A/D converter 120 which performs an A/D conversion of input signals, a center process unit (CPU) 121 which receives signals from the A/D converter 120 and calculates output signals, a ROM 122 which stores an air-conditioning control amount such as the air-blowing pattern of the fan 15, and a quartz oscillator 123 for instructing a calculation process to the CPU 121.

The control unit 100 operates when the ignition switch IG is turned on so that electrical power is supplied from a battery B. Various signals from a sensor group is input into an input terminal of the control unit 100. The sensor group includes an inside air temperature sensor 33 for detecting temperature of inside air inside the passenger compartment 2, an outside air temperature sensor 34 for detecting temperature of outside air outside the passenger compartment 2, a sunlight sensor 35 for detecting a sunlight amount entering into the passenger compartment 2, an evaporator air temperature sensor 40 for detecting air temperature immediately after passing through the evaporator 16, a water temperature sensor 41 for detecting temperature of water flowing into the heater core 17, a driver's seat sensor 45 for detecting a seat state of the driver, a front passenger's seat sensor 46 for detecting a seat state of the front passenger on the front passenger's seat next to the driver's seat, a rear passenger's seat sensor 47 for detecting a seat state of the rear passenger on the rear seat. Further, signals from a temperature setting unit 36 and an air amount setting unit 54 are input into the input terminal of the control unit 100.

Each of the driver's seat sensor 45, the front passenger's seat sensor 46 and the rear passenger's seat sensor 47 is a pressure sensor provided in each of the driver's seat, the front passenger's seat and the rear seat, and detects whether or not a passenger seats on the driver's seat, the front passenger's seat and the rear seat based on pressure applied to each seat surface.

Signals from the control unit 100 are output to the actuators 12a, 18a, 25, the driving circuit 30 and an outer memory unit 48. The outer memory unit 48 is a fixed memory unit which stores a learned changed air amount pattern, and stores the learned memory even when an electrical supply from the battery B is stopped. In the thirteenth embodiment, memory means is constructed by the outer memory unit and the ROM 122.

Figure 38:
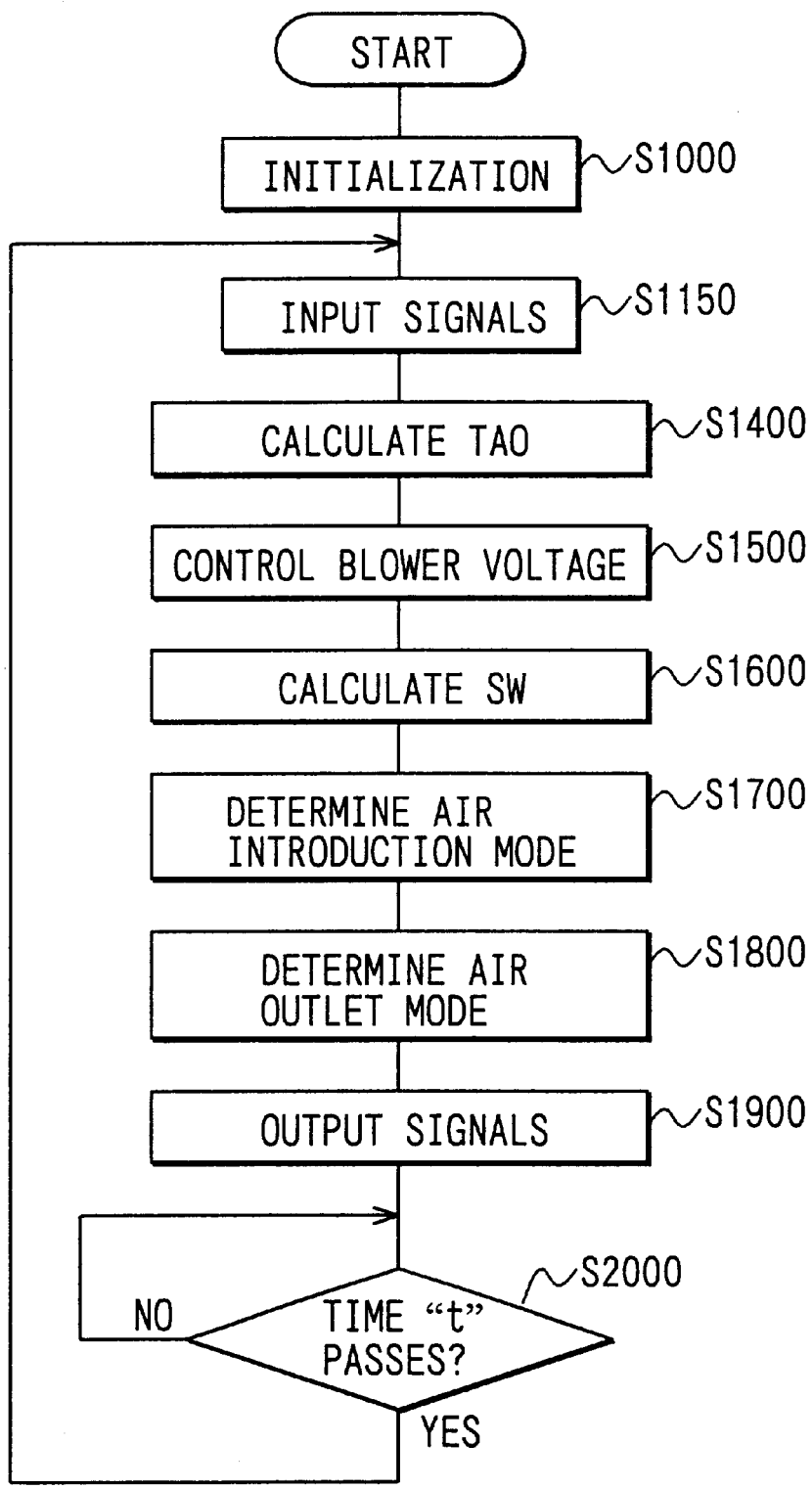
FIG. 38 is a flow diagram showing a base control of a control unit of the vehicle air conditioner according to the thirteenth embodiment.

Next, the control operation of the control unit 100 will be now described with reference to the flow diagram in FIG. 38. As shown in FIG. 38, first, at step S1000, initialization of various conversions, flag setting and the like is performed. At step S1150, signals from the sensor group and the setting units 36, 54 are input.

Next, at step S1400, the target air temperature TAO is calculated based on the above-described formula (1). In the thirteenth embodiment, the set temperature TSET is the set temperature set by the temperature setting unit 36, the inside air temperature TR is the inside air temperature detected by the inside air temperature sensor 33, the outside air temperature TAM is the outside air temperature detected by the outside air temperature sensor 34, and the sunlight amount TS is the sunlight amount detected by the sunlight amount sensor 35.

Next, at step S1500, a blower voltage applied to the blower motor 14 is determined based on the target air temperature TAO calculated at step S1400. Accordingly, the rotation speed of the fan 15 is controlled so that an air-blowing amount blown into the passenger compartment 2 is controlled.

Next, at step S1600, a target opening degree SW of the air mixing door 18 is calculated by using the above-described formula (3), based on the target air temperature TAO calculated at step S1500, the water temperature TW of the engine-cooling water and the evaporator air temperature TE of air immediately after the evaporator 16.

Next, at step S1700, an inside/outside air introduction mode due to the operation position of the inside/outside air switching door 12 is determined based on the graph shown in FIG. 16 of the above-described fifth embodiment. Next, at step S1800, an air outlet mode is determined based on the graph shown in FIG. 17 of the above-described fifth embodiment. Thereafter, at step S1900, control signals determined at step S1500–S1800 are output to the actuators 12a, 18a, 25, the driving circuit 30, and the outer memory unit 48.

Thereafter, at step S2000, it is determined whether or not a predetermined time "t" (predetermined period) passes. After the predetermined time "t" passes, the control routine returns at step S1150.

Figure 39:
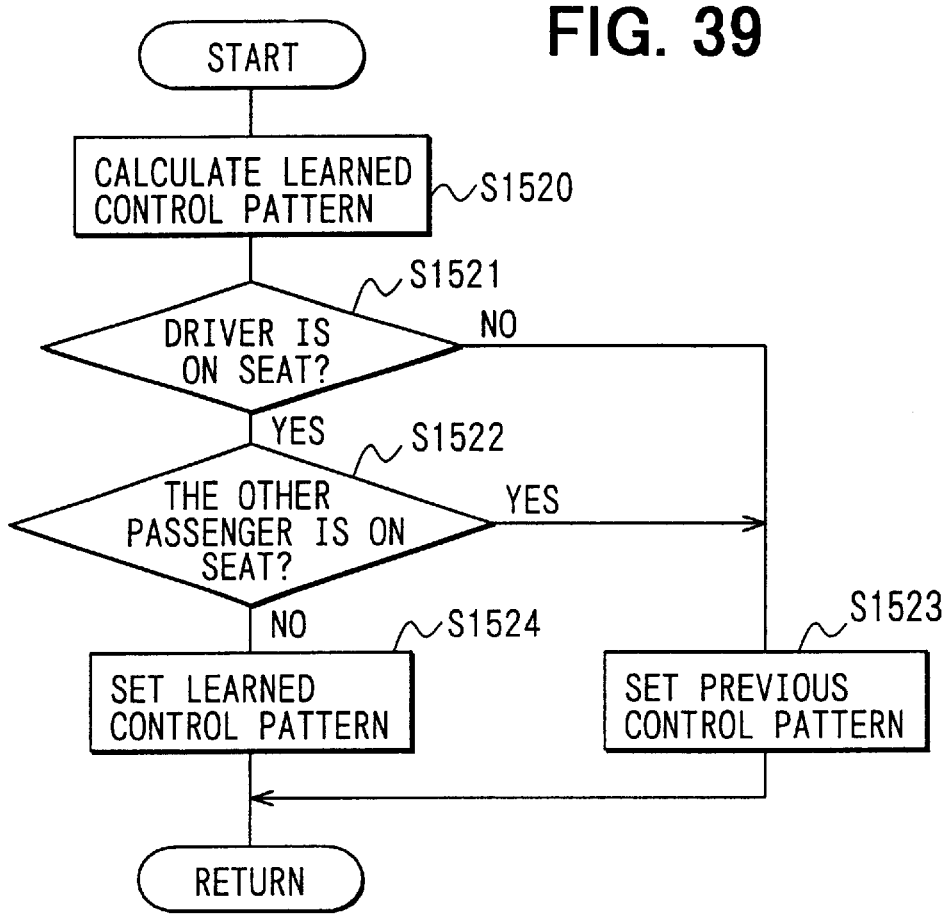
FIG. 39 is a flow diagram showing a detail control of step S1500 in FIG. 38 according to the thirteenth embodiment.
Figure 40:
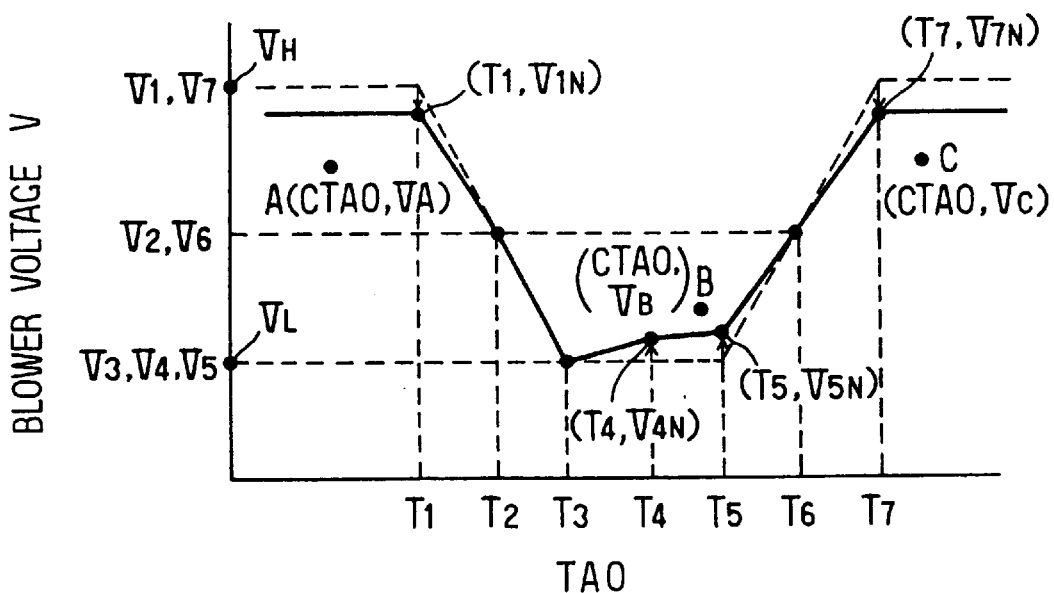
FIG. 40 is a graph for determining a blower voltage according the thirteenth embodiment.

Next, the blower voltage control at step S1500 in FIG. 38 will be described in detail with reference to FIG. 39. When the sub-routine of FIG. 39 starts, the previous control pattern shown by the chain line in FIG. 40 is learned and changed based on a manual operation of the passenger by the air amount setting unit 54. The previous control pattern is a general control pattern which is set so that all passengers in the passenger compartment 2 generally obtain pleasant feeling. The previous control pattern is stored beforehand in the ROM 122.

In the previous control pattern of FIG. 40, seven points (T1, V1), (T2, V2), (T3, V3), (T4, V4), (T5, V5), (T6, V6), (T7, V7) are stored in the ROM 22. Therefore, the range of the target air temperature TAO is divided into eight parts by the seven points T1–T7. The TAO after the manual operation of the air amount setting unit 54 is stored as CTAO. Here, learning method when CTAO≦T1, when T1<CTAO<T7, and when CTAO≧T7 will be explained, respectively.

In a case of CTAO≦T1, when the blower voltage VA is manually set by the air amount setting unit 54 when the CTAO is at the A point in FIG. 40, the blower voltage V1 is learned and changed to V1N based on the following formula (11).

$$V1N=V1+a(VA-V1) \tag{11}$$

Here, "a" is a set constant value. For example, a=0.3.

In a case of T1<CTAO<T7, when the blower voltage VB is manually set by the air amount setting unit 54 when the CTAO is at the B point between the T4 and the T5 in FIG. 40, the blower voltages V4 and V5 are learned and changed to V4N and V5N based on the following formulas (12) and (13), respectively.

$$V4N=V4+a(VB-V4)[(T5-CTAO)/(T5-T4)] \tag{12}$$

$$V5N=V5+a(VB-V5)[(CTAO-T4)/(T5-T4)] \tag{13}$$

That is, the section of the CTAO placed between the Ti and the T7 is determined. When Tn≦CTAO<Tn+1 (n=1–6), two blower voltages Vn and Vn+1 corresponding to this section are learned based on the following formulas (14) and (15).

$$VnN=Vn+a(VB-Vn)[(Tn+1-CTAO)/(Tn+1-Tn)] \tag{14}$$

$$Vn+1N=Vn+1+a(VB-Vn+1)[(CTAO-Tn)/(Tn+1-Tn)] \tag{15}$$

In a case of CTAO≧T7, when the blower voltage VC is manually set by the air amount setting unit 54 when the CTAO is at the C point in FIG. 40, the blower voltage V7 is learned and changed to V7N based on the following formula (16).

$$V7N=V7+a(VC-V7) \tag{16}$$

That is, by the above-described calculations, the learned control pattern of the air amount, in which the previous control pattern is learned and changed, is calculated. Next, at step S1521, it is determined whether or not the driver is seated on the driver's seat by the driver's seat sensor 45. When the driver is on the driver's seat, it is determined whether or not there is any the other passenger on the seat by the seat sensors 46, 47 at step S1522. When the other passenger is determined at step S1522, the blower voltage is determined based on the target air temperature TAO in accordance with the previous blower voltage control characteristic (previous control pattern). Therefore, it can prevent unpleasant feeling from being given to the other passenger except for the driver. On the other hand, when the other passenger is not detected at step S1522, that is, when only the driver is in the passenger compartment, the blower voltage is determined based on the target air temperature TAO using the learned control pattern (the corrected blower voltage control characteristic) at step S1524. In this case, pleasant air-conditioning performance for the driver can be improved.

A fourteenth preferred embodiment of the present invention will be now described with reference to FIG. 41. In the fourteenth embodiment, the blower voltage determination is different from that of step S1500 of the above-described thirteenth embodiment. In the fourteenth embodiment, the other parts are similar to those of the above-described thirteenth embodiment. The blower voltage determination of the fourteenth embodiment is described with reference to FIG. 41.

Figure 41:
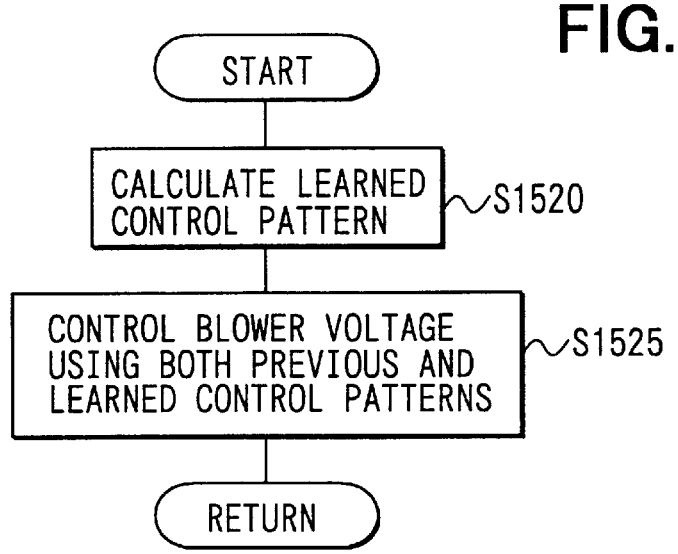
FIG. 41 is a flow diagram showing a main control corresponding to FIG. 39, according to a fourteenth preferred embodiment of the present invention.

When the sub-routine shown in FIG. 41 starts, the previous control pattern is learned and changed based on a manual operation of the passenger by the air amount setting unit 54, and the learned control pattern is calculated at step S1520, similarly to that of thirteenth embodiment. Next, at step S1525, the blower voltage BV is determined using both the previous control pattern (previous blower voltage control characteristic) and the learned control pattern (corrected blower voltage control characteristic) in accordance with the following formula (17).

$$BV = (AVj + VI)/(A+1) \qquad (17)$$

wherein, A is the number of passenger, seated on the other seat except for the driver's seat, detected by the seat sensors 46–47, Vj is a blower voltage determined using the previous control pattern based on the target air temperature, and VI is a blower voltage determined using the learned control pattern based on the target air temperature.

According to the fourteenth embodiment, when any the other passenger except the driver is in the passenger compartment, the blower voltage is determined based on both the previous control pattern and the learned control pattern.

Figure 42:
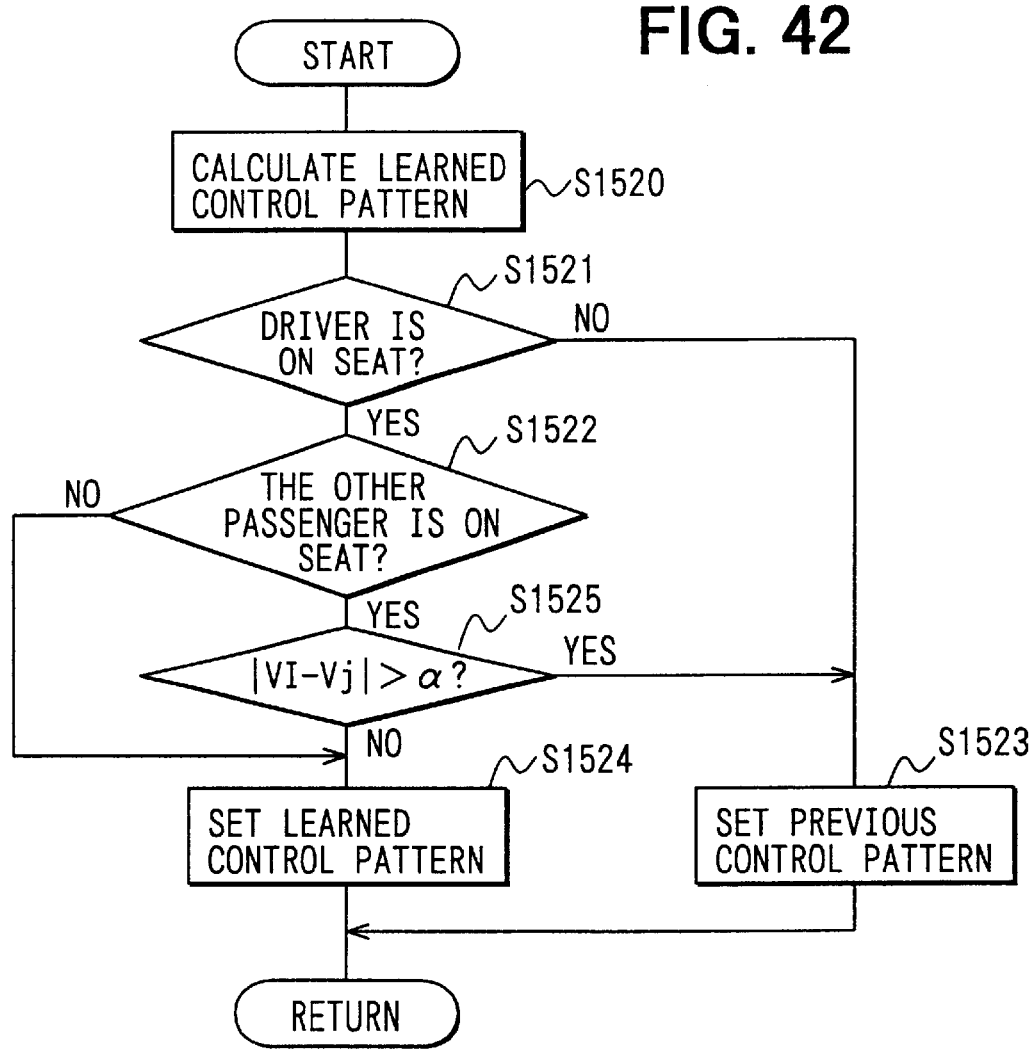
FIG. 42 is a flow diagram showing a main control corresponding to FIG. 39, according to a fifteenth preferred embodiment of the present invention.

A fifteenth preferred embodiment of the present invention will be now described with reference to FIG. 42. In the fifteenth embodiment, step S1525 is added after step S1522 in FIG. 39 of the thirteenth embodiment, as shown in FIG. 42. In the fifteenth embodiment, the other parts are similar to those of the above-described thirteenth embodiment.

When the other passenger except for the driver is determined at step S1522 in FIG. 42, it is determined whether or not a difference, between a blower voltage VI determined in accordance with the learned control pattern and a blower voltage Vj determined in accordance with the previous control pattern, is equal to or larger than a predetermined value "a" at step S1525. The predetermined value "a" is set so that an unpleasant feeling is given to the other passenger except for the driver when the difference becomes equal to or larger than the predetermined value "a". For example, a=2V, in the fifteenth embodiment.

When |VI−Vj|> a at step S1525, the previous control pattern is selected at step S1523 so that the blower voltage is determined in accordance with the previous control pattern based on the target air temperature TAO. On the other hand, when |VI−Vj|≦ a at step S1525, the learned control pattern is selected at step S1524 so that the blower voltage is determined in accordance with the learned control pattern based on the target air temperature TAO.

According to the fifteenth embodiment, even when other passenger except for the driver is on the seat of the passenger compartment 2, when the difference |VI−Vj| is smaller than the predetermined value a so that the correction of the blower voltage does not give an unpleasant feeling to the other passenger except for the driver, the blower voltage is calculated based on the learned control pattern so that the air amount is changed in accordance with the driver's desire.

In the above-described thirteenth through fifteenth embodiments, the present invention is applied to the learning control relative to the blower voltage control. However, the learning control described in the thirteenth through the fifteenth embodiments can be applied to the other air conditioning control such as a temperature control, an outlet mode control, an air introduction mode control.

In the above-described thirteenth through fifteenth embodiments, the driver is set as a predetermined passenger. However, the predetermined passenger can be set by the other passenger except for the driver. In the above-described thirteenth through fifteenth embodiments, each of the seat sensors 45–47 is constructed by the pressure sensor. However, instead of the sensors 45–47, a mechanical switch, a seat belt state detecting member, a non-contact temperature sensor for detecting a surface temperature of a passenger may be used.

In the above-described thirteenth through fifteenth embodiments, the other passenger includes the passengers on the front seat next to the driver's seat and the passenger on the rear seat. However, the other passenger can be limited to only the rear seat passenger.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioner for a vehicle having a passenger compartment, comprising:
   a blower which blows air into the passenger compartment;
   a control system which determines an air amount blown by the blower, based on a control characteristic having a relationship between a control factor used for a temperature control of the passenger compartment and the air amount of the blower; and
   a manual setting member through which a set value of the air amount of the blower is manually controlled, wherein:
   the control system corrects the control characteristic based on the set value due to the manual setting member; and
   when the set value of the air amount of the blower is changed by the manual setting member, the control system determines a correction degree of the control characteristic in accordance with a determination whether a difference between a value of the control factor at the previous manual operation of the manual setting member and a value of the control factor at the present manual operation of the manual setting member is equal to or larger than a predetermined value.

2. The air conditioner according to claim 1, wherein the control system corrects the control characteristic without using the set value of the air amount at the previous manual operation, when the difference is smaller than the predetermined value.

3. The air conditioner according to claim 1, wherein the control system corrects the control characteristic by using the mean value of the set value of the air amount at the previous manual operation and the set value of the air amount at the present manual operation, when the difference is smaller than the predetermined value.

4. The air conditioner according to claim 1, wherein the control system corrects the control characteristic by directly using the set value of the air amount at the previous manual operation and the set value of the air amount at the present manual operation, when the difference is equal to or larger than the predetermined value.

5. The air conditioner according to claim 1, wherein:
   the control factor is a target air temperature to be blown into the passenger compartment; and
   the target air temperature is calculated based on an environment condition relative to an air conditioning state of the passenger compartment.

6. The air conditioner according to claim 1, wherein the control factor at least includes a temperature of inside air inside the passenger compartment.

7. The air conditioner according to claim 1, wherein the control factor includes a temperature of inside air inside the passenger compartment, a temperature of outside air outside the passenger compartment, and a sunlight amount entering into the passenger compartment.

8. The vehicle air conditioner according to claim 1, further comprising
a sensor for detecting an environment condition relative to an air conditioning state of the passenger compartment, wherein
the control system includes calculation means in which a detection value of the sensor is calculated in accordance with a predetermined calculation process to a sensor output value;
the control system automatically controls the air conditioning state of the passenger compartment based on the sensor output value; and
when the set value of the air amount of the blower is changed by the manual setting member, the control system corrects the control characteristic using a value approximating the detection value of the sensor, than the sensor output value.

9. The air conditioner according to claim 1, further comprising
a sensor for detecting an environment condition relative to an air conditioning state of the passenger compartment, wherein,
the control system automatically controls the air conditioning state of the passenger compartment based on an output value from the sensor, and corrects the control characteristic for an automatic control of the air conditioning state based on the set value;
the control system has operator determining means for determining a seat position of an operator operating the manual setting member in the passenger compartment when the set value of the air amount of the blower is manually set through the manual setting member; and
the control system determines a correction method of the control characteristic based on a determination of the operator determining means.

10. The air conditioner according to claim 9, wherein the control system corrects the control characteristic only when the operator determining means determines that the operator operating the manual setting member is on a predetermined seat.

11. An air conditioner for a vehicle having a passenger compartment, comprising:
a blower which blows air into the passenger compartment;
a control system which determines an air amount blown by the blower, based on a control characteristic having a relationship between a control factor used for a temperature control of the passenger compartment and the air amount of the blower; and
a manual setting member through which a set value of the air amount of the blower is manually controlled, wherein:
the control system corrects the control characteristic based on the set value due to the manual setting member;
the control system stores a plurality of the set values due to plural manual operations of the manual setting member, and selects correction set values to be used for a correction of the control characteristic among the set values; and
the control system corrects the control characteristic only based on the correction set values.

12. The air conditioner according to claim 11, wherein:
said control system calculates a temporary control characteristic based on the stored plural set values; and
the control system selects the correction set values by comparing the temporary control characteristic and each of the set values.

13. The air conditioner according to claim 12, wherein the correction set values are the set values where each difference between an air amount calculated based on the temporary control characteristic and each air amount from the set values becomes equal to or smaller than a predetermined value.

14. The air conditioner according to claim 11, wherein the control system corrects the control characteristic only based on the correction set values after an ignition switch of the vehicle is turned off.

15. An air conditioner for a vehicle having a passenger compartment, comprising:
a sensor for detecting an environment condition relative to an air conditioning state of the passenger compartment;
a manual operation member, manually operated by a passenger, for setting a set value of the air conditioning state; and
a control system for controlling the air conditioning state, wherein:
the control system includes calculation means in which a detection value of the sensor is calculated in accordance with a predetermined calculation process to a sensor output value;
the control system automatically controls the air conditioning state of the passenger compartment based on the sensor output value in accordance with a control characteristic; and
when the set value due to the manual operation member is changed, the control system corrects the control characteristic using a value approximating the detection value of the sensor, than the sensor output value.

16. The air conditioner according to claim 15, wherein the control system corrects the control characteristic using the detection value of the sensor.

17. The air conditioner according to claim 15, wherein the calculation means calculating the sensor output value is a slow process for slowing a change degree of the detection value of the sensor.

18. The air conditioner according to claim 17, wherein:
the slow process is a time constant process in which the sensor output value is calculated based on a first time constant; and
when the set value is manually controlled by the manual operation member, the control characteristic is corrected using an another sensor output value calculated based on a second time constant that is smaller than the first time constant.

19. The air conditioner according to claim 15, wherein:
the control characteristic is a blower voltage control characteristic; and
the sensor at least includes a sunlight amount sensor detecting a sunlight amount entering into the passenger compartment.

20. An air conditioner for a vehicle having a passenger compartment, comprising:
a temperature setting unit for setting temperature of the passenger compartment to a passenger's set temperature;
a memory unit which learns and stores the passenger's set temperature in connection with an environment condition relative to an air conditioning state of the passenger compartment;

calculation means for calculating an air-conditioning control amount based on a stored set temperature corresponding to the environment condition, among a plurality of stored set temperatures stored in the memory unit; and a control system for automatically controlling the air conditioning state based on the air-conditioning control amount from the calculation means, wherein:

the stored set temperature used for the calculation of the air-conditioning control amount is changed in accordance with a change of the environment condition;

when a difference of the stored set temperature before the change and the stored set temperature after the change is equal to or larger than a predetermined temperature, the control system set a correction set temperature different from the stored set temperature; and the calculation means calculates the air-conditioning control amount based on the correction set temperature.

21. The air conditioner according to claim 20, wherein the control system gradually changes the correction set temperature from a value near the stored set temperature before the change to a value near the stored set temperature after the change.

22. The air conditioner according to claim 20, wherein:

when the difference between the stored set temperature before the change and the stored set temperature after the change is smaller than the predetermined temperature, the calculation means calculates the air-conditioning control amount based on the stored set temperature.

23. The air conditioner according to claim 20, wherein the air-conditioning control amount is at least one of an air amount blown into the passenger compartment and an air temperature blown into the passenger compartment.

24. An air conditioner for a vehicle having a passenger compartment, comprising:

a temperature setting unit for setting temperature of the passenger compartment to a passenger's set temperature;

a memory unit which learns and stores the passenger's set temperature in connection with an environment condition relative to an air conditioning state of the passenger compartment;

calculation means for calculating an air-conditioning control amount based on a stored set temperature corresponding to the environment condition, among a plurality of stored set temperatures stored in the memory unit; and a control system for automatically controlling the air conditioning state based on the air-conditioning control amount from the calculation means, wherein:

when the passenger's set temperature is changed through the temperature setting unit, the control system determines whether the changed passenger's set temperature is learned in accordance with a control amount difference between an air-conditioning control amount calculated based on the changed passenger's set temperature and the air-conditioning control amount calculated based on the stored set temperature.

25. The air conditioner according to claim 24, wherein:

when the control amount difference is smaller than a predetermined value, the control system prohibits the learning of the changed passenger's set temperature.

26. The air conditioner according to claim 24, wherein:

when the control amount difference is equal to or larger than a predetermined value, the control system learns the changed passenger's set temperature.

27. The air conditioner according to claim 26, wherein:

when the control amount difference is equal to or larger than the predetermined value, the control system corrects and learns the changed passenger's set temperature so that the control amount difference becomes smaller than the predetermined value.

28. An air conditioner for a vehicle having a passenger compartment, comprising:

a temperature setting unit for setting temperature of the passenger compartment to a passenger's set temperature;

a memory unit which learns and stores the passenger's set temperature in connection with an environment condition relative to an air conditioning state of the passenger compartment;

calculation means for calculating an air-conditioning control amount based on a stored set temperature corresponding to the environment condition, among a plurality of stored set temperatures stored in the memory unit; and a control system for automatically controlling the air conditioning state based on the air-conditioning control amount from the calculation means, wherein:

when the passenger's set temperature is changed through the temperature setting unit, the control system determines whether the changed passenger's set temperature is learned in accordance with the environment condition and any one of the passenger's set temperature and the stored set temperature.

29. The air conditioner according to claim 28, wherein:

the environment condition is the temperature of the passenger compartment; and when a difference between the temperature of the passenger compartment and any one of the passenger's set temperature and the stored set temperature is equal to or larger than a predetermined value, the control system prohibits the learning of the changed passenger's set temperature.

30. An air conditioner for a vehicle having a passenger compartment, comprising:

a temperature setting unit for setting temperature of the passenger compartment to a passenger's set temperature;

a memory unit which learns and stores the passenger's set temperature in connection with an environment condition relative to an air conditioning state of the passenger compartment;

calculation means for calculating an air-conditioning control amount based on a stored set temperature corresponding to the environment condition, among a plurality of stored set temperatures stored in the memory unit; and a control system for automatically controlling the air conditioning state based on the air-conditioning control amount from the calculation means, wherein:

when the passenger's set temperature is changed through the temperature setting unit, the control system prohibits the learning of the changed passenger's set temperature during a predetermined time period from a start of an air conditioning operation.

31. The air conditioner according to claim 30, wherein the air-conditioning control amount is at least one of an air amount blown into the passenger compartment and an air temperature blown into the passenger compartment.

32. an air conditioner for a vehicle having a passenger compartment, comprising:

a sensor for detecting an environment condition relative to an air conditioning state of the passenger compartment;

a manual operation member for manually setting a set value of the air conditioning state; and a control system for automatically controlling the air conditioning state of the passenger compartment based on an output value from the sensor in accordance with a control characteristic, and corrects the control characteristic for an automatic control of the air conditioning state based on the set value of the manual operation member, the control system has operator determining means for determining a seat position of an operator operating the manual operation member in the passenger compartment when the set value of the air amount of the blower is manually set through the manual operation member; and the control system determines a correction method of the control characteristic based on a determination of the operator determining means.

33. The air conditioner according to claim 32, wherein the control system corrects the control characteristic only when the operator operating the manual operation member is on a predetermined seat in the passenger compartment.

34. The air conditioner according to claim 33, wherein the predetermined seat is the driver's seat.

35. An air conditioner for a vehicle having a passenger compartment, comprising:

an air conditioning case defining an air passage through which air flows into the passenger compartment;

an air conditioning unit for controlling an air state to be introduced into the passenger compartment through the air passage;

memory means for storing a control pattern of the air conditioning unit, the control pattern having a learning pattern which is rewritten in accordance with a passenger's desire and a general pattern which maintains an original set pattern; and a control system which controls the air conditioning unit based on the control pattern, wherein:

the control system has seat state detecting means for detecting a seated state of a passenger in the passenger compartment;

when the seat state detecting means detects that a passenger is only on a predetermined seat, the control system controls the air conditioning unit based on the learning pattern; and when the seat state detecting means detects that a passenger is also on the other seat except for the predetermined seat, the control system controls the air conditioning unit based on at least the general pattern.

36. The air conditioner according to claim 35, wherein:

the air conditioning unit includes a blower generating an air flow in the air passage; and the control pattern is a control characteristic for controlling the blower.

37. The air conditioner according to claim 35, wherein:

when the seat state detecting means detects that a passenger is also on the other seat except for the predetermined seat, the control system controls the air conditioning unit based on both the learning pattern and the general pattern; and as the number of passengers on the other seat except for the predetermined seat is larger, a contribution of the general pattern is made larger.

38. The air conditioner according to claim 35, wherein:

the control system includes load calculation means for calculating an air conditioning load of the passenger compartment;

the control pattern relates to the air conditioning load of the passenger compartment and an air-conditioning control amount of the air conditioning unit;

the control system selects the air-conditioning control amount from the control pattern based on the air conditioning load calculated by the load calculation means, and controls the air conditioning unit based on the selected air-conditioning control amount; and when the seat state detecting means detects that a passenger is also on the other seat except for the predetermined seat, the control system controls the air conditioning unit based on the learning pattern when a difference between an air-conditioning control amount calculated based on the learning pattern in accordance with the air conditioning load and an air-conditioning control amount calculated based on the general pattern in accordance with the air conditioning load is smaller than a predetermined value.

* * * * *